US011640178B2

(12) United States Patent
Nonami et al.

(10) Patent No.: US 11,640,178 B2
(45) Date of Patent: May 2, 2023

(54) UNMANNED AIRCRAFT, DEVICE FOR CONTROLLING UNMANNED AIRCRAFT, METHOD FOR CONTROLLING UNMANNED AIRCRAFT, AND DEVICE FOR DETECTING FAILURE OF UNMANNED AIRCRAFT

(71) Applicant: ACSL Ltd., Tokyo (JP)

(72) Inventors: Kenzo Nonami, Chiba (JP); Yi Yang, Chiba (JP)

(73) Assignee: ACSL Ltd., Tokyo (JP)

(*) Notice: Subject to any disclaimer, the term of this patent is extended or adjusted under 35 U.S.C. 154(b) by 778 days.

(21) Appl. No.: 16/469,079

(22) PCT Filed: Dec. 13, 2017

(86) PCT No.: PCT/JP2017/044712
§ 371 (c)(1),
(2) Date: Jun. 12, 2019

(87) PCT Pub. No.: WO2018/110598
PCT Pub. Date: Jun. 21, 2018

(65) Prior Publication Data
US 2020/0103922 A1 Apr. 2, 2020

(30) Foreign Application Priority Data

Dec. 13, 2016 (JP) .............................. JP2016-241718
Apr. 18, 2017 (JP) .............................. JP2017-082315

(51) Int. Cl.
*G05D 1/08* (2006.01)
*B64C 39/02* (2023.01)
(Continued)

(52) U.S. Cl.
CPC ......... *G05D 1/0808* (2013.01); *B64C 39/024* (2013.01); *G05D 1/0022* (2013.01);
(Continued)

(58) Field of Classification Search
CPC .. G05D 1/0808; G05D 1/0022; B64C 39/024; B64C 2201/024; B64C 2201/108; B64C 2201/12; B64C 2201/146; G06F 17/16
See application file for complete search history.

(56) References Cited

U.S. PATENT DOCUMENTS

2016/0107751 A1  4/2016 D'Andrea et al.
2016/0152321 A1  6/2016 D'Andrea et al.
(Continued)

FOREIGN PATENT DOCUMENTS

CN   104699105 A    6/2015
CN   104950877 A  * 9/2015  ......... G05B 23/0256
(Continued)

OTHER PUBLICATIONS

"H. Jin Kim, Fully Autonomous Vision-Based Net-Recovery Landing System fora Fixed-Wing UAV, Aug. 2013, IEEE/ASME Transactions on Mechatronics, vol. 18, No. 4, pp. 1320-1333" (Year: 2013).*

(Continued)

*Primary Examiner* — Elaine Gort
*Assistant Examiner* — Anthony M Gartrelle
(74) *Attorney, Agent, or Firm* — McDonnell Boehnen Hullbert & Berghoff LLP

(57) ABSTRACT

[Problem to be Solved]
The object is to provide a device, a method and the like which, when a fault occurs, particularly when a fault occurs in an operation of some of rotary wings, can control a flight depending on the fault, or which can be at least used for control when a fault occurs, or which can detect the fault.
[Solution]
A control device for unmanned aircraft comprising: a rotary-wing control signal generation circuit for generating a rotary wing control signal for causing a driving device to drive a (Continued)

plurality of rotary wings for flying the unmanned aircraft; a measuring device for measuring a physical amount relating to an operation of at least one of the plurality of rotary wings; and a fault detection circuit for detecting a fault in the operation of at least one of the plurality of rotary wings by using the physical amount measured by the measuring device, wherein the rotary-wing control signal generation circuit is configured to generate a rotary wing control signal depending on the fault detected by the fault detection circuit in the operation of at least one of the plurality of rotary wings, is provided.

12 Claims, 26 Drawing Sheets

(51) Int. Cl.
*G05D 1/00* (2006.01)
*G06F 17/16* (2006.01)
*B64U 10/10* (2023.01)
*B64U 30/20* (2023.01)
*B64U 101/00* (2023.01)

(52) U.S. Cl.
CPC .............. *G06F 17/16* (2013.01); *B64U 10/10* (2023.01); *B64U 30/20* (2023.01); *B64U 2101/00* (2023.01); *B64U 2201/20* (2023.01)

(56) References Cited

U.S. PATENT DOCUMENTS

| | | | |
|---|---|---|---|
| 2016/0304199 A1* | 10/2016 | Chan | B64D 27/26 |
| 2017/0139048 A1* | 5/2017 | Muller | G01S 19/05 |
| 2017/0158342 A1 | 6/2017 | Ishii et al. | |
| 2017/0235018 A1* | 8/2017 | Foster | G01V 99/005 |
| | | | 702/5 |
| 2018/0002012 A1* | 1/2018 | McCullough | B64C 29/0033 |
| 2018/0155009 A1 | 6/2018 | Mueller et al. | |

FOREIGN PATENT DOCUMENTS

| | | |
|---|---|---|
| JP | 2002347698 A | 12/2002 |
| JP | 2004268730 A | 9/2004 |
| JP | 2014227155 A | 12/2014 |
| JP | 2015223995 A | 12/2015 |
| JP | 2016524567 A | 8/2016 |
| JP | 2016215958 A | 12/2016 |
| JP | 2017100651 A | 6/2017 |
| WO | 2013/000035 A1 | 1/2013 |
| WO | WO-2015199773 A2 * 12/2015 | ........... G01R 31/008 |

OTHER PUBLICATIONS

PCT International Search Report, PCT International Application No. PCT/JP2017/044712, dated Feb. 27, 2018, 2 pages.

* cited by examiner

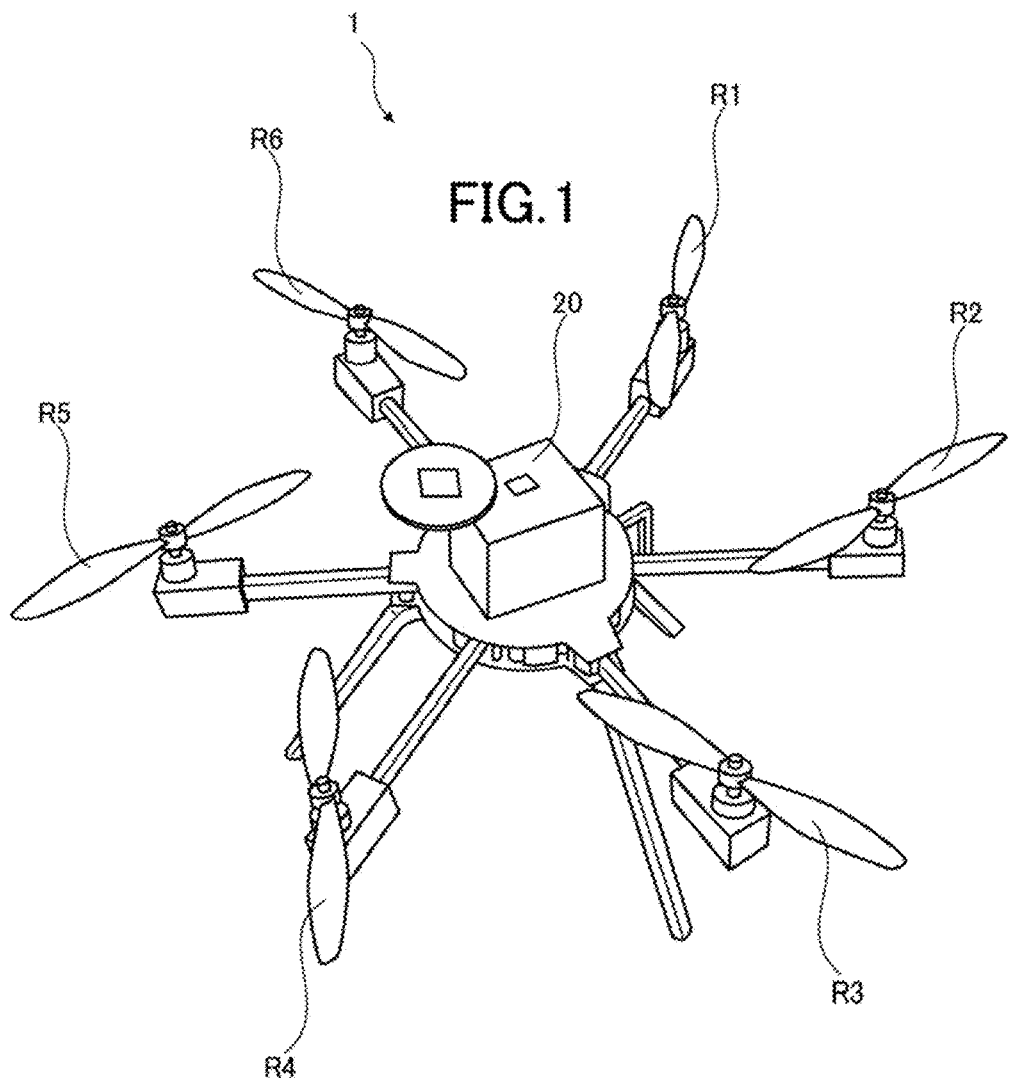

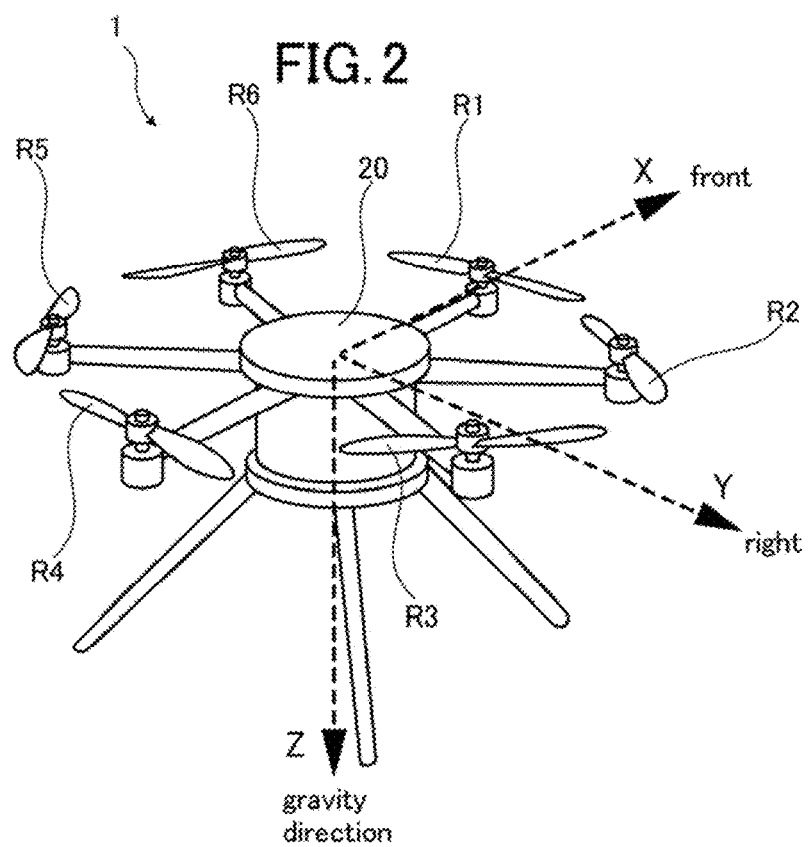
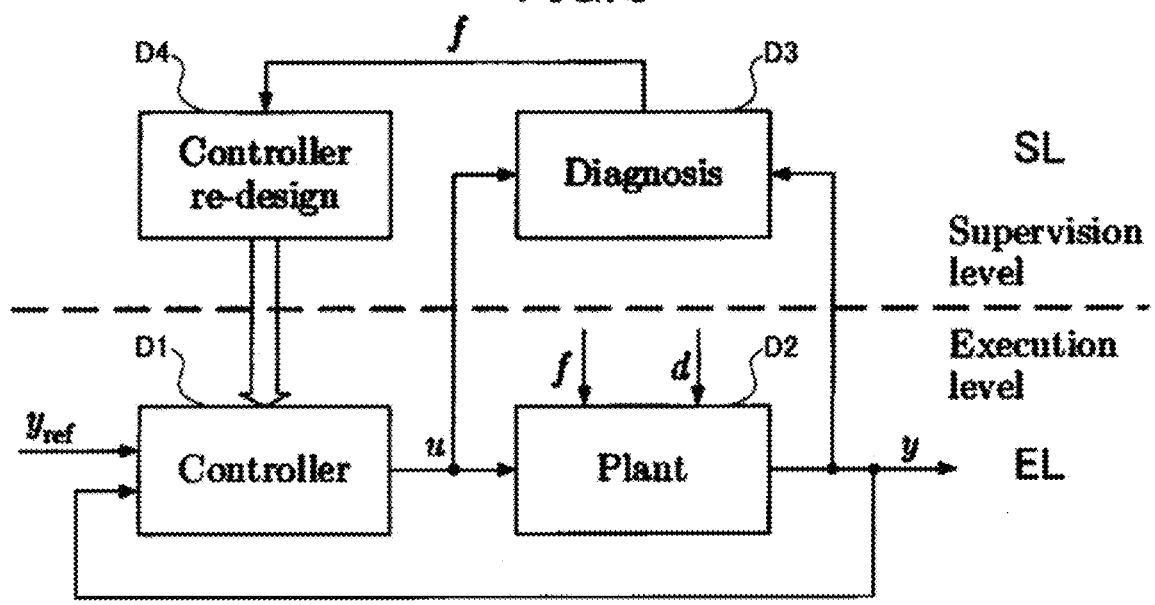

UNMANNED AIRCRAFT, DEVICE FOR CONTROLLING UNMANNED AIRCRAFT, METHOD FOR CONTROLLING UNMANNED AIRCRAFT, AND DEVICE FOR DETECTING FAILURE OF UNMANNED AIRCRAFT

The present application is a US national phase under 35 U.S.C. 371 of international application PCT/JP2017/044712, filed Dec. 13, 2017, which claims priority to Japanese Patent Application No. 2017-082315, filed with the Japanese Patent Office on Apr. 18, 2017 and Japanese Patent Application No. 2016-241718, filed with the Japanese Patent Office on Dec. 13, 2016, which are incorporated herein by reference in their entirety.

TECHNICAL FIELD

The present invention relates to a multirotor helicopter, a fault tolerance control device, and a fault tolerance control method and particularly relates to a multirotor helicopter, a fault tolerance control device, and a fault tolerance control method relating to a fault tolerance operation (fault tolerance operation) in which, when a fault occurs in some of rotor parts (actuator parts), this fault is tolerated and the operation is continued within a tolerable range.

Moreover, the present invention relates to an unmanned aircraft, a control device for an unmanned aircraft, a method for controlling an unmanned aircraft, and a fault detecting device of an unmanned aircraft. In more detail, the present invention relates to an unmanned aircraft, a control device for an unmanned aircraft, a method for controlling an unmanned aircraft, and a fault detecting device of an unmanned aircraft which, when a fault occurs in an operation of a part of rotary wings, can control a flight in accordance with the fault, or can be used at least for control when a fault occurs, or can detect the fault.

BACKGROUND ART

Background Art 1

An unmanned helicopter has flight characteristics such as hovering, vertical take-off and landing and the like not found in the other aircrafts and its costs and risks are smaller than those in manned aircrafts and thus, use in various industrial fields such as aerial photography, pesticide spraying, goods transportation and the like has been promoted.

As such unmanned helicopters, a small-sized electric multirotor helicopter having a plurality of rotor parts has attracted attention recently. Since a mechanism of the multirotor helicopter is simpler than that of a general single-rotor helicopter, manufacture is easy, and since a flight is possible only by number of rotations-control of a motor for rotating the rotor, flight control is relatively easy, which are merits. One example of the multirotor helicopter is disclosed in Patent Literature 1.

Background Art 2

Recently, an unmanned aircraft in which the flight is controlled by controlling rotation speeds of a plurality of rotary wings has circulated in the market and is widely used in industrial applications such as photographing surveys, pesticide spraying, goods transportation and the like or for hobby applications.

The unmanned aircraft is required to fly in severe environments such as a bad weather in many cases as compared with a manned aircraft. With regard to this, a control method for preventing and attenuating an influence of disturbance is proposed (Patent Literature 2).

However, an unmanned aircraft (multi-copter) described in Patent Literature 2 is controlled in order to handle the influence of disturbance on the premise that all the rotor units are normally operated, and how to continue the flight by what control when an operation fault occurs due to disturbance in a part of the plurality of rotor units is not examined.

CITATION LIST

Patent Literature

[Patent Literature 1] Japanese Patent Laid-Open No. 2015-223995 (Japan)
[Patent Literature 2] Japanese Patent Laid-Open No. 2016-215958 (Japan)

SUMMARY OF INVENTION

Problem to be Solved by the Invention (Problem 1)

However, since the multirotor helicopter used for such industrial applications as above flies with a high output with a driving system holding a load larger than its own weight and flies while bearing disturbances such as wind, it is under a severe use environment and thus, there is not a small possibility of a fault such as failure or functional deterioration in the driving system such as a motor driver, a motor and the like. As a result, the multirotor helicopter is required to continue the operation by suppressing occurrence of an accident such as a crash as much as possible even if a fault occurs in the driving system.

Thus, the present invention has an object to provide a multirotor helicopter, a fault tolerance control device, and a fault tolerance control method which can effectively suppress inability to continue the operation when a fault occurs.

(Problem 2)

Alternatively, the present invention has an object to provide an unmanned aircraft, a control device for an unmanned aircraft, a method for controlling an unmanned aircraft, and a fault detecting device of an unmanned aircraft which, when a fault occurs in an operation of a part of rotary wings, can control a flight in accordance with the fault, or can be used at least for control when a fault occurs, or can detect the fault.

Measures to Solve the Problem

In order to achieve the aforementioned object, the present invention provides a control device for an unmanned aircraft including a rotary-wing control signal generation circuit for generating a rotary-wing control signal for causing a driving device to drive a plurality of rotary wings for flying an unmanned aircraft, a measuring device for measuring a physical amount relating to an operation of at least one of the plurality of rotary wings, and a fault detection circuit for detecting a fault in an operation of at least one of the plurality of rotary wings by using the physical amount measured by the measuring device, and the rotary-wing control signal generation circuit is configured to generate the rotary-wing control signal depending on the fault detected by the fault detection circuit in an operation of at least one of the plurality of rotary wings.

In the aforementioned control device for an unmanned aircraft, the rotary-wing control signal generation circuit may include a control-amount distributor for distributing control amounts relating to a flight of the unmanned aircraft correspondingly to the respective ones of the plurality of rotary wings, and the control-amount distributor may be configured to change distribution amounts of the control amounts corresponding to the respective ones of the plurality of rotary wings so that the unmanned aircraft performs the operation depending on the control amounts, depending on the fault detected by the fault detection circuit.

In the aforementioned control device for an unmanned aircraft, the fault detection circuit may be configured to detect a fault in an operation of at least one of the plurality of rotary wings by comparing an output value of an identification model when a control signal indicating a control amount is input into the identification model of the unmanned aircraft with an output value of the unmanned aircraft when a control signal indicating the control amount is input into the unmanned aircraft.

The aforementioned control device for an unmanned aircraft may have six rotary wings as the plurality of rotary wings, and the control-amount distributor may be configured to distribute the control amounts by using a control-amount distribution matrix M below:

[Formula 1]

$$M = \overline{M}(\eta_i)^T \left( \overline{M}(\eta_i) \overline{M}(\eta_i)^T \right)^{-1} \begin{bmatrix} \sigma_T & 0 & 0 & 0 \\ 0 & \sigma_L & 0 & 0 \\ 0 & 0 & \sigma_M & 0 \\ 0 & 0 & 0 & \sigma_N \end{bmatrix}$$

where

[Formula 2]

$$\overline{M} = \begin{bmatrix} \kappa_f \eta_1 & \kappa_f \eta_2 & \kappa_f \eta_3 & \kappa_f \eta_4 & \kappa_f \eta_5 & \kappa_f \eta_6 \\ \dfrac{\kappa_f l \eta_1}{2} & \kappa_f l \eta_2 & \dfrac{\kappa_f l \eta_3}{2} & \dfrac{-\kappa_f l \eta_4}{2} & -\kappa_f l \eta_5 & \dfrac{-\kappa_f l \eta_6}{2} \\ \dfrac{\sqrt{3} \kappa_f l \eta_1}{2} & 0 & \dfrac{-\sqrt{3} \kappa_f l \eta_3}{2} & \dfrac{-\sqrt{3} \kappa_f l \eta_4}{2} & 0 & \dfrac{-\sqrt{3} \kappa_f l \eta_6}{2} \\ e_1 \kappa_\tau \eta_1 & e_2 \kappa_\tau \eta_2 & e_3 \kappa_\tau \eta_3 & e_4 \kappa_\tau \eta_4 & e_5 \kappa_\tau \eta_5 & e_6 \kappa_\tau \eta_6 \end{bmatrix}$$

[Formula 3]

$$\eta_i = \begin{cases} 1 & \text{(when normal)} \\ 0 & \text{(when fault)} \end{cases}$$

where i is a number of the rotary wing, $\sigma_T$ (sigma$_T$) is a mixing (control amount distribution) matrix integer parameter relating to a throttle amount (Thr), $\sigma_L$ (sigma$_L$) is a mixing (control amount distribution) matrix integer parameter relating to a roll (Roll) angle, $\sigma_M$ (sigma) is a mixing (control amount distribution) matrix integer parameter relating to a pitch (Pitch) angle, $\sigma N$ (sigma$_N$) is a mixing (control amount distribution) matrix integer parameter relating to a yaw (Yaw) angle, $\kappa_f$ (kappa$_f$) is a proportional constant of a thrust with respect to a square value of an angular speed $\omega$ (omega), $\kappa_\tau$ (kappa$_{tau}$) is a proportional coefficient ($\tau = \kappa_\tau \cdot \omega^2$) (tau=kappa$_{tau}$ multiplied by omega$^2$) of a square of a motor rotation angular speed and a torque ($\tau$: tau), l (ell) is a distance (length) between a gravity center of an aircraft body and a motor rotation axis, and f is a thrust.

In the aforementioned control device for an unmanned aircraft, the rotary-wing control signal generation circuit may be configured to generate a rotary-wing control signal for at least reducing a rotation speed of a rotary wing located on a side facing a rotary wing in which a fault in an operation is detected by the fault detection circuit in the plurality of rotary wings depending on a fault detected by the fault detection circuit in an operation of at least one of the plurality of rotary wings.

In the aforementioned control device for an unmanned aircraft, the rotary-wing control signal generation circuit may be configured to generate a rotary-wing control signal for stopping a rotation of a rotary wing located on a side facing a rotary wing in which a fault in an operation is detected by the fault detection circuit in the plurality of rotary wings depending on a fault detected by the fault detection circuit in an operation of at least one of the plurality of rotary wings.

In the aforementioned control device for an unmanned aircraft, the rotary-wing control signal generation circuit and the fault detection circuit may be configured as the same hardware.

In the aforementioned control device for an unmanned aircraft, it may be so configured that a signals indicating measured values of the respective physical amounts relating to an operation of at least one of the plurality of rotary wings are transmitted to the fault detection circuit via a common signal transmission path.

In the aforementioned control device for an unmanned aircraft, the driving device may include motors of the same number as the number of the rotary wings, each of the motors applies power to each of the rotary wings, the measuring device may be configured to measure at least one of: each voltage applied to each motor, each electric current flowing through each motor, and the number of rotations (rotational frequency) of each motor, and the fault detection circuit may be configured to detect a fault in an operation of at least one of the plurality of rotary wings by using each estimated value relating to each motor determined by using at least one of the each voltage, the each electric current, and the each number of rotations, measured by the measuring device and a comparison value to the each estimated value.

In the aforementioned control device for an unmanned aircraft, it may be so configured that, when no fault is detected by the fault detection circuit in any operation of the plurality of rotary wings, the rotary-wing control signal generation circuit determines a control command value for controlling angular speeds of the plurality of rotary wings from control command values for controlling a throttle amount, a roll angle, a pitch angle, and a yaw angle, and when a fault in an operation of at least one of the plurality of rotary wings is detected by the fault detection circuit, the rotary-wing control signal generation circuit determines a control command value at least for reducing the angular speed of a rotary wing, among the plurality of rotary wings, located on the side facing a rotary wing in which the fault in the operation is detected by the fault detection circuit, from control command values for controlling the throttle amount, the roll angle, and the pitch angle depending on the detected fault.

The aforementioned control device for an unmanned aircraft may further include a receiving device for receiving an external input signal indicating an external input command value in a reference coordinate system from an external input device, and when no fault is detected by the fault detection circuit in any operation of the plurality of rotary wings, the rotary-wing control signal generation circuit may be configured to determine control command values relating to the throttle amount, the roll angle, the pitch angle, and the yaw angle in the reference coordinate system by using the external input command value, to determine control command values relating to the throttle amount, the roll angle, the pitch angle, and the yaw angle in an aircraft body coordinate system of the unmanned aircraft from the control command values relating to the throttle amount, the roll angle, the pitch angle, and the yaw angle in the reference coordinate system, and to determine control command values relating to the angular speeds of the plurality of rotary wings by using the control command values relating to the throttle amount, the roll angle, the pitch angle, and the yaw angle in the aircraft body coordinate system, and when a fault in an operation of at least one of the plurality of rotary wings is detected by the fault detection circuit, the rotary-wing control signal generation circuit may be configured, depending on the detected fault, to determine control command values relating to the throttle amount, the roll angle, and the pitch angle in the reference coordinate system by using the external input command value, to determine control command values relating to the throttle amount, the roll angle, and the pitch angle in the aircraft body coordinate system of the unmanned aircraft from the control command values relating to the throttle amount, the roll angle, and the pitch angle in the reference coordinate system, and to determine a control command value at least for reducing the angular speed of a rotary wing, among the plurality of rotary wings, located on the side facing a rotary wing in which the fault in the operation is detected by the fault detection circuit by using the control command values relating to the throttle amount, the roll angle, and the pitch angle in the aircraft body coordinate system.

Moreover, the present invention provides an unmanned aircraft including any of the above control devices.

Moreover, the present invention provides a method for controlling an unmanned aircraft in which a physical amount relating to an operation of at least one of the plurality of rotary wings for flying the unmanned aircraft is measured, a fault in the operation of at least one of the plurality of rotary wings is detected by using the measured physical amount, and a rotary-wing control signal depending on the detected fault in the operation of at least one of the plurality of rotary wings is generated.

In the aforementioned method for controlling an unmanned aircraft, generation of the rotary-wing control signal may include changing of distribution amounts of control amounts corresponding to the respective ones of the plurality of rotary wings so that the unmanned aircraft performs the operation depending on the control amounts relating to the flight of the unmanned aircraft depending on the detected fault.

The aforementioned method for controlling an unmanned aircraft may include generation of the rotary-wing control signal at least for reducing the rotation speed of a rotary wing, among the plurality of rotary wings, located on the side facing a rotary wing in which the fault in the operation is detected, depending on the detected fault in an operation of at least one of the plurality of rotary wings.

Moreover, the present invention provides a control device of an unmanned aircraft including a rotary-wing control signal generation circuit for generating a rotary-wing control signal for causing a driving device to drive a plurality of rotary wings for flying the unmanned aircraft and a receiving device for receiving an external input signal indicating an external input command value in the reference coordinate system from an external input device, the rotary-wing control signal generation circuit is configured to determine control command values relating to a throttle amount, a roll angle, a pitch angle, and a yaw angle in the reference coordinate system by using the external input command value, to convert the control command values relating to the throttle amount, the roll angle the pitch angle, and the yaw angle in the reference coordinate system to the control command values relating to the throttle amount, the roll angle, the pitch angle, and the yaw angle in the aircraft body coordinate system, and to determine control command values relating to the angular speeds of the plurality of rotary wings from the control command values relating to the throttle amount, the roll angle, the pitch angle, and the yaw angle in the aircraft body coordinate system.

Moreover, the present invention provides a fault detecting device of an unmanned aircraft including a measuring device for measuring a physical amount relating to an operation of at least one of the plurality of rotary wings for flying the unmanned aircraft and a fault detection circuit for detecting a fault in the operation of at least one of the plurality of rotary wings by using the physical amount measured by the measuring device, and signals indicating measured values of the respective physical amounts relating to the operation of at least one of the plurality of rotary wings are transmitted to the fault detection circuit via a common signal transmission path.

Effects of Invention (Effect 1)

According to the present invention, in one example, a fault occurring in a plurality of actuator parts is detected, and a distribution amount of a control amount to the plurality of actuator parts can be changed so as to perform the operation according to the control signal in accordance with the detected fault. By configuring as above, since the control amount can be distributed appropriately to the plurality of actuator parts even if a fault occurs, inability of continuation of the operation when a fault occurs can be effectively suppressed.

(Effect 2)

Alternatively, by means of the present invention, in one example, a method for controlling a flight according to a fault when a fault occurs in an operation of a part of the plurality of rotary wings for flying the unmanned aircraft or a method for controlling which can be used at least at occurrence of a fault or a method for detecting a fault can be provided and thus, an operation of the unmanned aircraft according to the fault can be at least promoted.

BRIEF DESCRIPTION OF DRAWINGS

FIG. 1 is a perspective view of a small-sized helicopter according to an embodiment of the present invention.

FIG. 2 is a diagram illustrating a coordinate system of the small-sized helicopter in FIG. 1.

FIG. 3 is a diagram illustrating a configuration example of a system having fault tolerance.

DESCRIPTION OF EMBODIMENTS

Embodiment 1

Figure 4:
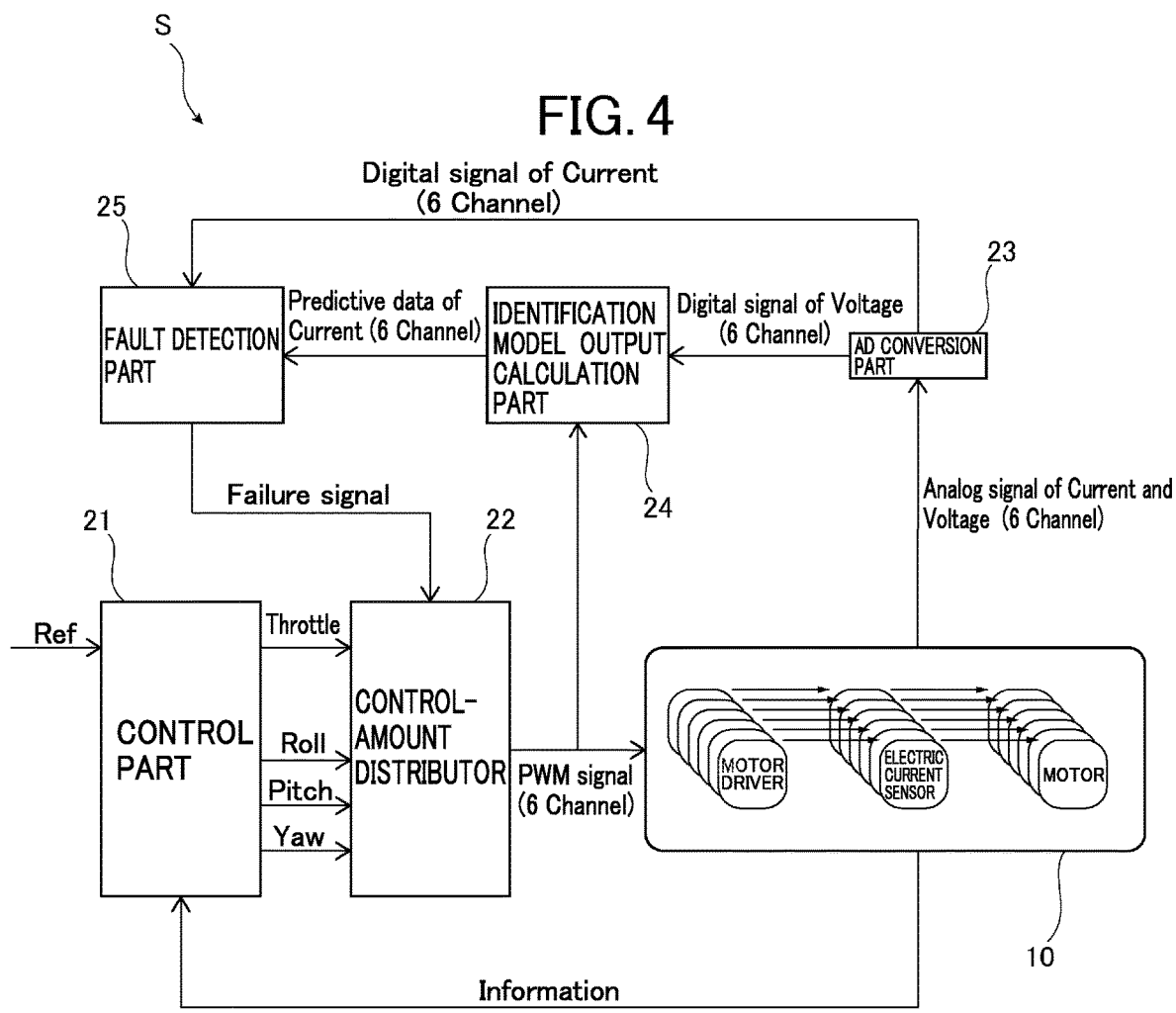
FIG. 4 illustrates schematic configuration of a fault tolerance control system of the small-sized helicopter.

Hereinafter, embodiments of the present invention will be described by referring to the attached drawings.

(Hardware Configuration of Small-Sized Helicopter)

FIG. 1 is a perspective (oblique) view of a small-sized helicopter according to the embodiment of the present invention. FIG. 2 is a view illustrating a coordinate system of the small-sized helicopter in FIG. 1.

As illustrated in FIG. 1, the small-sized helicopter 1 as a multirotor helicopter includes six rotor parts R1 to R6 as driving parts having a motor and a rotor (propeller, rotary wing) and a control unit 20 for controlling these rotor parts R1 to R6. The six rotor parts R1 to R6 are disposed radially around the control unit 20 and at an equal interval in a circumferential direction when the small-sized helicopter 1 is seen from above.

The control unit 20 has a microcomputer board for executing processing such as control calculation (operation), a gyro sensor, an inertial sensor (Inertial Measurement Unit), a GPS sensor, an air pressure sensor, a wireless modem for conducting data communication with a personal computer installed on the ground, a wireless control receiver for receiving a wireless control signal, a camera for aerial photography and the like. Moreover, the control unit 20 has a motor driver for driving each motor of the rotor parts R1 to R6, a photo interrupter for measuring the number of rotations of each motor, and an electric current sensor for measuring an electric current value supplied to each motor. The microcomputer board includes a microcomputer board for lower-level control and a microcomputer board for upper-level control in which an MCU (Micro Computer Unit) is mounted, respectively. The microcomputer board for lower-level control obtains an angular speed from the gyro sensor, executes feedback stabilization of the angular speed of an aircraft body of the small-sized helicopter 1 (hardware), transmits a control command value to six motor drivers so as to change the numbers of rotations of the rotors. The driver for controlling the numbers of rotations of the motors uses PID control. The microcomputer board for upper-level control executes calculation for autonomous control of the aircraft body. Moreover, the control unit 20 controls the rotor parts R1 to R6 so that the aircraft body performs the operation according to a control signal based on the autonomous control.

As illustrated in FIG. 2, a fixed coordinate system of the aircraft body has an aircraft body front (front) as an X-axis, a right direction (right) as a Y-axis, and a lower direction (gravity direction) as a Z-axis. A roll (Roll) refers to a tilt of the aircraft body with the X-axis as an axis, a pitch (Pitch) is a tilt of the aircraft body with the Y-axis as an axis, and a yaw (Yaw) is a tilt of the aircraft body with the Z-axis as an axis.

The small-sized helicopter 1 has four control amounts, that is, a throttle, a roll, a pitch, and a yaw, and six rotor parts R1 to R6, that is, six motors which are actuators. A system having the number of the actuators larger than the control amount as this is called a redundant system. Some of the redundant systems can maintain the system in a controllable state even if a fault occurs in a part of the plurality of actuators, and the small-sized helicopter 1 can maintain the controllable state even if a fault occurs in a part of the rotor parts R1 to R6 in some cases.

Table 1 illustrates an example of specifications (Specifications) of the small-sized helicopter 1 of this embodiment.

TABLE 1

| Specifications | Value |
| --- | --- |
| Fuselage mass (Without battery) | 2412 g |
| Dimensions (With propeller) | (L) 815 mm × (W) 738 mm × (H) 344 mm |
| Dimensions (Without propeller) | (L) 593 mm × (W) 516 mm × (H) 344 mm |
| Propeller diameter | 10 inchles (254 mm) |
| Battery type | Li-po 11.1 V (6 cell) 4500 mAh 25 C. |
| Battery mass | 886 g |
| Payload | Approx. 2200 g |
| Flight time (No payload) | 20 min 30 sec |

(Outline of Fault Tolerance Control)

FIG. 3 illustrates a configuration example of a system having fault tolerance. Such a system is called a failsafe system. This system has an execution level (execution layer) EL (Execution Level) and a supervision level (monitoring layer) SL (Supervision Level).

The execution level EL has a control part D1 (controller) and an aircraft body D2 (Plant). The control part D1 receives inputs of a reference signal $y_{ref}$ and an output value y of the aircraft body D2 and sends a control signal u according to these inputs to the aircraft body D2. The aircraft body D2 receives inputs of the control signal u as well as of a failure factor f and a disturbance factor d and outputs the output value y according to these inputs. And this output value y is input into the control part D1, whereby the control part D1 executes feedback control using the output value y.

The supervision level SL has a monitoring part D3 (Diagnosis) and a controller redesign part D4 (Controller re-design). Roles of these two parts are the following (1) and (2).

(1) The monitoring part D3 monitors presence of a failure on the basis of these output values on the premise that the output value y of the aircraft body D2 to the input is matched with (accords with) the output value of an actual aircraft model to the control signal u. An output f of the monitoring part D3 (that is, the failure factor f) becomes an input of the controller redesign part D4 including failure information of the aircraft body D2.

(2) The controller redesign part D4 designs the control part D1 of the system into an optimal control system at all times by using the failure information included in the output f of the monitoring part D1.

(Fault Tolerance Control System)

FIG. 4 illustrates schematic configuration of the system mounted on the small-sized helicopter 1 of this embodiment. In the system S illustrated in FIG. 4, fault detection of the electric current model base is conducted. In the fault detection of the electric current model base, data processing of each sensor and calculation based on model data are executed by a microcomputer mounted on the microcomputer board and more specifically, measurement of six independent electric current values and calculation of the fault detection are conducted.

In this system S, the electric current value supplied to each motor of the rotor parts R1 to R6 which are driving system circuits can be a parameter for examining a state whether the rotor parts R1 to R6 are normal or not, and if abnormality in the motor or a damage on a propeller or the like occurs, for example, an abnormal fluctuation appears in the electric current value. Therefore, the fault detection can be made by using the electric current value supplied to each motor of the rotor parts R1 to R6.

This system S has an aircraft body 10 which is hardware of the small-sized helicopter 1, a control part 21 realized by the control unit 20, a control-amount distributor 22, an AD conversion part 23, an identification model output calculation part 24, and a fault detection part 25.

The control part 21 has a reference signal (Ref) which is a control command for an autonomous flight input and outputs a control signal indicating each control amount of a throttle (Throttle), a roll (Roll), a pitch (Pitch), and a yaw (Yaw) on the basis of this reference signal to the control-amount distributor 22. Moreover, the control part 21 executes feedback control by using operation information (Information) of the aircraft body 10 such as position information, altitude information, acceleration information and the like.

The control-amount distributor 22 generates a PWM signal (PWM signal) by distributing each control amount in order to have a thrust and an aircraft body attitude indicated by each control amount of the throttle, the roll, the pitch, and the yaw and supplies it to the six motors through the motor drivers. This PWM signal is also sent of the identification model output calculation part 24 which will be described later. Details of the control-amount distributor 22 will be described later.

The AD conversion part 23 converts analog signals indicating a electric current value output from the electric current sensor and a battery voltage output from the voltage sensor, not shown, (Analog signal of Current and Voltage) to digital signals. The AD conversion part 23 transmits the digital signal (Digital signal of Voltage; hereinafter, referred to simply as a "voltage signal") indicating the voltage value to the identification model output calculation part 24 and transmits the digital signal indicating the electric current value (Digital signal of Current; hereinafter, referred to simply as a "electric current signal") to the fault detection part 25.

The identification model output calculation part 24 configures an identification model of the small-sized helicopter 1 inside, receives inputs of the PWM signal and the voltage signal based on the control signal, and calculates an electric current value (Predictive data of current) of the identification model of the small-sized helicopter 1. A signal indicating the electric current value of the identification model calculated by the identification model output calculation part 24 is sent to the fault detection part 25.

Here, the identification model will be discussed.

If a model which outputs an electric current value equal to that of an actual aircraft to the PWM signal input in a normal flight state can be estimated, states of the motor and the rotor can be also monitored by comparing the electric current value on calculation output by this model and the actually measured electric current value.

Assuming that the voltage v, the electric current i, and the angular speed $\omega$ (omega: the number of rotations of motor) are quantities of state of the motor and that a function reflecting the state of the motor is $\Psi$ (psi), $\Psi$ (psi) can be expressed by the following equation:

[Formula 4]

$$\omega(v,i,\omega)=0 \quad (1)$$

Then, a relationship between the PWM signal output from the control-amount distributor 22 and the number of rotations of a motor in a transmission function is linear. From the analysis described above, $\Psi$ (psi) can be expressed by the following equation:

[Formula 5]

$$\omega(v,i,\omega)=\omega(v,i,\mu\omega)=\omega(v,i,\text{PWM})=0 \quad (2)$$

where $\mu$ (mu) is a proportional coefficient (duty=$\mu\omega$) (duty=mu multiplied by omega) between the number of rotations $\omega$ (omega) and a duty ratio of PWM.

When inverse conversion is executed for this equation, the electric current i can be expressed by the following equation:

[Formula 6]

$$i=\psi^{-1}(v,\text{PWM}) \quad (3)$$

In the aforementioned system, the number of rotations of the motor is measured by using a photo interrupter, and the electric current value supplied to the motor is measured by using the electric current sensor. When a battery is used for a power supply, since the voltage lowers with time at measurement of the electric current value, the battery voltage is measured, and the electric current value is measured by considering its influence.

Figure 5:
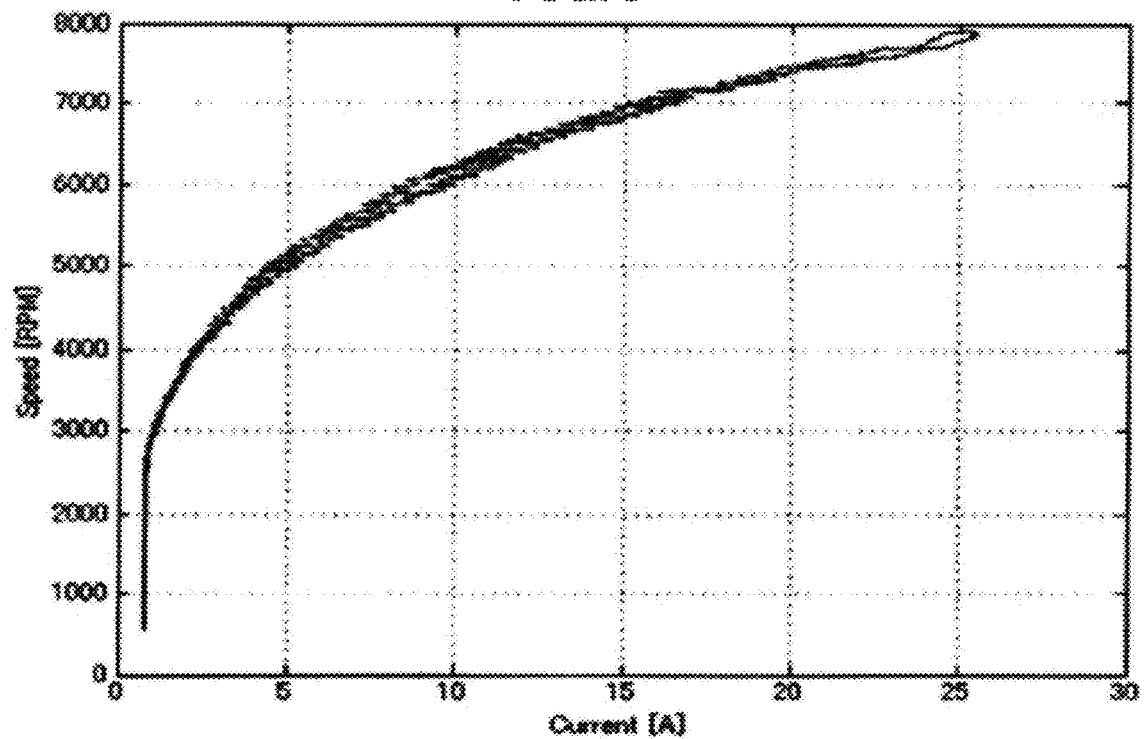
FIG. 5 is a graph illustrating a relationship between an electric current value supplied to a motor actually measured in the small-sized helicopter and the number of rotations of the motor.

FIG. 5 illustrates a relationship between the electric current value (Current) supplied to the motor and actually measured in the small-sized helicopter 1 and the number of rotations (Speed) of the motor. A relationship between the electric current value and the number of rotations is expressed by an exponential function from FIG. 5. And the inventors acquired a coefficient regulating these relationships from the measurement results of the electric current value and the number of rotations. By acquiring linearization coefficients of the PWM signal and the number of rotations of a motor by this, $\Psi^{-1}$ (psi$^{-1}$) can be acquired. An example of an electric current reference model which is the identification model in the small-sized helicopter 1 is illustrated in the following equation (4):

[Formula 7]

$$i=\left[\left(\frac{PWM}{3120}\right)^{\frac{1}{0.2596}}+1.45\right]\times235-341.1+(v-12.2)\times6.3 \quad (4)$$

The identification model output calculation part 24 calculates the electric current value of the identification model of the small-sized helicopter 1 by using the aforementioned equation.

The fault detection part 25 detects a fault by comparing the electric current value calculated by the identification model output calculation part 24 (output value of the identification model) and the electric current value actually measured and indicated by the electric current signal (output value of the aircraft body).

The faults assumed in this system S are two types, that is, a failure in the motor driver and the motor and damage on the rotor (propeller).

If a failure occurs in the motor, for example, a coefficient steady amount (that is, the motor characteristic) of the motor is changed, and the function $\Psi$ (psi) itself reflecting the state of the motor is also changed. Moreover, if the rotor is damaged, a torque is rapidly changed, and the electric current value is made smaller. Therefore, since the electric current value acquired by the function $\Psi$ (psi) and the actually measured electric current value are matched (accord) in the normal time and are not matched (do not accord) at occurrence of a fault by using the function $\Psi$ (psi) reflecting the motor state in the normal time (that is, the identification model), occurrence of a fault can be detected from this result. And the fault detection part 25 stops the motor in which the fault occurred.

The fault detection part 25 sends an output signal indicating a fault state (Failure signal) to the control-amount distributor 22.

The aforementioned control-amount distributor 22 adjusts distribution of each control amount of the throttle, the roll, the pitch, and the yaw to the rotor parts R1 to R6 in order to re-arrange a lift required for maintaining a flight and an anti-torque in accordance with the fault state indicated by the signal sent from the fault detection part 25. A distribution algorithm in the control-amount distributor 22 will be described below.

Figure 6:
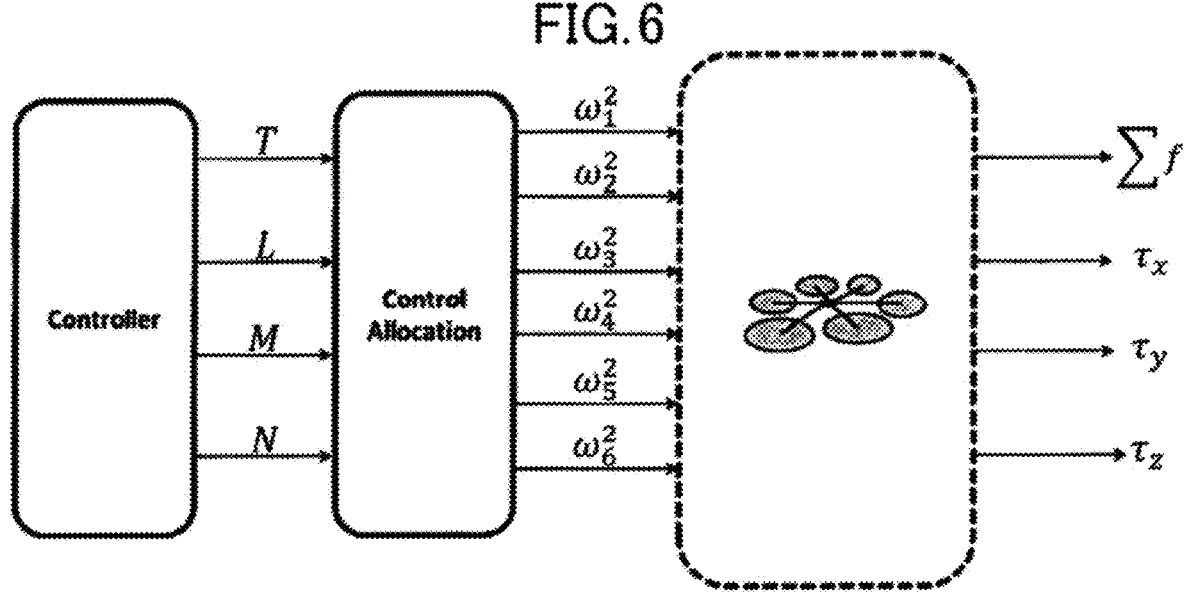
FIG. 6 is a diagram illustrating a control amount distribution image of the small-sized helicopter.

FIG. 6 illustrates a control-amount distribution image of the small-sized helicopter 1. Each control amount input from the control part 21 (Controller) is distributed by the control-amount distributor 22 (Control Allocation) and becomes a control signal indicating a square value of the angular speed $\omega$ (omega) of each of the motors of the rotor parts R1 to R6. The thrust of each of the rotor parts R1 to R6 is in proportion to the square value of the angular speed $\omega$ (omega) of each of the motors. The angular speed $\omega$ (omega) has a relationship with the PWM signal. When these control signals are input into the aircraft body 10 indicated by a dotted line, a total thrust $\Sigma f$ (Sigma f) as an operation state of the aircraft body 10, a roll tilt angle $\tau_x$ (tau$_x$), a pitch tilt angle $\tau_y$ (tau$_y$), and a yaw tilt angle $\tau_z$ (tau$_z$), are obtained. This algorithm distributes each control amount so that more appropriate operation is made possible in accordance with a fault occurrence state of each of the rotor parts R1 to R6.

A control input vector u is expressed by the following equation:

[Formula 8]

$$\vec{u} = \begin{bmatrix} u_{Throttle} \\ u_{Roll} \\ u_{Pitch} \\ u_{Yaw} \end{bmatrix} = \begin{bmatrix} T \\ L \\ M \\ N \end{bmatrix} \quad (5)$$

The control-amount distribution matrix M is expressed by the following equation:

[Formula 9]

$$M \begin{bmatrix} T \\ L \\ M \\ N \end{bmatrix} = \begin{bmatrix} \omega_1^2 \\ \omega_2^2 \\ \omega_3^2 \\ \omega_4^2 \\ \omega_5^2 \\ \omega_6^2 \end{bmatrix} \quad (6)$$

On the other hand, an aircraft-body operation state matrix Mb (hereinafter, those having bars above M in the formula are expressed as "Mb" in the Description) for calculating the operation state of the aircraft body with respect to the input of the square value of the angular speed is expressed by the following equation:

[Formula 10]

$$\overline{M} \begin{bmatrix} \omega_1^2 \\ \omega_2^2 \\ \omega_3^2 \\ \omega_4^2 \\ \omega_5^2 \\ \omega_6^2 \end{bmatrix} = \begin{bmatrix} \sum f \\ \tau_x \\ \tau_y \\ \tau_z \end{bmatrix} \quad (7)$$

This Mb is expressed by the following equation from the output and arrangement of the rotor parts R1 to R6:

[Formula 11]

$$\overline{M} = \begin{bmatrix} \kappa_f & \kappa_f & \kappa_f & \kappa_f & \kappa_f & \kappa_f \\ \dfrac{\kappa_f l}{2} & \kappa_f l & \dfrac{\kappa_f l}{2} & \dfrac{-\kappa_f l}{2} & -\kappa_f l & \dfrac{-\kappa_f l}{2} \\ \dfrac{\sqrt{3}\kappa_f l}{2} & 0 & \dfrac{-\sqrt{3}\kappa_f l}{2} & \dfrac{-\sqrt{3}\kappa_f l}{2} & 0 & \dfrac{\sqrt{3}\kappa_f l}{2} \\ e_1\kappa_\tau & e_2\kappa_\tau & e_3\kappa_\tau & e_4\kappa_\tau & e_5\kappa_\tau & e_6\kappa_\tau \end{bmatrix} \quad (8)$$

where $\kappa_f$ (kappa$_f$) is the proportional constant of the thrust with respect to the square value of the angular speed ω (omega), $\kappa_\tau$ (kappa$_{tau}$) is a proportional coefficient ($\tau=\kappa_\tau\cdot\omega^2$) (tau=kappa$_{tau}$ multiplied by omega$^2$) of a square of the motor rotation angular speed and the torque (τ: tau), f is the thrust, l (ell) is a distance (length) between the gravity center of the aircraft body and the motor rotation axis, and $e_1$ to $e_6$ are propeller rotation directions (+/−1, namely plus/minus 1).

Fault elements $\eta_i$ (eta$_i$: i=1 to 6) of the rotor parts R1 to R1 are expressed by the following equation:

[Formula 12]

$$\eta_i = \begin{cases} 1, & \text{Normal} \\ 0, & \text{Fail} \end{cases} \quad (9)$$

The fault element $\eta_i$ (eta$_i$) is included in a fault state indicated by the signal sent from the fault detection part 25. And by including the failure situation of the rotor parts R1 to R1 in the aircraft-body operation state matrix Mb, the following equation is obtained:

[Formula 13]

$$\overline{M} = \begin{bmatrix} \kappa_f \eta_1 & \kappa_f \eta_2 & \kappa_f \eta_3 & \kappa_f \eta_4 & \kappa_f \eta_5 & \kappa_f \eta_6 \\ \dfrac{\kappa_f l \eta_1}{2} & \kappa_f l \eta_2 & \dfrac{\kappa_f l \eta_3}{2} & \dfrac{-\kappa_f l \eta_4}{2} & -\kappa_f l \eta_5 & \dfrac{-\kappa_f l \eta_6}{2} \\ \dfrac{\sqrt{3}\kappa_f l \eta_1}{2} & 0 & \dfrac{-\sqrt{3}\kappa_f l \eta_5}{2} & \dfrac{-\sqrt{3}\kappa_f l \eta_4}{2} & 0 & \dfrac{\sqrt{3}\kappa_f l \eta_6}{2} \\ e_1\kappa_\tau \eta_1 & e_2\kappa_\tau \eta_2 & e_3\kappa_\tau \eta_3 & e_4\kappa_\tau \eta_4 & e_5\kappa_\tau \eta_5 & e_6\kappa_\tau \eta_6 \end{bmatrix} \quad (10)$$

The following equation is obtained by organizing the aforementioned equations:

[Formula 14]

$$\overline{M}(\eta_i)M \begin{bmatrix} T \\ L \\ M \\ N \end{bmatrix} = \begin{bmatrix} \sum f \\ \tau_x \\ \tau_y \\ \tau_z \end{bmatrix} \quad (11)$$

And when a control re-distribution matrix at a failure is calculated by using a pseudo inverse matrix, the following equation is obtained as the control-amount distribution matrix M:

[Formula 15]

$$M = \overline{M}(\eta_i)^T \left( \overline{M}(\eta_i) \overline{M}(\eta_i)^T \right)^{-1} \begin{bmatrix} \sigma_T & 0 & 0 & 0 \\ 0 & \sigma_L & 0 & 0 \\ 0 & 0 & \sigma_M & 0 \\ 0 & 0 & 0 & \sigma_N \end{bmatrix} \quad (12)$$

where $\sigma_T$ (sigma$_T$) is the mixing (control amount distribution) matrix integer parameter relating to the throttle amount (Thr), $\sigma_L$ (sigma$_L$) is the mixing (control amount distribution) matrix integer parameter relating to the roll (Roll) angle, $\sigma_M$ (sigma$_M$) is the mixing (control amount distribution) matrix integer parameter relating to a pitch (Pitch) angle, and $\sigma_N$ (sigma$_N$) is the mixing (control amount distribution) matrix integer parameter relating to the yaw (Yaw) angle.

The aforementioned control-amount distributor 22 executes distribution of each control amount by using the distribution algorithm expressed in this control-amount distribution matrix M considering the fault element $\eta_i$ (eta$_i$).

(Verification of Fault Detection)

Subsequently, an experiment was conducted to detect a motor failure (fault) by changing the number of rotations of the motor by applying an external force to the rotor in a state where the motors of the rotor parts R1 to R6 are rotated at a constant speed by using the small-sized helicopter 1 in this embodiment.

First, verification of a model expressed in the equation (4) was made for two states, that is, a case where the small-sized helicopter 1 of this embodiment is hovering and a case where it repeats rising and lowering.

Here, the fault detection is realized by using a root-mean-square method. The root-mean-square method is as in the following equation:

[Formula 16]

$$\delta = \sqrt{\frac{\sum_{i=1}^{t \times 200} \Delta I^2}{t \times 200}} \quad (13)$$

[Formula 17]

$$\Delta I = I_{Model} - I_{Real} \quad (14)$$

where t expresses flight time (seconds), $I_{Model}$ expresses an electric current value calculated from the identification model of the motor, $I_{Real}$ expresses the actually measured electric current value. A fault detection program measures the electric current value at a rate of 200 samples/second. When there is no failure in the motor, fluctuation of $\delta$ (delta) is smaller than a threshold value $\delta_{max}$ (delta$_{max}$) but if a failure occurs, $\delta$ (delta) becomes $\delta_{max}$ (delta$_{max}$) or more. Thus, as indicated in the following equation, when $\delta$ (delta) is the threshold value $\delta_{max}$ (delta$_{max}$) for determining a failure, it is determined that a motor failure occurred. This threshold value is determined from measurement results using the actual aircraft and simulation results.

[Formula 18]

$$\delta \geq \delta_{max} \quad (15)$$

Figure 7:
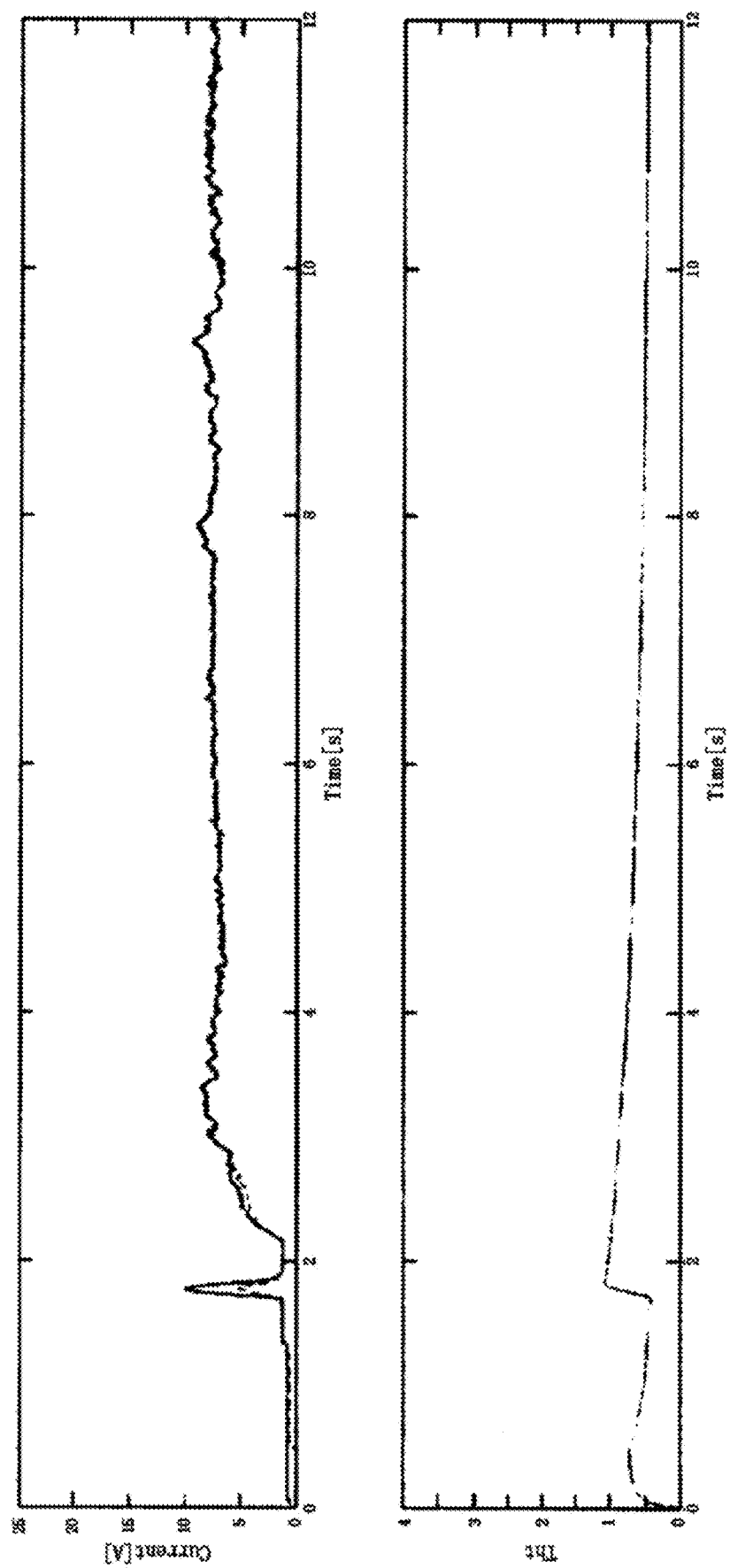
FIG. 7 is a graph illustrating a deviation value (Tht) between an electric current value (Current) when a rotor part of the small-sized helicopter is hovering in a normal state as well as an estimated electric current value and an actual electric current value.
Figure 8:
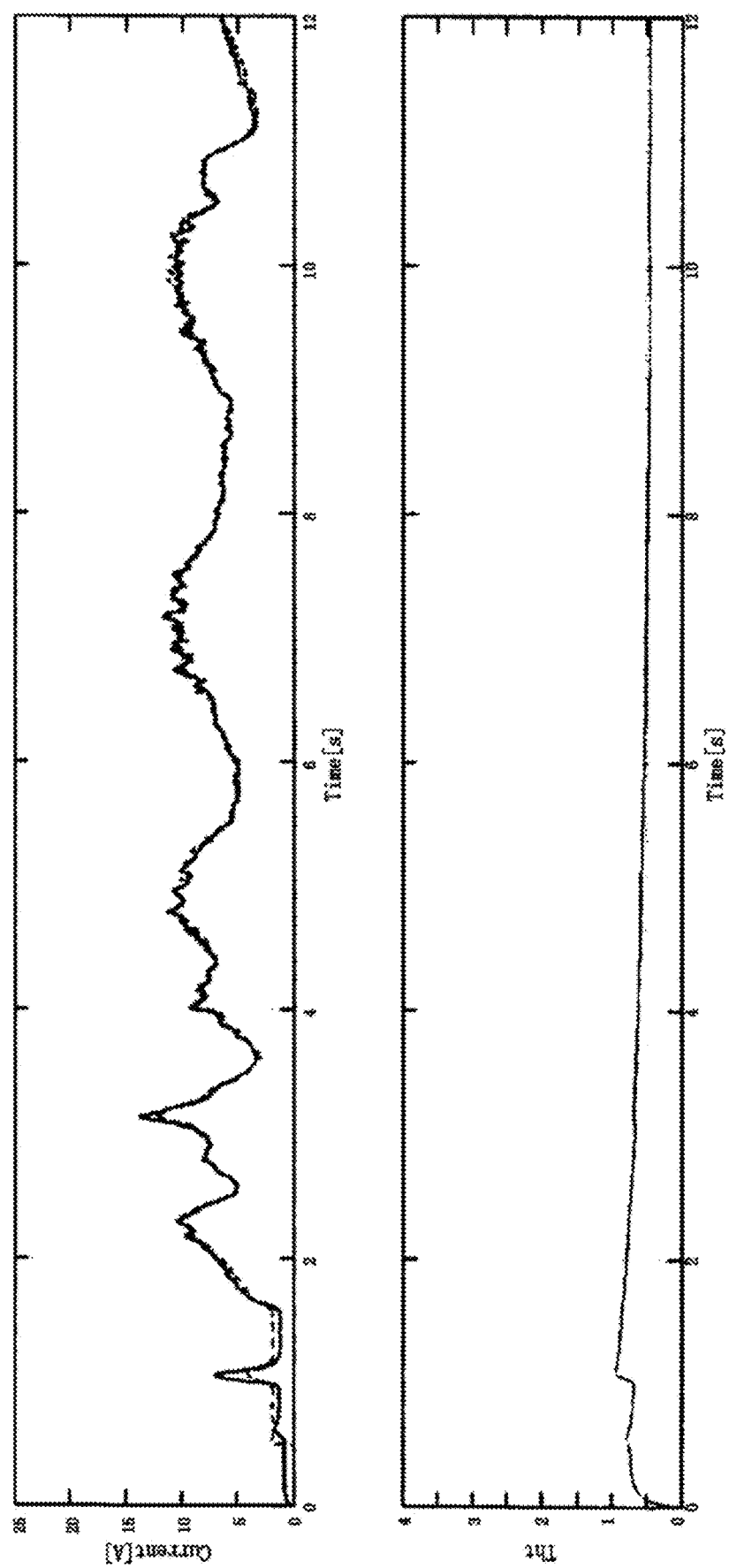
FIG. 8 is a graph illustrating a deviation value (Tht) between a electric current value (Current) when the rotor part of the small-sized helicopter is repeating rising and lowering in the normal state as well as the estimated electric current value and the actual electric current value.
Figure 9:
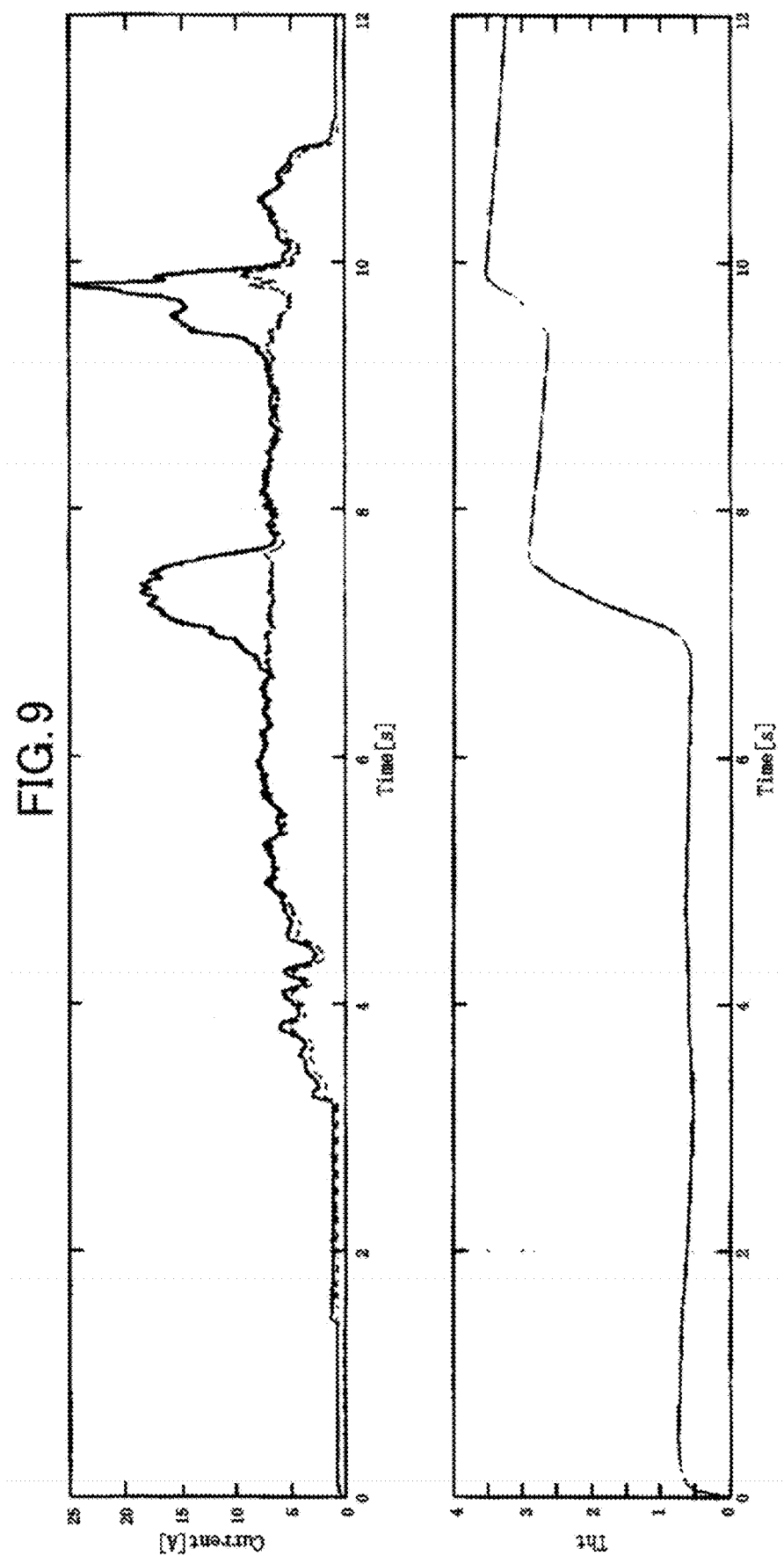
FIG. 9 is a graph illustrating a deviation value (Tht) between an electric current value (Current) when a fault occurs in the rotor part of the small-sized helicopter (state where the rotor is pressed by a hand) as well as the estimated electric current value and the actual electric current value.

Verification results are illustrated in FIGS. 7 to 9. FIG. 7 is a graph illustrating the electric current value (Current) when the rotor part of the small-sized helicopter is hovering in the normal state, and the deviation value (Tht) between the estimated electric current value and the actual electric current value. FIG. 8 is a graph illustrating the electric current value (Current) when the rotor part of the small-sized helicopter is repeating rising and lowering in the normal state, and the deviation value (Tht) between the estimated electric current value and the actual electric current value. FIG. 9 is a graph illustrating the electric current value (Current) when a fault occurs in the rotor part of the small-sized helicopter (the rotor is pressed by a hand), and the deviation value (Tht) between the estimated electric current value and the actual electric current value.

In the graphs of the electric current values in FIGS. 7 to 9, a solid line indicates the actually measured electric current value, and a dotted line indicates the electric current value calculated from the identification model. As illustrated in FIGS. 7 and 8, when the rotor part is normal and a fault does not occur, the actually measured electric current value and the electric current value calculated from the identification model are substantially matched (substantially accord) with each other, and a deviation value between the estimated electric current value and the actual electric current value keeps a relatively small value. On the other hand, as illustrated in FIG. 9, when a fault occurs in the rotor part, a difference is generated in magnitudes of the actually measured electric current value and the electric current value calculated from the identification model (at 7 to 8 seconds, 9 to 10 seconds), and the deviation value between the estimated electric current value and the actual electric current value largely rises each time when the difference is generated in each of the electric current values.

As described above, it was made clear that presence of the fault in the rotor parts R1 to R6 of the small-sized helicopter 1 can be determined by a change in the electric current value.

(Rotor Rotation Direction and Controllability)

Subsequently, a rotation direction of each of the rotor parts R1 to R1 of the small-sized helicopter 1 and fault tolerance (controllability) will be discussed.

When a fault in the driving system occurs during a flight of the small-sized helicopter 1, a case where an attitude of the aircraft body can be controlled (controllable) due to a situation of the fault in the driving system and a case where the attitude of the aircraft body cannot be controlled (uncontrollable) can be considered. In which of the rotor part in the rotor parts R1 to R6 the fault occurred can be grasped by the output signal of the fault detection part 25 of the small-sized helicopter 1. Controllability when a fault occurred is different depending on the rotation direction of each of the rotor parts R1 to R6.

(1) Asymmetric Rotation Method

Figure 10:
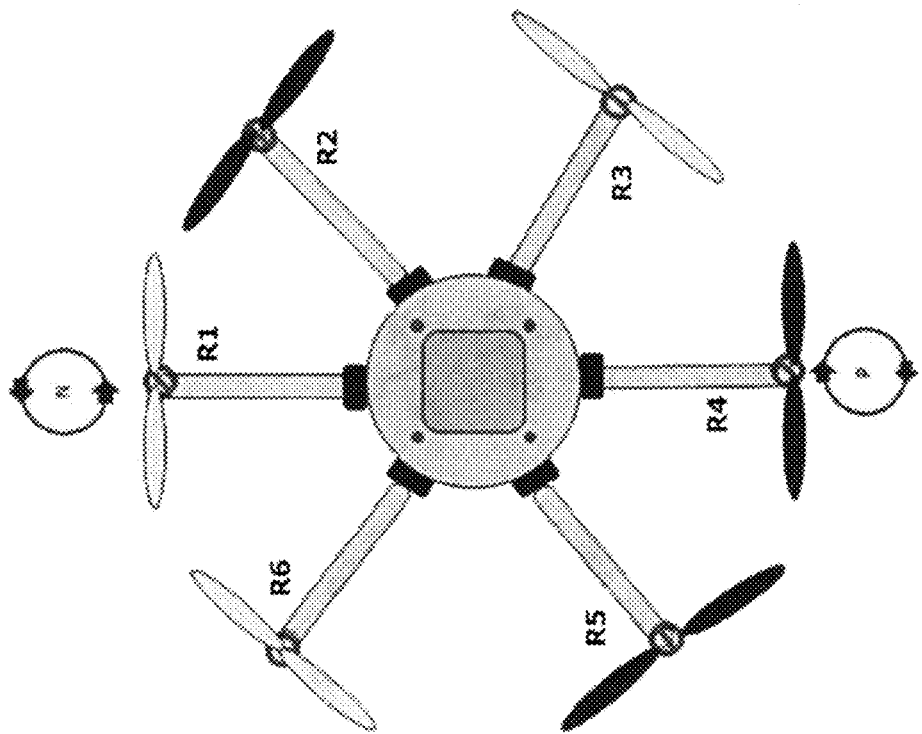
FIG. 10 is a diagram illustrating configuration employing an asymmetric rotation method in the small-sized helicopter.

FIG. 10 illustrates configuration employing an asymmetric rotation method in the small-sized helicopter 1. In FIG. 10, black rotors make forward rotation (clockwise when seen from above), and gray rotors make backward rotation (counterclockwise when seen from above). In the small-sized helicopter 1 in FIG. 10, the forward-rotation rotor parts R2, R4 and R5 are not aligned alternately in the circumferential direction with the backward-rotation rotor parts R1, R3, and R6, and they are disposed asymmetrically. In the configuration employing this asymmetric rotation method, if any one of the rotor parts R1 and R4 to R5 is stopped, all the three axes (roll, pitch, yaw) of the aircraft body become controllable. However, if the rotor part R2 or R3 is stopped, only two axes (roll, pitch) of the aircraft body are controllable. In the configuration using this asymmetric rotation method, even if some rotor part is stopped, autonomous flight can be continued by executing the optimal control amount distribution according to the state in some cases. In this case, automatic landing or autonomous return to a take-off point of the small-sized helicopter 1 is also possible.

(2) Symmetric Rotation Method

Figure 11:
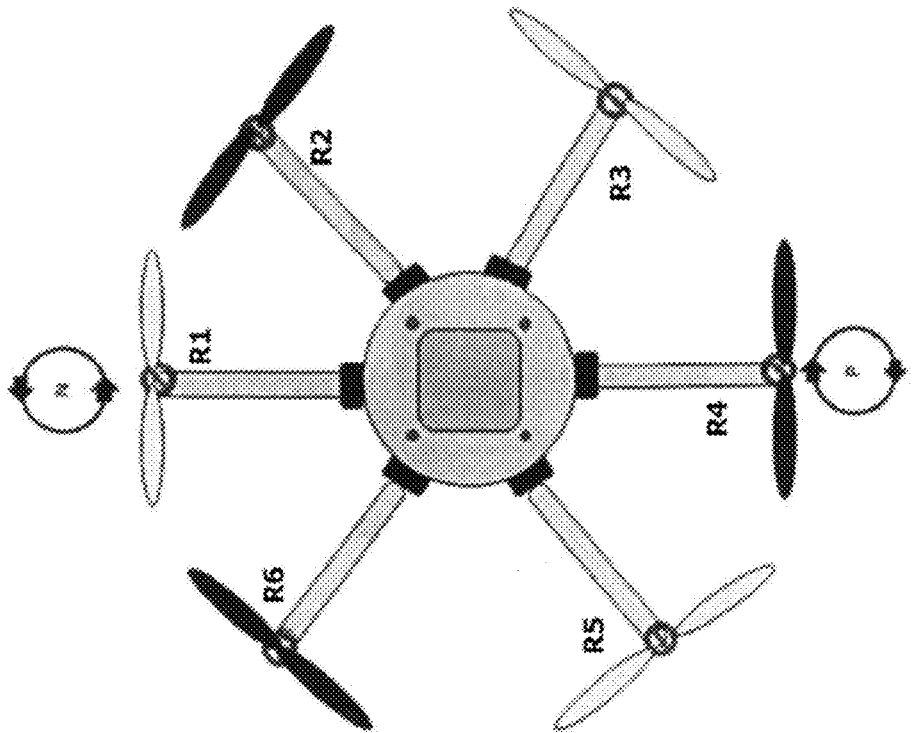
FIG. 11 is a diagram illustrating configuration employing a symmetric rotation method in the small-sized helicopter.

FIG. 11 illustrates configuration employing a symmetric rotation method in the small-sized helicopter 1. In FIG. 11, similarly to the above, the black rotors make forward rotation and the gray rotors make backward rotation. In the small-sized helicopter 1 in FIG. 11, the forward-rotation rotor part R2, R4 and R6 and the backward-rotation rotor parts R1, R3, and R5 are aligned alternately in the circumferential direction, and they are disposed symmetrically. In the configuration employing this symmetric rotation method, if any one of the rotor parts R1 to R6 is stopped, at least one axis (yaw) of the aircraft body becomes uncontrollable.

On the basis of the discussion results of the aforementioned rotation methods in (1) and (2), a fault tolerance control operation by the control amount re-distribution was verified below when faults in the rotor part R1 and the rotor part R5 were detected by using the configuration employing the (1) asymmetric rotation method in the small-sized helicopter 1.

(Verification of Fault Tolerance Control Operation)

First, in order to verify the fault tolerance control operation by the control amount re-distribution by a manual operation (manual mode), an input control amount based on an operation input command to a maneuvering device (propo.) and an actually measured angular speed actually measured in the aircraft body were compared.

Figure 12:
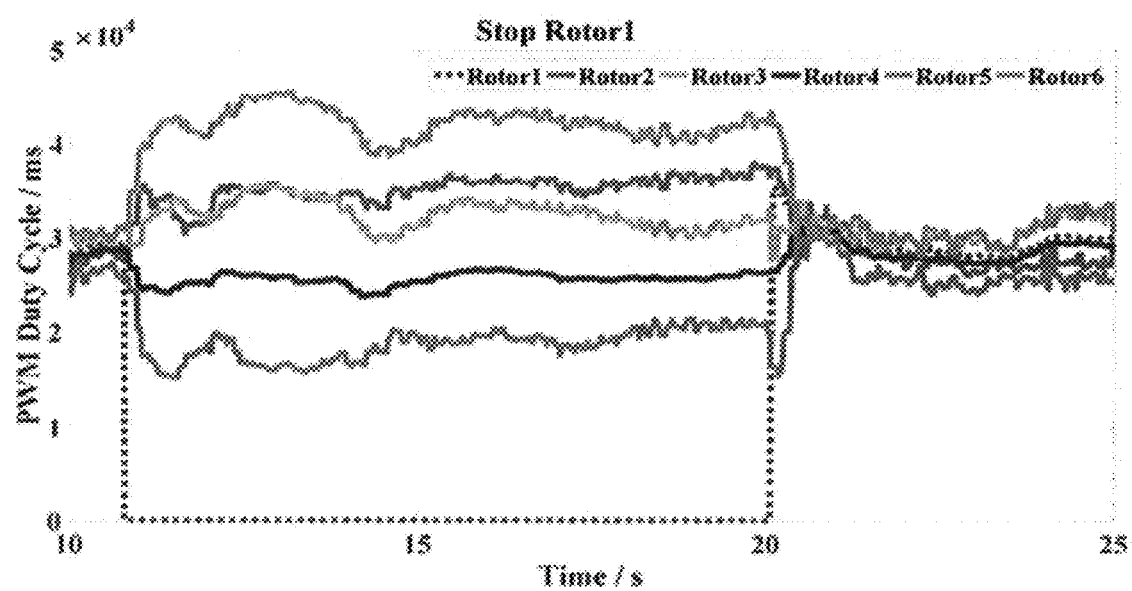
FIG. 12 is a graph illustrating a duty cycle of a PWM signal to each rotor part when a rotor part R1 is stopped during a manual operation.
Figure 13:
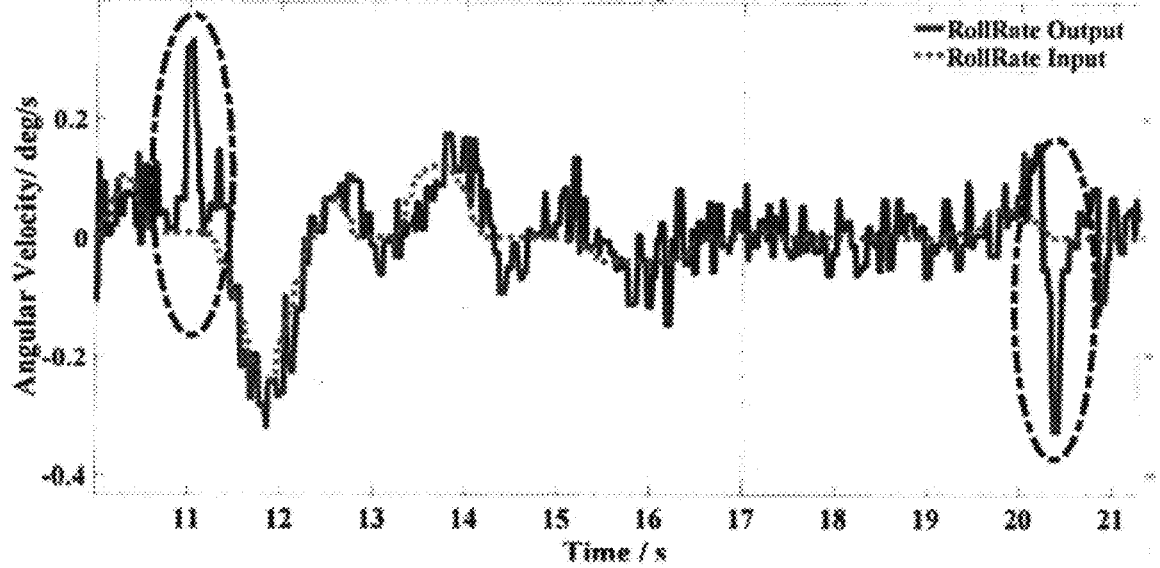
FIG. 13 is a graph illustrating a roll angle speed of an aircraft body when the rotor part R1 is stopped during the manual operation.
Figure 14:
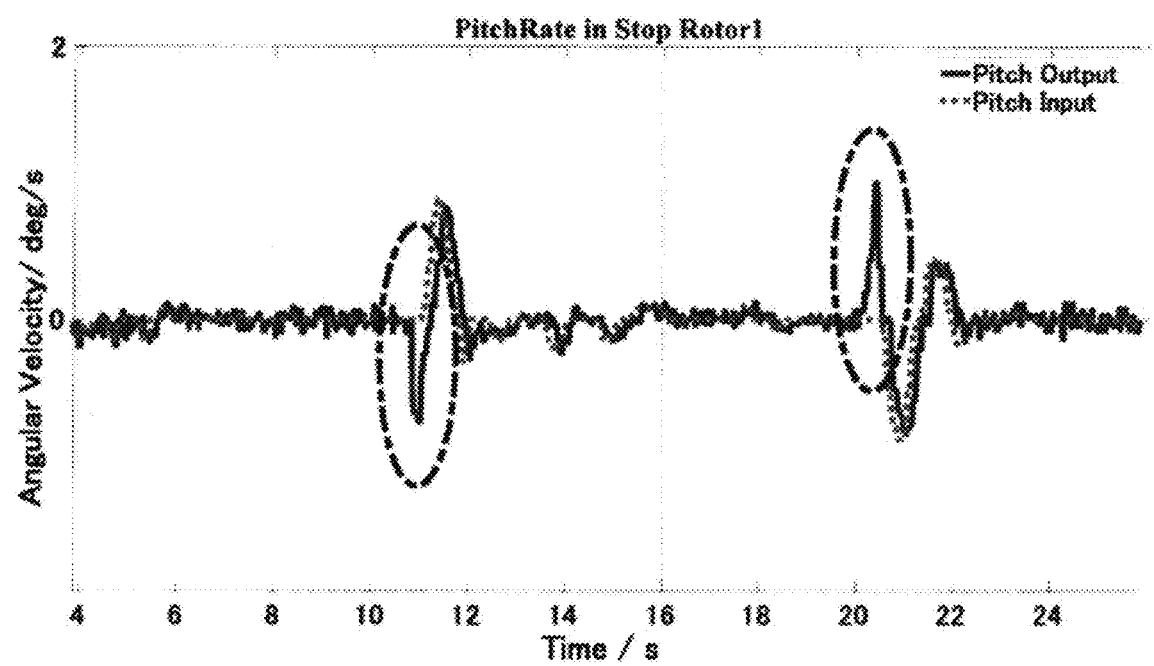
FIG. 14 is a graph illustrating a pitch angle speed of an aircraft body when the rotor part R1 is stopped during the manual operation.
Figure 15:
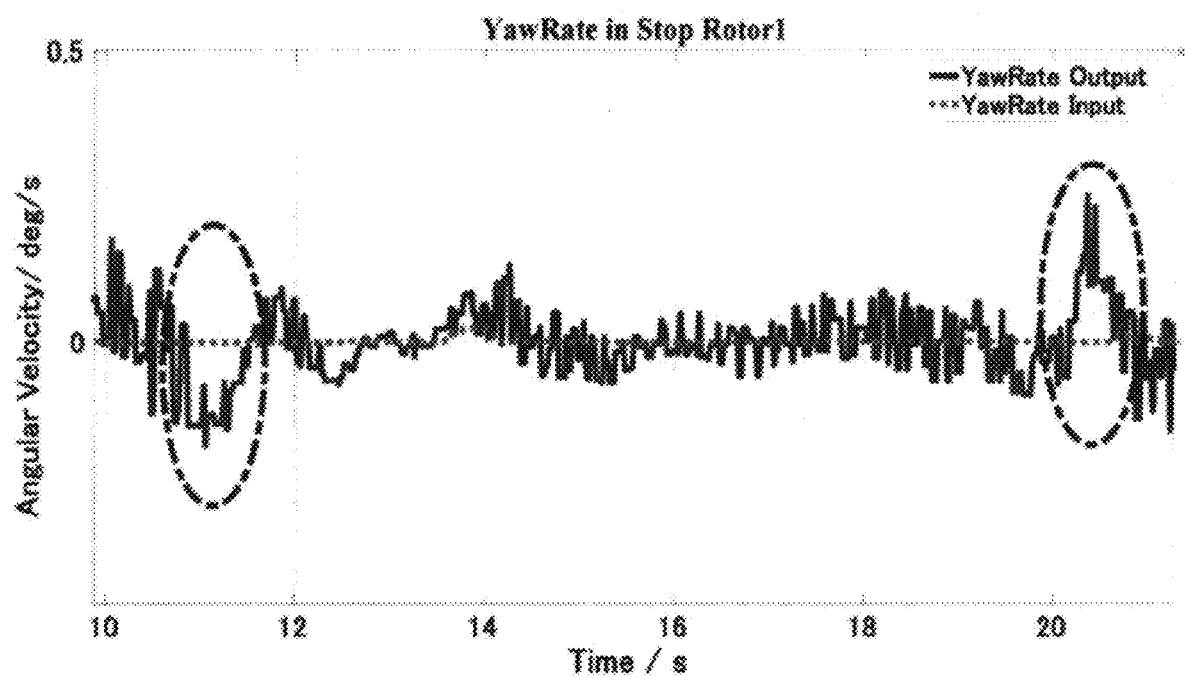
FIG. 15 is a graph illustrating a yaw angle speed of an aircraft body when the rotor part R1 is stopped during the manual operation.

A case where the rotor part R1 is stopped is illustrated in FIGS. 12 to 15. FIG. 12 illustrates a duty cycle of the PWM signal to each of the rotor parts R1 to R6. As illustrated in FIG. 12, the rotor part R1 is stopped at 11 seconds, and the rotor part R1 is re-started at 20 seconds. FIGS. 13 to 15 illustrate the roll angular speed, the pitch angular speed, and the yaw angular speed in order. In FIGS. 13 to 15, a dotted line indicates an input control amount (Input) and a solid line indicates an actually measured angular speed (Output).

Figure 16:
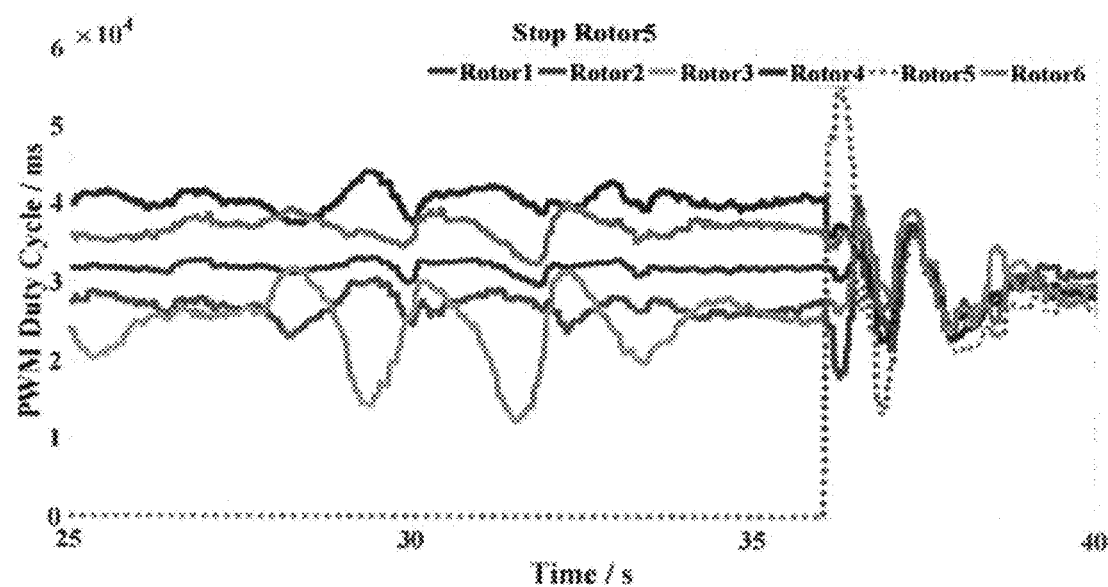
FIG. 16 is a graph illustrating a duty cycle of the PWM signal to each rotor part when a rotor part R5 is stopped during the manual operation.
Figure 17:
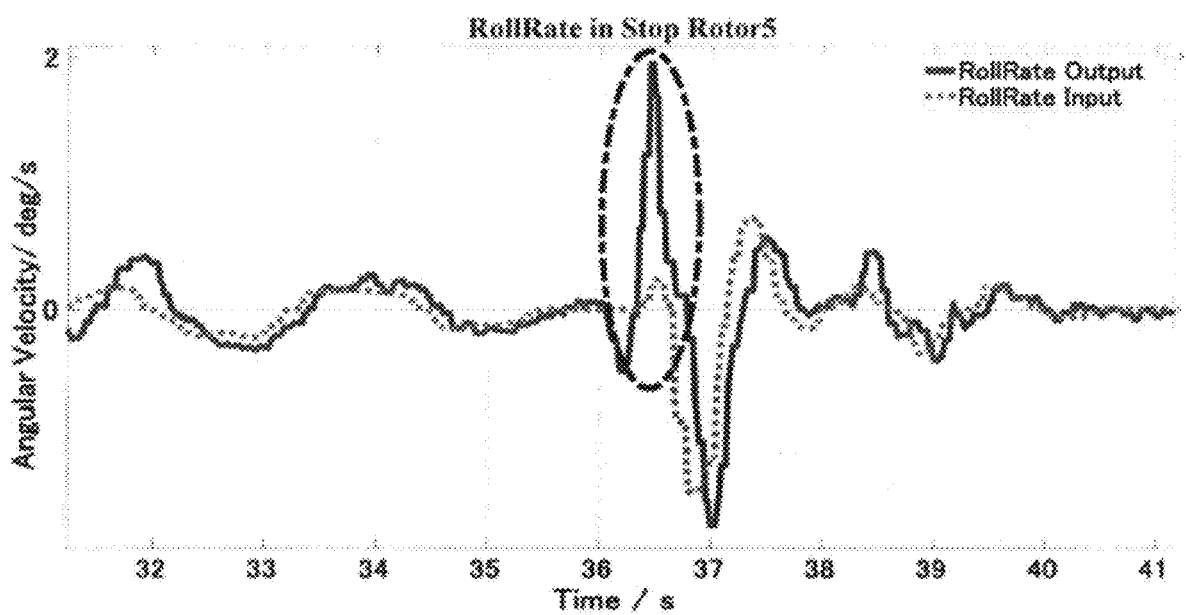
FIG. 17 is a graph illustrating the roll angle speed of an aircraft body when the rotor part R5 is stopped during the manual operation.
Figure 18:
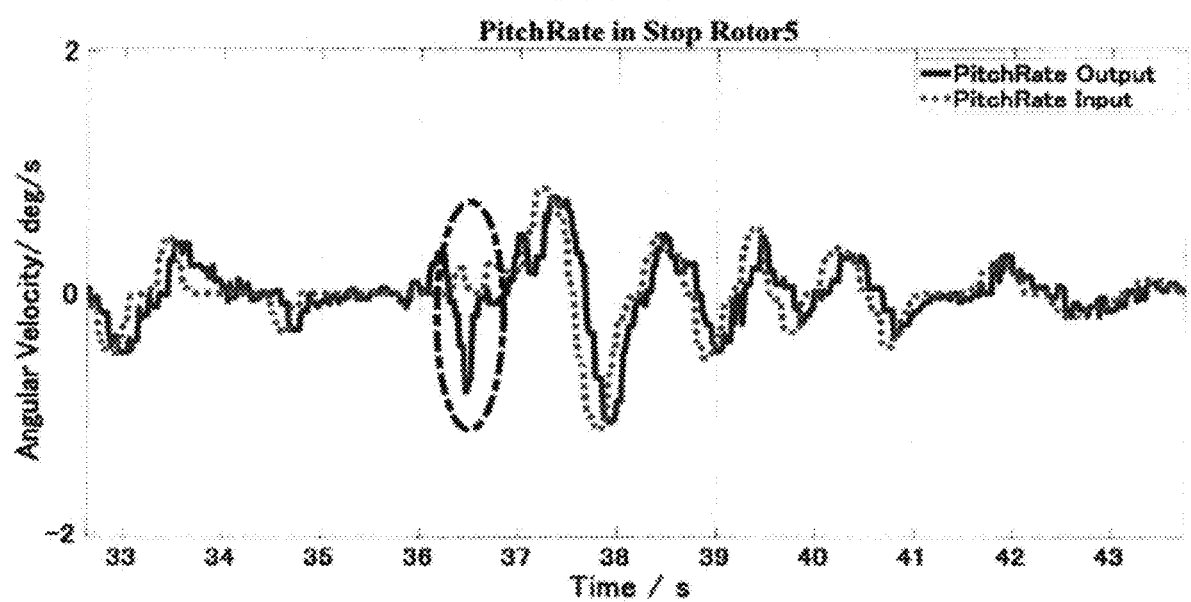
FIG. 18 is a graph illustrating the pitch angle speed of an aircraft body when the rotor part R5 is stopped during the manual operation.
Figure 19:
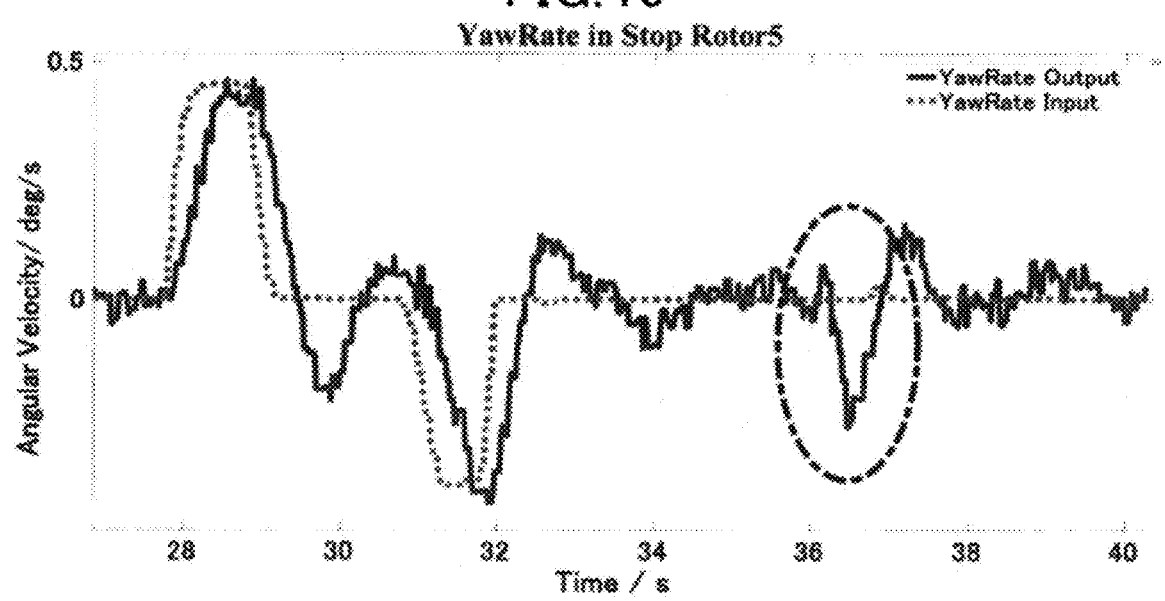
FIG. 19 is a graph illustrating the yaw angle speed of an aircraft body when the rotor part R5 is stopped during the manual operation.

A case where the rotor part R5 is stopped is illustrated in FIGS. 16 to 19. FIG. 16 illustrates a duty cycle of the PWM signal to each of the rotor parts R1 to R6. As illustrated in FIG. 16, the rotor part R5 which was stopped is re-started at 36 seconds. FIGS. 17 to 19 illustrate the roll angular speed, the pitch angular speed, and the yaw angular speed in order. In FIGS. 17 to 19, a dotted line indicates an input control amount (Input) and a solid line indicates an actually measured angular speed (Output).

As is obvious from FIGS. 13 to 15, immediately after stop of and immediately after re-start of the rotor part R1, the actually measured angular speed is deviated from the input control amount but after that, the actually measured angular speed returns so as to follow the input control amount. Similarly, as is obvious from FIGS. 17 to 19, immediately after re-start of the rotor part R5, the actually measured angular speed is deviated from the input control amount but after that, the actually measured angular speed returns so as to follow the input control amount.

As described above, even if one rotor part (the rotor part R1 or R5) was stopped during the manual operation, the attitude of the aircraft body could be kept by the remaining rotor parts. It was found from the graphs in FIGS. 13 to 15 and FIGS. 17 to 19 that the input control amount based on the operation input command from the maneuvering device and the actual angular speeds of the aircraft body are highly matched with each other. From this fact, effectiveness of the control-amount distribution algorithm when a fault occurs in the rotor part was made apparent.

Subsequently, in order to verify the fault tolerance control operation by the control amount re-distribution during an autonomous flight, a case where a fault occurs in the rotor part during the autonomous flight outside was verified.

Figure 20:
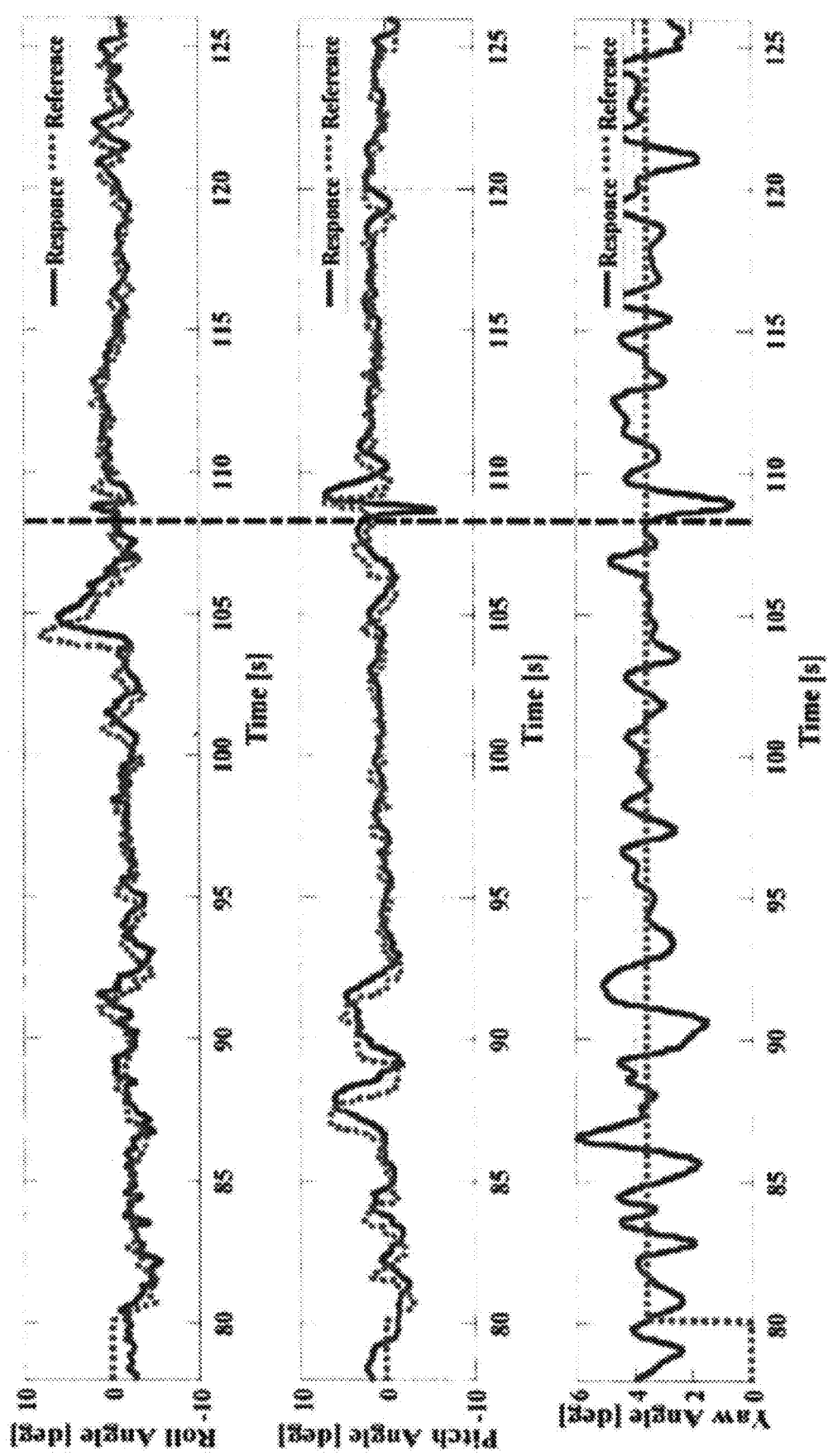
FIG. 20 is a graph illustrating a three-axis tilt angle when the rotor part R1 is stopped during an autonomous control.
Figure 21:
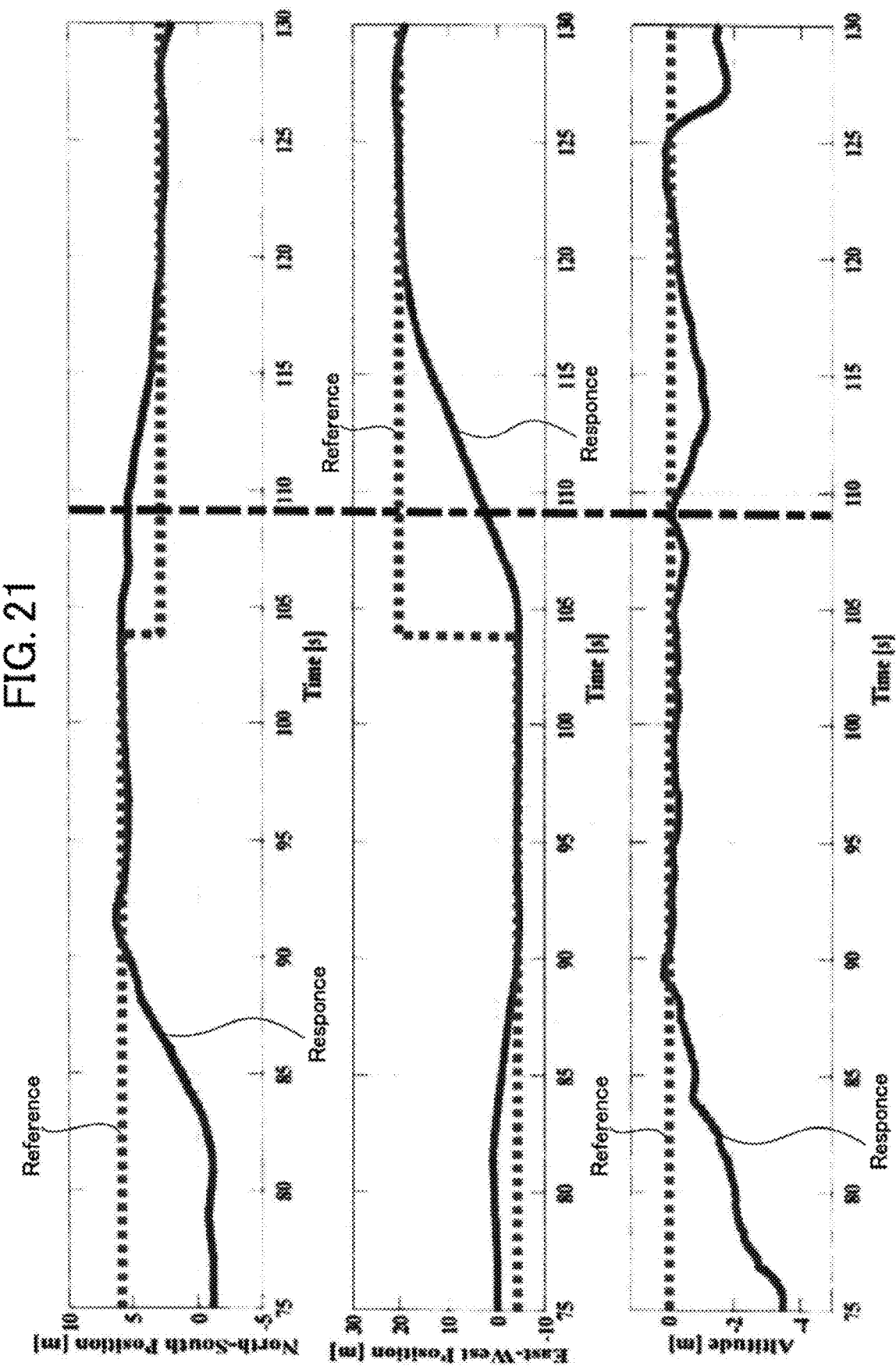
FIG. 21 is a graph illustrating a flight position when the rotor part R1 is stopped during the autonomous control.
Figure 22:
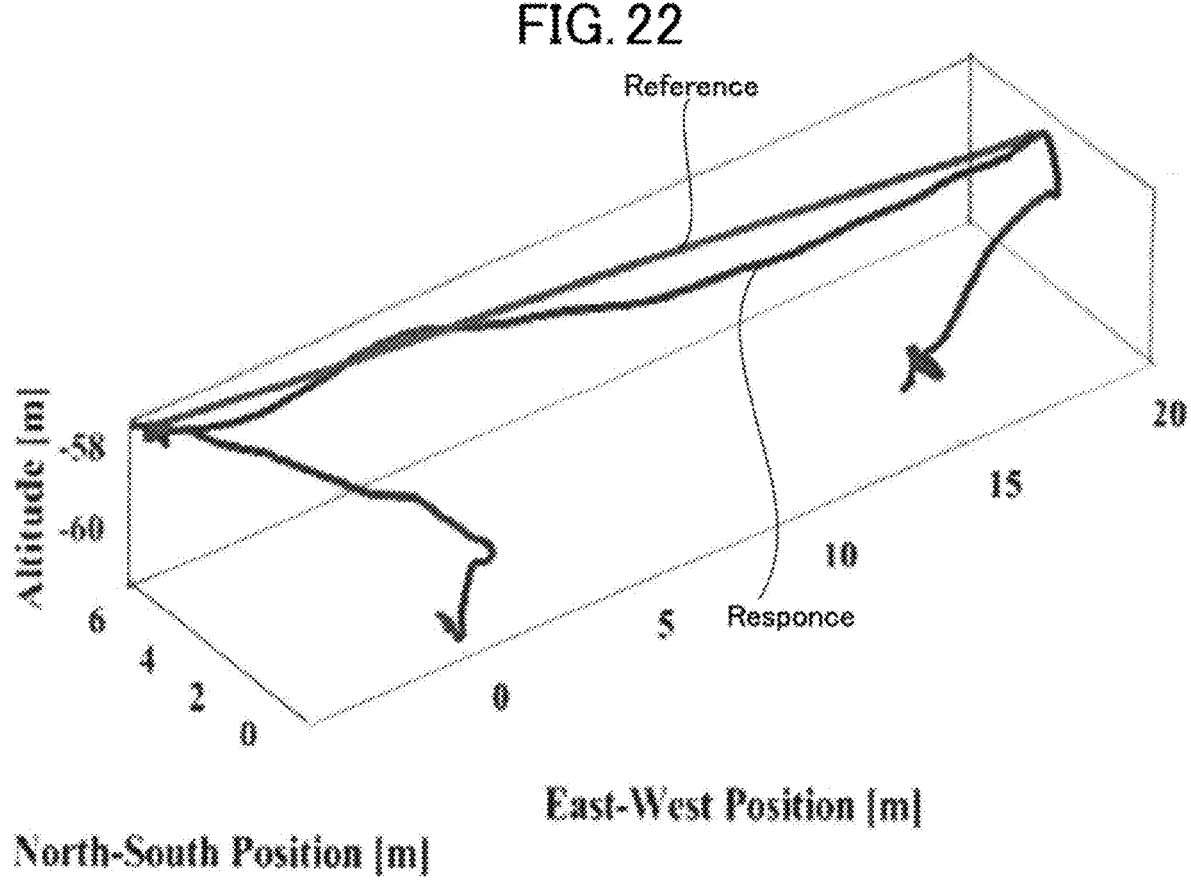
FIG. 22 is a graph illustrating a three-dimensional flight path when the rotor part R1 is stopped during the autonomous control.

As an example, a case where the rotor part R1 is stopped at a point of time when approximately 108 seconds have elapsed since start of the flight is illustrated in FIGS. 20 to 22. FIG. 20 is a graph comparing a reference signal (Reference) which is a control command of an autonomous flight for the tilt angle (Angle) in the three axes and an actual attitude (Response) of the aircraft body. FIG. 21 is a graph comparing the reference signal (Reference) which is a control command of an autonomous flight and an actual position (Response) of the aircraft body for a flight position (Position) of the aircraft body. FIG. 22 is a three-dimensional flight path.

Figure 23:
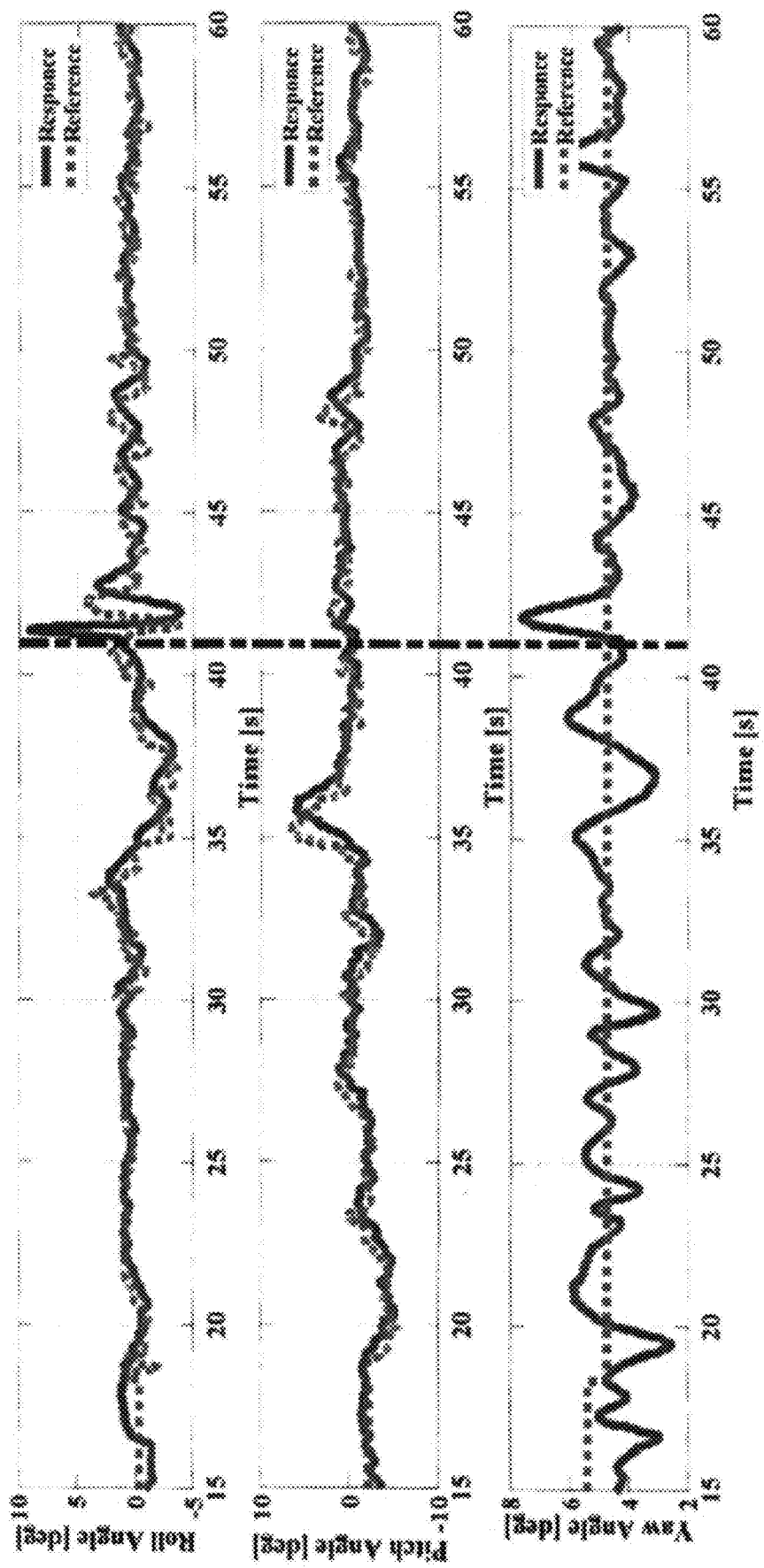
FIG. 23 is a graph illustrating the three-axis tilt angle when the rotor part R5 is stopped during the autonomous control.
Figure 24:
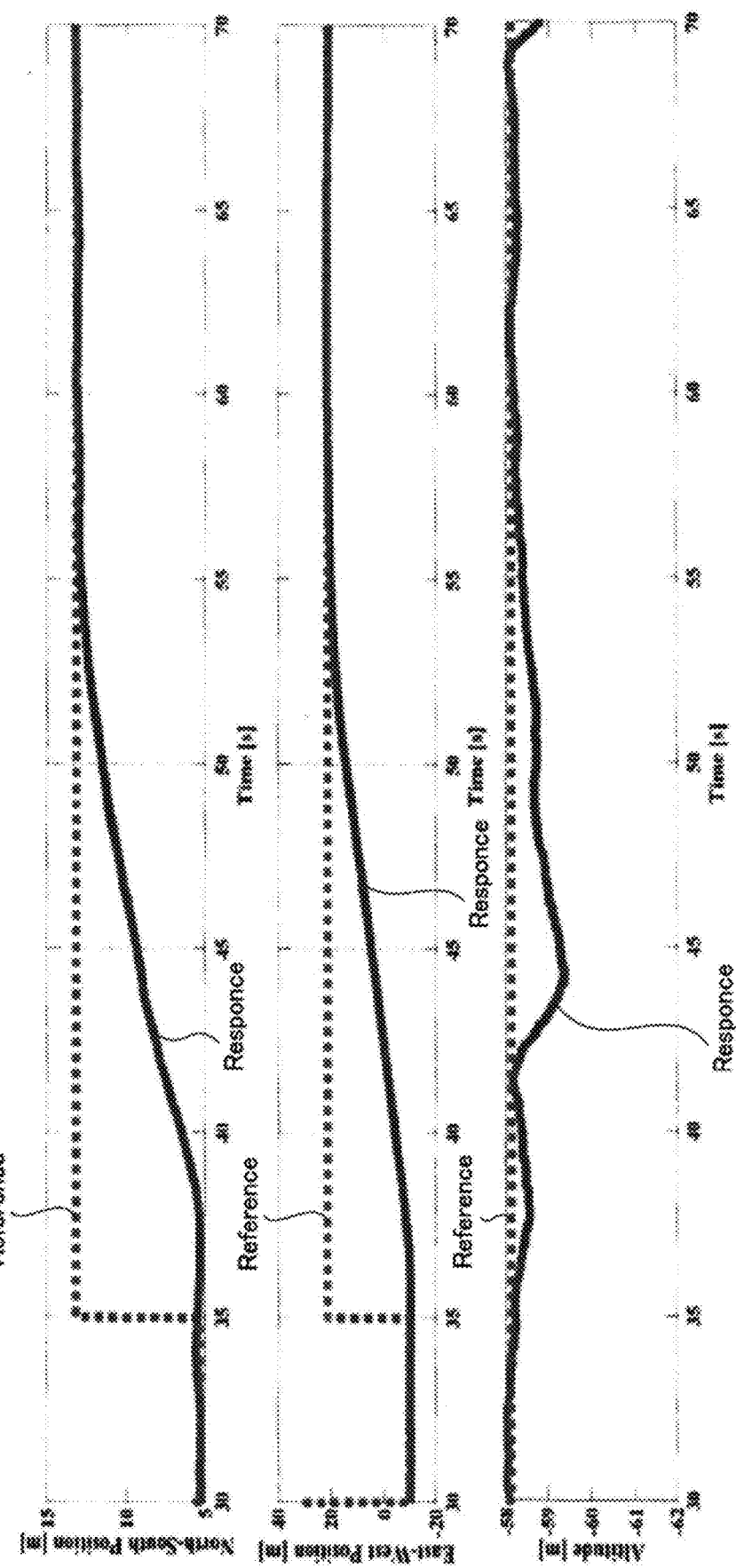
FIG. 24 is a graph illustrating the flight position when the rotor part R5 is stopped during the autonomous control.
Figure 25:
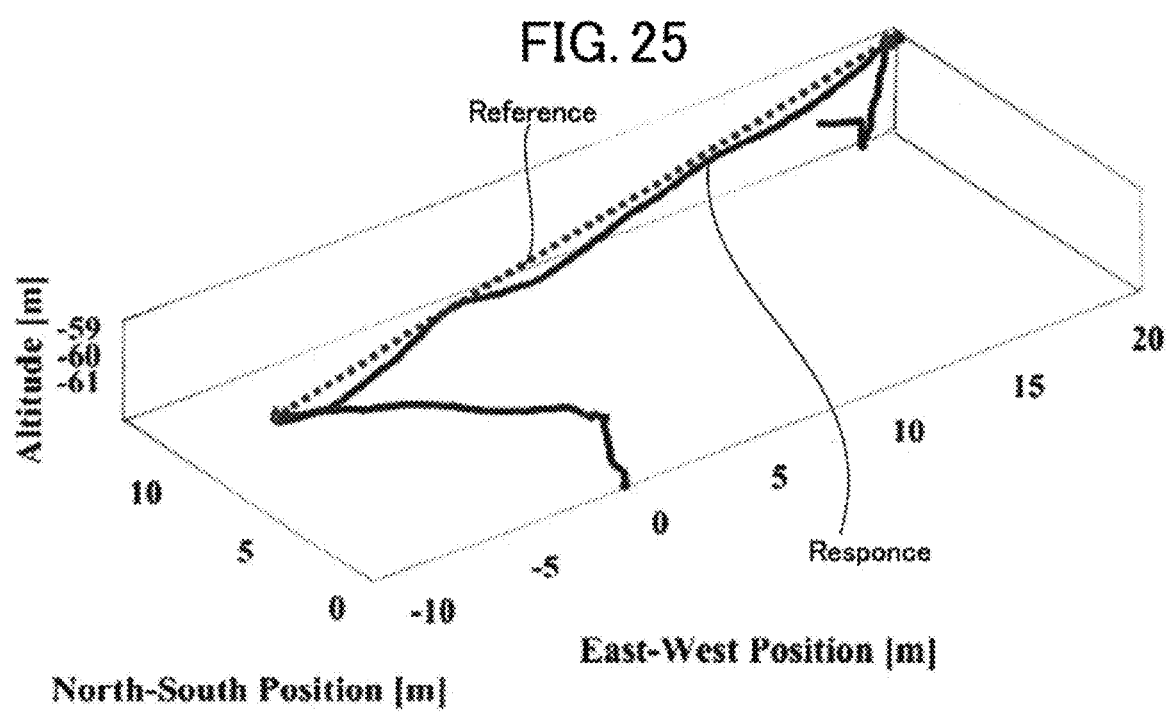
FIG. 25 is a graph illustrating the three-dimensional flight path when the rotor part R5 is stopped during the autonomous control.

As another example, a case where the rotor part R5 is stopped at a point of time when approximately 41 seconds have elapsed since start of the flight is illustrated in FIGS. 23 to 25. FIG. 23 is a graph comparing the reference signal (Reference) which is a control command of the autonomous flight for the tilt angle (Angle) in the three axes and the actual attitude (Response) of the aircraft body. FIG. 24 is a graph comparing the reference signal (Reference) which is the control command of the autonomous flight and the actual position (Response) of the aircraft body for a flight position (Position) of the aircraft body. FIG. 25 is a three-dimensional flight path.

As is obvious from FIG. 20 and FIG. 21, immediately after the stop of the rotor part R1, the actual operation (Response) is deviated from the reference signal (Reference), but after that, the actual operation returns so as to follow the reference signal. Moreover, it is also found from FIG. 22 that the small-sized helicopter 1 is flying substantially along a path indicated by the reference signal. Similarly, as is obvious from FIG. 23 and FIG. 24, immediately after the stop of the rotor part R5, the actual operation (Response) is deviated from the reference signal (Reference), but after that, the actual operation returns so as to follow the reference signal. Moreover, it is also found from FIG. 25 that the small-sized helicopter 1 is flying substantially along a path indicated by the reference signal.

As described above, even if one rotor part (the rotor part R1 or R5) was stopped during the autonomous flight, the attitude of the aircraft body could be kept by the remaining rotor parts. It was found from the graphs in FIGS. 21, 22, and 23, 24 that the reference signal which is the control command of the autonomous flight and the actual operation of the aircraft body are highly matched with each other. From this fact, too, effectiveness of the control-amount distribution algorithm when a fault occurs in the rotor part was made apparent.

As described above, it was found by the verification based on the actual flight that at a moment when a fault occurs in one rotor part, a difference from the reference signal is generated for the flight position of the aircraft body but it can catch up a target position indicated by the reference signal in several seconds. Moreover, it was also found from these verification results that when a fault occurs in the rotor part, a crash of the aircraft body can be suppressed and handled relatively safely.

The embodiment of the present invention has been described above, but the present invention is not limited to these examples. Those obtained by adding, deleting or changing designs of constituent elements with respect to the aforementioned embodiment by those skilled in the art as appropriate or those obtained by combining features of the embodiment as appropriate are included in the scope of the present invention as long as the gist of the present invention is included.

Embodiment 2

Hereinafter, an unmanned aircraft, a control device of an unmanned aircraft, a method for controlling an unmanned aircraft, and a fault detecting device of an unmanned aircraft which is an embodiment of the present invention will be described by referring to the drawings. However, the unmanned aircraft, the control device of an unmanned aircraft, the method for controlling an unmanned aircraft, and the fault detecting device of an unmanned aircraft according to the present invention are not limited to specific aspects described below, but it should be noted that they are changeable as appropriate within the scope of the present invention. For example, the unmanned aircraft according to the present invention does not have to be an autonomous flight type unmanned aircraft, and functional configuration of the unmanned aircraft is not limited to that illustrated in FIG. 28 but is arbitrary as long as similar operations are possible, and an operation which should be performed by a plurality of constituent elements may be executed by a single constituent element such as integration of functions of a communication circuit into a main operation circuit or an operation which should be executed by a single constituent element as illustrated may be executed by a plurality of constituent elements such as distribution of the function of the main operation circuit to a plurality of operation circuits, for example. As an example, in FIG. 28, a fault detection circuit is integrated as the same hardware into a (rotary wing) control signal generation circuit (the main operation circuit and the fault detection circuit may be the same processor or the like, for example. The same applies to the signal conversion circuit), but a fault detection circuit may be provided separately from the control signal generation circuit. An autonomous control program and a fault detection program of the unmanned aircraft may be recorded in a recording device such as a hard disk drive and read out by the main operation circuit, the fault detection circuit and the like and executed (the illustrated autonomous control program and the fault detection program may be disassembled to a plurality of program modules or other arbitrary programs may be executed by the main operation circuit, the fault detection circuit and the like), or similar operations may be performed by an incorporated system using a microcomputer or the like. The unmanned aircraft, the control device of an unmanned aircraft, and a fault detecting device of an unmanned aircraft according to the present invention do not have to include all the constituent elements illustrated in the following embodiments, or the method for controlling an unmanned aircraft according to the present invention does not have to include all the illustrated method steps. The rotary wings for flying the unmanned aircraft do not have to be the six rotors R1 to R6 illustrated in FIG. 26 and the like but may be the arbitrary number of rotary wings (arbitrary rotary wings such as a rotor, a propeller and the like) such as eight rotors R1 to R8, for example. An aircraft body size of the unmanned aircraft is also arbitrary.

Outline of Configuration of Unmanned Aircraft and Flight Control

Figure 26:
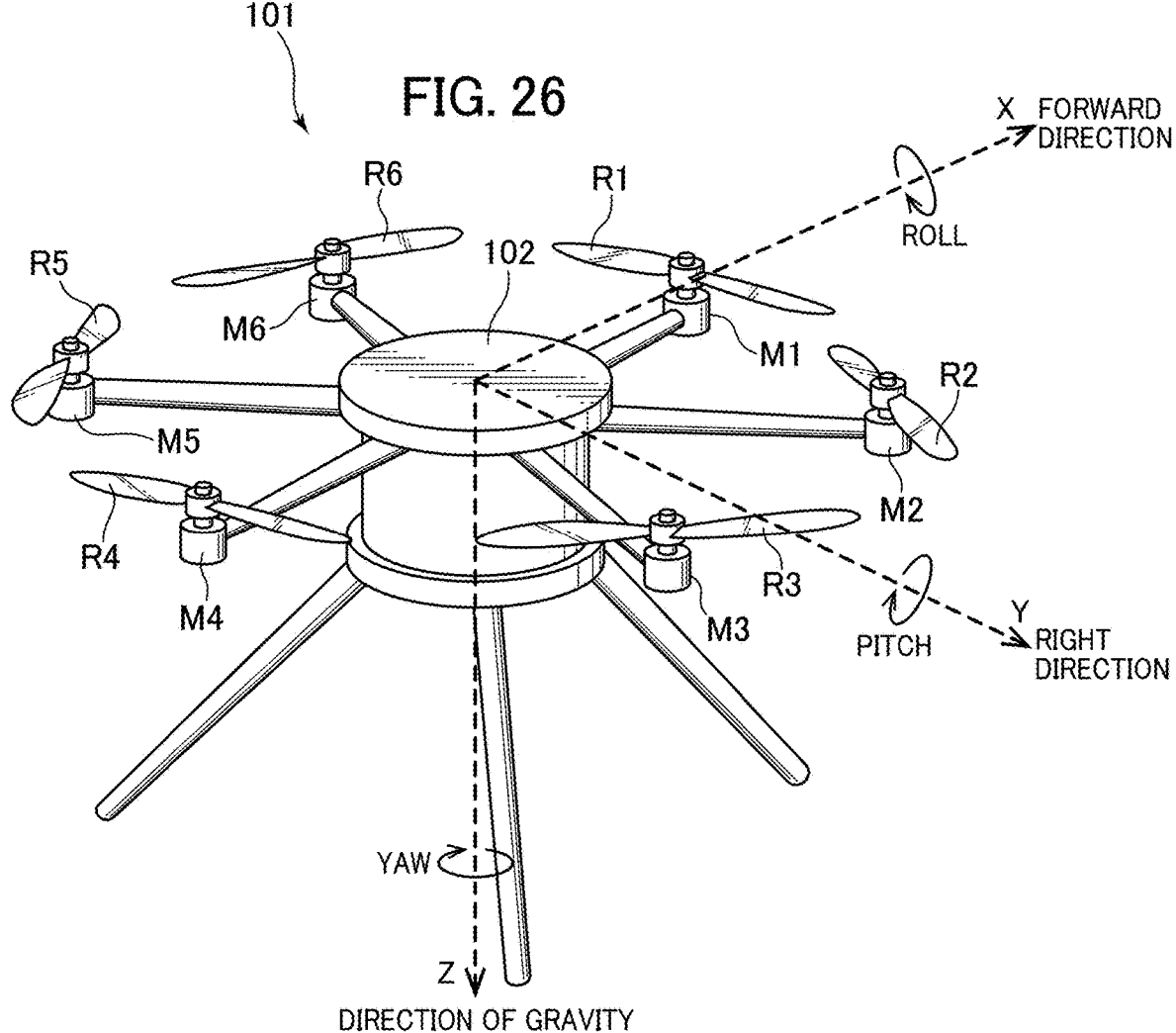
FIG. 26 is a perspective view of an unmanned aircraft which is an embodiment of the present invention (definition of a rotation direction was added and the like on the basis of FIG. 2 in Japanese Patent Application No. 2016-241718).
Figure 27:
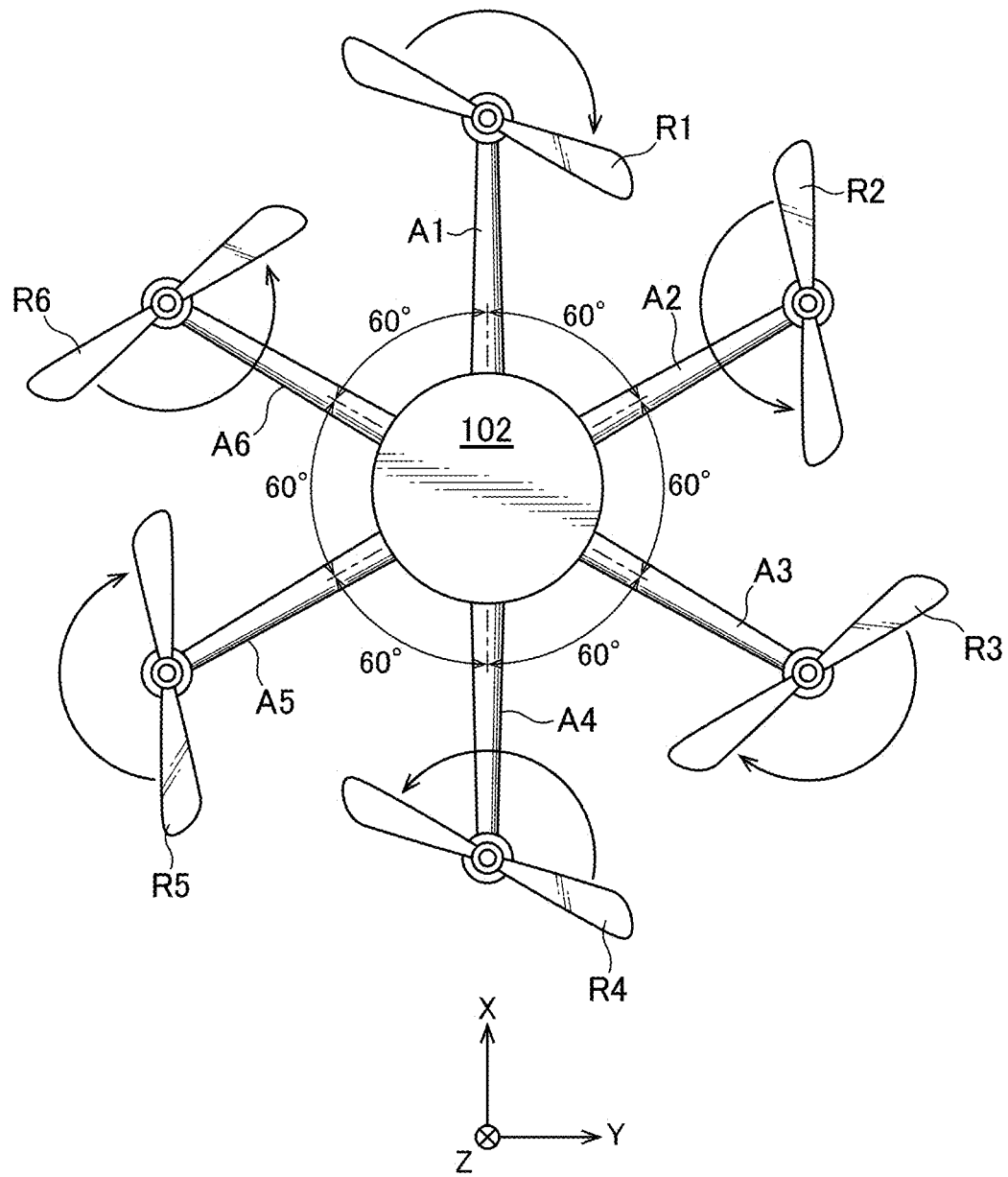
FIG. 27 is a view of the unmanned aircraft in FIG. 26 when seen from a negative direction of z.

FIG. 26 illustrates a perspective view of an unmanned aircraft which is an embodiment of the present invention (a definition of a rotation direction is added and the like on the basis of FIG. 2 in Japanese Patent Application No. 2016-2541718 (filed on Dec. 13, 2016. Applicant: "AUTONOMOUS CONTROL SYSTEMS LABORATORY LTD.", Inventors: "NONAMI Kenzo, YANG Yi")), and FIG. 27 illustrates a view of the unmanned aircraft when seen from a negative direction of z. The unmanned aircraft 101 includes a body part 102, six motors M1 to M6 driven by a control signal from the body part 102, six rotors (rotary wings) R1 to R6 for flying the unmanned aircraft 101 by being rotated by driving of each of the motors M1 to M6, and arms A1 to A6 (FIG. 27) connecting the body part 102 and the motors M1 to M6, respectively. As illustrated in FIG. 26, a roll angle, a pitch angle, and a yaw angle are defined as rotation angles around the x-axis, the y-axis, and the z-axis. Moreover, a throttle amount is defined as an amount corresponding to rising and lowering of the aircraft body (number of rotations as the entire rotors R1 to R6). As illustrated in FIG. 27, the rotors R1, R3, and R5 are rotated clockwise when seen from the negative direction of z, and the rotors R2, R4, and R6 are rotated counterclockwise when seen from the negative direction of z. That is, the rotors adjacent to each other are rotated in opposite directions. The six arms A1 to A6 have an equal length and are disposed at a 60° (degrees) interval as illustrated in FIG. 27. The unmanned aircraft 101 may include a photographing camera, a payload and the like other than above in accordance with applications and the like (not shown).

Figure 28:
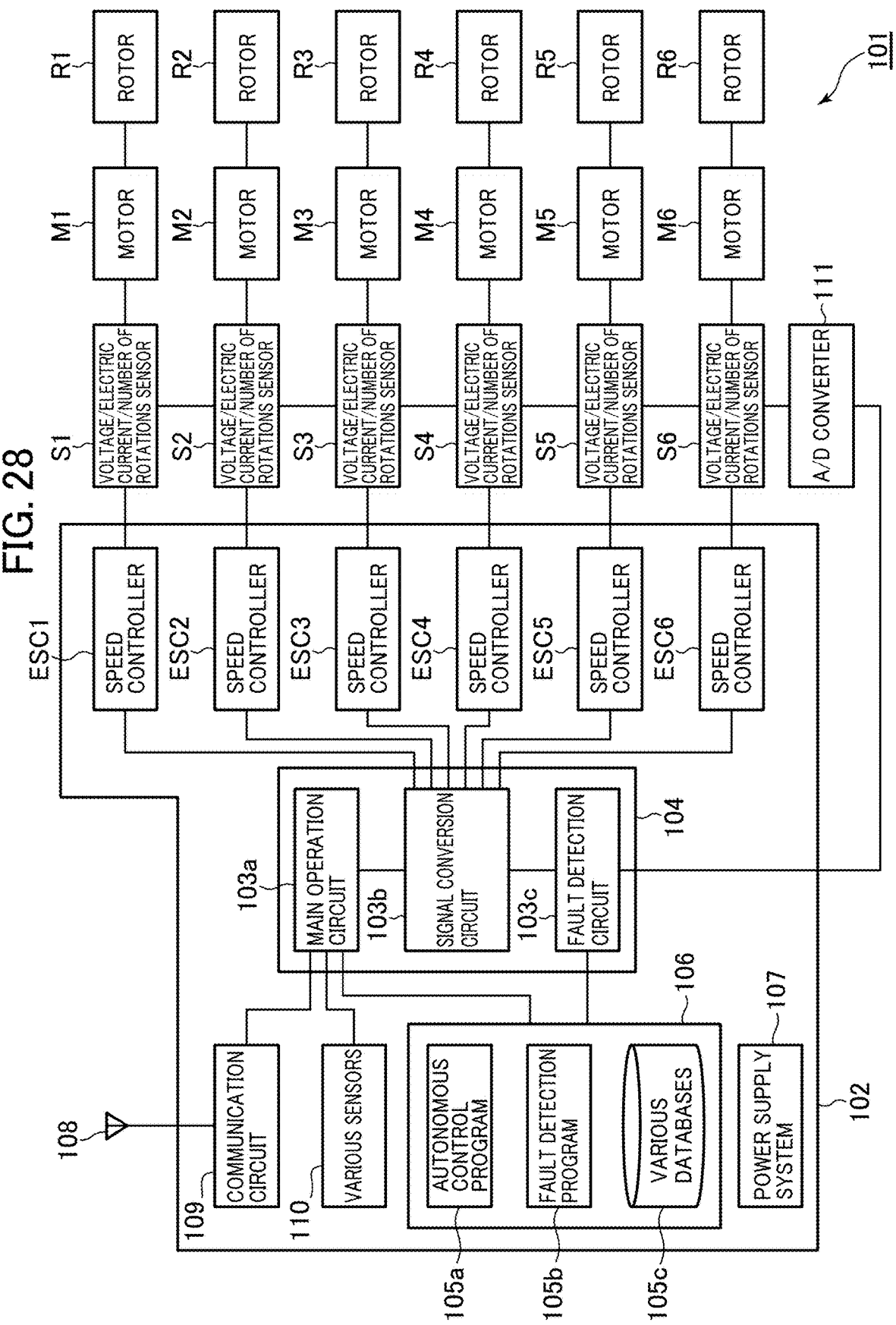
FIG. 28 is a block diagram illustrating configuration of the unmanned aircraft in FIG. 26.

FIG. 28 is a block diagram illustrating configuration of the unmanned aircraft in FIG. 26. The body part 102 of the unmanned aircraft 101 includes a main operation circuit 103a configured by a processor, a temporary memory and the like and executing various calculations, a signal conversion circuit 103b configured by a processor, a temporary memory and the like and executing processing such as conversion of control command value data obtained by the calculation by the main operation circuit 103a to a pulse signal (PWM signal) to the motors M1 to M6, a fault detection circuit 103c for detecting a fault in an operation of at least one of the rotors (or propellers) R1 to R6 (an operation circuit including the main operation circuit 103a, the signal conversion circuit 103b, and the fault detection circuit 103c is called a (rotary wing) control signal generation circuit 104), speed controllers (ESC: Electric Speed Controller) ESC1 to ESC6 for converting the pulse signal generated by the control signal generation circuit 104 to driving electric currents to the motors M1 to M6, a communication antenna 108 and a communication circuit 109 conducting transmission/reception of various data signals with an outside, a sensor part 110 including various sensors such as a GPS (Global Positioning System) sensor, an attitude sensor, an altitude sensor, an azimuth sensor and the like, a recording device 106 configured by a recording device such as a hard disk drive or the like recording an autonomous control program 105a, a fault detection program 105b, various databases 105c and the like, and a power supply system 107 including a battery device such as a lithium polymer battery, a lithium ion battery and the like and a distribution system to each element. Moreover, the unmanned aircraft 101 also includes voltage/electric current/number of rotations sensors S1 to S6 for measuring each voltage applied to each of the motors M1 to M6, each electric current flowing through each of the motors M1 to M6, and each number of rotations (the number of rotations per unit time) of each of the motors M1 to M6 and an A/D (analog/digital) converter 11 for converting analog signals indicating measured values of each voltage, electric current, and the number of rotations measured by the voltage/electric current/number of rotations sensors S1 to S6 to digital signals and outputting them to the fault detection circuit 103c. Each of the voltage/electric current/number of rotations sensors S1 to S6 is configured by a voltage/electric current sensor for measuring a voltage and a electric current and a number of rotations sensor such as a photo interrupter or the like for measuring the number of rotations. Moreover, the voltage/electric current/number of rotations sensors S1 to S6 are connected to an A/D converter 111 by separate wirings, respectively, but the A/D converter 111 and the fault detection circuit 103c are connected by two communication lines (H line, L line) in accordance with a CAN (Controller Area Network)-BUS system, a six-channel signal is transmitted to the fault detection circuit 103c via a common signal transmission path (conversion of a data format or the like is arbitrary such as being executed by an incorporate circuit incorporated in each of the A/D converter 111 and the fault detection circuit 103c or executed by an appropriate conversion program or the like by the A/D converter 111 and the fault detection circuit 103c).

Besides, the unmanned aircraft 101 may include arbitrary functional parts, information and the like in accordance with functional applications. As an example, in a case of an autonomous flight of the unmanned aircraft 101 in accordance with a flight plan (autonomous flight mode), a flight plan path which is a collection of a start position, a target position, a check point position (latitude, longitude, altitude) which should be gone through after the flight starts at the start position until it reaches the target position of the flight and flight plan information which is data indicating the flight plan which is some rules to be obeyed during the flight such as a speed limit, an altitude limit and the like are recorded in the recording device 106, and when the main operation circuit 103a reads the flight plan information and executes the autonomous control program 105a, the unmanned aircraft 101 flies in accordance with the flight plan. More specifically, the flight of the unmanned aircraft 101 is controlled by determining an electric current position, a speed and the like of the unmanned aircraft 101 by information obtained from the various sensors of the sensor part 110, by calculating the control command value relating to the throttle amount, the roll angle, the pitch angle, and the yaw angle by the main operation circuit 103a by comparing them with target values of the flight plan path, the speed limit, the altitude limit and the like determined in the flight plan, by converting them to the control command value relating to the rotation speeds of the rotors R1 to R6 and by converting data indicating the control command values relating to the rotation speeds to pulse signals by the signal conversion circuit 103b (generation of a (rotary wing) control signal) and sending them to the speed controllers ESC1 to ESC6 and then, the speed controllers ESC1 to ESC6 convert the pulse signals to driving electric currents, respectively, and output them to the motors M1 to M6, respectively, and the driving of the motors M1 to M6 is controlled so as to control the rotation speeds of the rotors R1 to R6 and the like. As an example, such control that the numbers of rotations of the rotors R1 to R6 are increased to a control command to raise the altitude of the unmanned aircraft 101 (decreased when the altitude is lowered), and the numbers of rotations of the rotors R1, R2, and R6 are decreased and the numbers of rotations of the rotors R3, R4, and R5 are increased to the control command to accelerate the unmanned aircraft 101 to an advance direction (a positive direction of x in FIG. 26) (inverse control in the case of deceleration) and the like is executed. In this process, when the fault detection circuit 103c executes the fault detection program 105b, a fault in an operation of at least one of the rotors R1 to R6 is detected by using the measured values of the voltage, the electric current, and the number of rotations measured by the voltage/electric current/number of rotations sensors S1 to S6, and when the main operation circuit 103a executes the autonomous control program 105a, the flight control according to the detected fault is executed as described below. Flight record information such as the flight path along which the unmanned aircraft 101 actually flied (an aircraft position of the unmanned aircraft 101 at each time and the like), various types of sensor data and the like are recorded in the various databases 105c at any time during the flight.

When the unmanned aircraft 101 flies in accordance with an external input command value (command values relating to the throttle amount, the roll angle, the pitch angle, and the yaw angle) indicated by the external input signal received by the communication antenna 108 and the communication circuit 109 from the external input device such as a proportional controller (propo.) and the like (manual mode), the control command values relating to the rotation speeds of the rotors R1 to R6 are calculated by the main operation circuit 103a executing the autonomous control program 105a (when the unmanned aircraft 101 is configured as an aircraft body exclusively for manual control by the external input device, separate control programs recorded in the recording device 106) by using the external input command values, this data is converted by the signal conversion circuit 103b to a pulse signal (generation of a (rotary wing) control signal), and hereinafter, the rotation speeds of the rotors R1 to R6 are similarly controlled by using the speed controllers ESC1 to ESC6 and the motors M1 to M6, and the flight control is executed.

Alternatively, when the unmanned aircraft 101 is to be flown in an attitude control mode in which only the attitude of the aircraft body is autonomously controlled, the main operation circuit 103a executes the autonomous control program 105a by using data indicating attitude information obtained by measurement by the attitude sensor (gyro sensor, magnetic sensor and the like) of the sensor part 110 so as to calculate the command values (command values relating to the roll angle, the pitch angle, and the yaw angle) of the attitude control by comparing the data from the attitude sensor with the target values of the attitude and the like, calculates a (synthesized) control command value relating to the throttle amount, the roll angle, the pitch angle, and the yaw angle by combining the command value of the attitude control and the external input command values (the command values relating to the throttle amount, the roll angle, the pitch angle, and the yaw angle) indicated by the external input signal received from the external input device, converts them to the control command values relating to the rotation speeds of the rotors R1 to R6 (the calculation and the conversion are executed by the main operation circuit 103a executing the autonomous control program 105a), and hereinafter, the flight is controlled similarly.

As an example of the autonomous flight type unmanned aircraft, Mini Surveyor MS-06LA (Autonomous Control Systems Laboratory Ltd.), Snap (Vantage Robotics), AR. Drone 2.0 (Parrot), Bebop Drone (Parrot) and the like are commercially available. In the flight control according to a fault in the unmanned aircraft 101 described below, the unmanned aircraft 101 flies basically in accordance with the external input signal from the external input device and the like, and only the attitude is to be autonomously controlled, but flight control according to a fault is similarly possible by the unmanned aircraft 101 performing fully autonomously controlled flight or fully externally controlled flight.

Flight Control According to Fault

Figure 29:
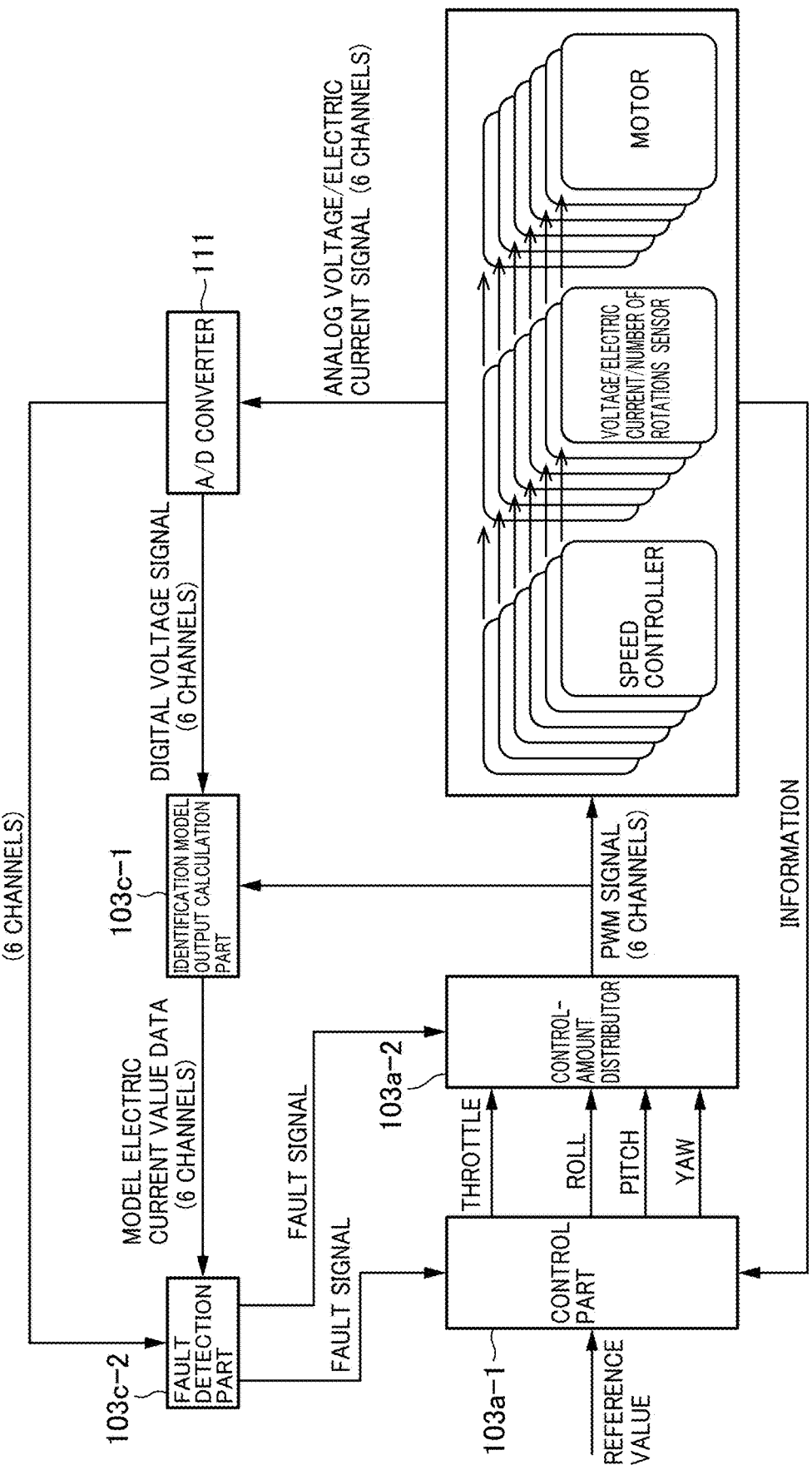
FIG. 29 is a block diagram illustrating a flow from fault detection to flight control according to the fault (change and addition were made in the description on the basis of FIG. 4 in Japanese Patent Application No. 2016-241718).

FIG. 29 illustrates a block diagram (descriptions are changed or added on the basis of FIG. 4 of Japanese Patent Application No. 2016-241718) illustrating a flow from fault detection to flight control according to the fault. In the present invention, fault detection processing can be executed with a principle similar to the fault detection using the identification model described in Japanese Patent Application No. 2016-241718. Hereinafter, this fault detection processing will be described by following the description in Japanese Patent Application No. 2016-241718.

Fault Detection

In the block diagram in FIG. 29, a control part 103a-1 and a control-amount distributor 103a-2 express a conceptual function part performing the function of the main operation circuit 103a executing the autonomous control program 105a, respectively, and the processing in these function parts is executed by the main operation circuit 103a executing the autonomous control program 105a. Moreover, in the block diagram in FIG. 29, an identification model output calculation part 103c-1 and a fault detection part 103c-2 are conceptual functional blocks expressing the function of the fault detection circuit 103c executing the fault detection program 105b, respectively, and the processing in these functional blocks is executed by the fault detection circuit 103c executing the fault detection program 105b. An "output" and an "input" in this description do not mean only physical sending-out and receiving of an electric signal and the like but are concepts also including delivery of information between the conceptual functional blocks (delivery of data between the programs and the like).

During the flight of the unmanned aircraft 101, the voltage/electric current/number of rotations sensors S1 to S6 measure each voltage applied to each of the motors M1 to M6 and each electric current flowing through each of the motors M1 to M6. Moreover, in order to acquire a coefficient regulating a relationship between an electric current value and the number of rotations in an equation of an electric current reference model which will be described later, the voltage/electric current/number of rotations sensors S1 to S6 also measure the number of rotations of each of the motors M1 to M6.

Analog signals indicating each voltage and each electric current (6 channels each) measured by the voltage/electric current/number of rotations sensors S1 to S6 are output to the A/D converter 111, and the A/D converter 111 converts them to a digital voltage signal (6 channels) and a digital electric current signal (6 channels). The digital voltage signal is output to the identification model output calculation part 103c-1, and the digital electric current signal is output to the fault detection part 103c-2, respectively.

The identification model output calculation part 103c-1 calculates a model value of an electric current by the identification model for each of the six rotors R1 to R6 by using the PWM signal (6 channels) input from the control-amount distributor 103a-2 and the digital voltage signal (6 channels) input from the A/D converter 111. Hereinafter, the identification model will be described by quoting the description in Japanese Patent Application No. 2016-241718 (Terms and expressions are changed as appropriate. The same also applies to the quotation below).

(Example 1 of Model Value)

Assuming that the voltage v, the electric current i, and the angular speed $\omega$ (omega: corresponding to the number of rotations of a motor) are quantities of state of one motor and that a function reflecting the state of the motor is $\Psi$ (psi), $\Psi$ (psi) can be expressed by the following equation:

[Formula 19]

$$\omega(v,i,\omega)=0 \qquad (16)$$

A relationship between the PWM signal output from the control-amount distributor 103a-2 and the number of rotations of a motor in the transmission function is linear. On the basis of the aforementioned analysis, $\Psi$ (psi) can be expressed by the following equation:

[Formula 20]

$$\psi(v,i,\omega)=\omega(v,i,\mu\omega)=\omega(v,i,PWM)=0 \qquad (17)$$

where $\mu$ (mu) is a proportional coefficient (duty ratio PWM=$\mu\omega$, namely PWM=mu multiplied by omega) between the number of rotations $\omega$ (omega) and a duty ratio PWM ($0 \leq PWM \leq 1$, namely PWM is between 0 and 1) of the PWM.

By performing inverse conversion for this equation, the electric current i can be expressed by the following equation:

[Formula 21]

$$i=\omega^{-1}(v,PWM) \qquad (18)$$

In the configuration in FIG. 29, the number of rotations of the motor is measured by using the photo interrupter, and the electric current value supplied to the motor is measured by using the voltage/electric current sensor. When a battery is used for the power supply, since a voltage lowers with time in measurement of the electric current value, a battery voltage is measured, and a electric current value is measured by considering its influence.

Figure 30:
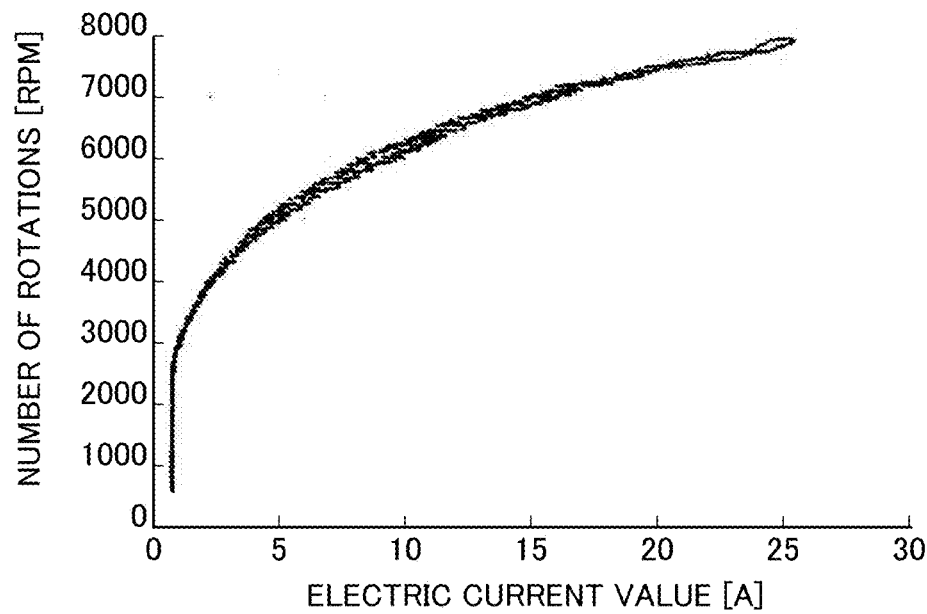
FIG. 30 is a graph illustrating a relationship between an electric current value supplied to a motor actually measured in the unmanned aircraft and the number of rotations of a motor (citing FIG. 5 in Japanese Patent Application No. 2016-241718).

FIG. 30 illustrates a relationship between the actually measured electric current value supplied to the motor and the number of rotations of the motor in an unmanned aircraft (the small-sized helicopter 1 described in Japanese Patent Application No. 2016-241718. The hardware configuration is basically similar to the unmanned aircraft 101 of this embodiment). From FIG. 30, the relationship between the electric current value and the number of rotations is expressed by an exponential function. And the inventor of the Japanese Patent Application No. 2016-241718 and the present inventors acquired a coefficient regulating these relationships from the measurement results of the electric current values and the numbers of rotations. By acquiring linearization coefficients of the PWM signal and the number of rotations of a motor by this, a function $\Psi^{-1}$ (psi$^{-1}$) of the aforementioned equation (18) can be acquired. An example of an electric current reference model which is the identification model in the small-sized helicopter 1 is illustrated in the following equation (19):

[Formula 22]

$$i = \left[\left(\frac{PWM}{3120}\right)^{\frac{1}{0.2596}} + 1.45\right] \times 235 - 341.1 + (v - 12.2) \times 6.3 \quad (19)$$

A unit of the electric current i is A (ampere), and a unit of a voltage v is V (volt). Specifications (specifications) of the small-sized helicopter 1 used when the model in the aforementioned equation (19) is determined are as in [Table 1] in the Description of the Japanese Patent Application No. 2016-241718 (see below).

TABLE 2

| Specifications | Value |
| --- | --- |
| Fuselage weight (not including battery) | 2412 g |
| Dimension (including propeller) | (L) 815 mm × (W) 738 mm × (H) 344 mm |
| Dimension (not including propeller) | (L) 593 mm × (W) 516 mm × (H) 344 mm |
| Propeller diameter | 10 inches (254 mm) |
| Battery type | Li-po 11.1 V (6 cell) 4500 mAh 25 C. |
| Battery mass | 886 g |
| Payload | Approximately 2200 g |
| Flight time (without payload) | 20 minutes 30 seconds |

The identification model output calculation part 103c-1 substitutes the PWM value and the voltage value v in the aforementioned equation (19) for each of the motors M1 to M6 by using the PWM signal (6 channels) input from the control-amount distributor 103a-2 as described above and the digital voltage signal (6 channels) input from the A/D converter 111 and determines the electric current model value (estimated value). The model electric current value data (6 channels) indicating the electric current model value of each of the motors M1 to M6 is output to the fault detection part 103c-2. The fault detection part 103c-2 compares the electric current model value with the electric current measured value (comparison value) indicated by the digital electric current signal (6 channels) input from the A/D converter 111 for each of the motors M1 to M6, and if a predetermined condition such that both do not match (do not accord), a difference between the both exceeds a predetermined threshold value or the like is satisfied, it determines that a fault occurred in an operation of the rotor driven by the motor. When it is determined that a fault occurred, a signal indicating occurrence of a fault (including information for identifying the rotor in which the fault occurred) is output to each of the control part 103a-1 and the control-amount distributor 103a-2 as a fault signal. If it is determined that a fault does not occur, a signal indicating that the operations of all the rotors are normal is similarly output to each of the control part 103a-1 and the control-amount distributor 103a-2.

FIG. 30 can be also used for determining the number of rotations of the motor from the measured value of the electric current. By solving the aforementioned formula (19) for PWM and by acquiring the linearization coefficients of the PWM signal and the number of rotations of a motor, an equation for determining the number of rotations of a motor from the electric current i and the voltage v can be obtained.

It may be so configured that an estimated value (predictive value) of the number of rotations of a motor is determined from the measured values of the electric current and the voltage by using this equation, this is compared with a number of rotations (comparison value) indicated by the control command value to the motor, and presence of occurrence of a fault is determined by determination on whether the both match (accord) each other or not or comparison between the difference between the both and the threshold value and the like (in this case, the identification model output calculation part 103c-1 determines the estimated value of the number of rotations of each of the motors M1 to M6 upon receipt of the input of the digital electric current signal (6 channels) and the digital voltage signal (6 channels) from the A/D converter 111 and outputs them to the fault detection part 103c-2 as described above. The fault detection part 103c-2 receives the input of the control command value to each of the motors M1 to M6 from the control-amount distributor 103a-2 and compares the number of rotations (comparison value) of each indicated by them with each of the estimated values input from the identification model output calculation part 103c-1).

(Example 2 of Model Value)

The model value may be determined not only by the calculation method proposed in the Japanese Patent Application No. 2016-241718 but by other arbitrary methods. More generally, the measured value (comparison value) of a state of the rotor (propelling part) depending on the voltage v applied to a motor, the electric current i flowing through the motor and the number of rotations ω (omega) of the motor is defined by:

[Formula 23]

$$y(v,i,\omega) \quad (20)$$

(y may be either a multivariate vector or a univariation (univariate)), and the estimated value (model value) of the state is defined by:

[Formula 24]

$$\hat{y}(v,i,\omega) \quad (21)$$

and (y with "^" (hat) above y as in the equation (21) is expressed as "yh" in the Description), and a control input to the propelling part is defined by u (u may be either a multivariate vector or a univariation (univariate)).

With regard to the control input u and the measured value y of the state, a model is established as follows by using the estimated value yh of the state:

[Formula 25]

$$\begin{cases} x(k+1) = A_m x(k) + B_m u(k) \\ \hat{y}(k) = C_m x(k) \end{cases} \quad (22)$$

In the aforementioned equation (22), x is a univariation (univariate) or a multivariate vector introduced for modeling. $A_m$, $B_m$, and $C_m$ are coefficients with respect to the univariations (univariates) x and u, or coefficient matrices with respect to the multivariate vectors x and u. Moreover, k is the number of times that the estimation is repeated, and m is an index specifying any one of the motors M1 to M6 ($A_m$, $B_m$, and $C_m$ may be different for each motor).

Here, a remainder r(k) of the measured value y(k) from the estimated value yh(k) of the k-th time is defined by:

[Formula 26]

$$r(k) = y(k) - \hat{y}(k) \quad (23)$$

(r may be either a multivariate vector or a univariation (univariate)). Moreover, a remainder evaluation value δ (delta) (k) at the k-th estimation is defined by:

[Formula 27]

$$\delta(k) = \int_{t}^{t+k \times T} \sqrt{\frac{r^2}{k}} \, dt \quad (24)$$

Here, t is time when the estimation is started, and T is a time interval between which the estimation is made (T=0.02 seconds, for example). Moreover, $r^2$ (square of r) is assumed to be an inner product of r and r when r is a multivariate vector.

If this remainder evaluation value δ (delta) (k) exceeds the predetermined threshold value (or not smaller than the threshold value), it is determined that a fault occurred in the operation of the motor, while if the value is not larger than the predetermined threshold value (or less than the threshold value), it is determined that a fault does not occur in the operation of the motor. The aforementioned estimation and determination on occurrence of a fault are made for each of the motors M1 to M6 by the fault detection part 103c-2 executing the fault detection program 105b while receiving signals indicating the measured values of the voltage v, the electric current i, and the number of rotations ω (omega) from the voltage/electric current/number of rotations sensors S1 to S6. If it is determined that a fault occurred, a signal indicating occurrence of a fault (including information specifying the rotor in which the fault occurred) is output as a fault signal to each of the control part 103a-1 and the control-amount distributor 103a-2. If it is determined that a fault has not occurred, a signal indicating that operations of all the rotors are normal is output similarly to each of the control part 103a-1 and the control-amount distributor 103a-2.

(Example 3 of Model Value)

The model value (estimated value) can be a electric current measured value measured in advance in a normal motor. By operating the motor in which a normal operation has been confirmed while the PWM signal to the speed controller is changed in various ways and by recording a set of the voltage v, the electric current i, and the number of rotations ω (omega) of the aforementioned equation (16) in the database, a functional type of Ψ (psi) (v, i, ω (omega)) can be acquired empirically. In the fault detection processing during the flight, the voltage v, the electric current i, and the number of rotations a are measured for each of the motors M1 to M6 by the voltage/electric current/number of rotations sensors S1 to S6, signals (6 channels, respectively) indicating each of the voltages v and the numbers of rotations ω are output to the identification model output calculation part 103c-1, and the identification model output calculation part 103c-1 determines a electric current model value relating to each of the motors M1 to M6 in accordance with the aforementioned equation (16) by substituting each of the measured voltage v and the number of rotations ω (omega) in the aforementioned Ψ (psi) (v, i, ω (omega)) empirically obtained. The fault detection part 103c-2 receives the input of the signal (6 channels) indicating the measured values (comparison values) of each of the electric currents i from the voltage/electric current/number of rotations sensors S1 to S6, receives the input of the electric current model value relating to each of the motors M1 to M6 from the identification model output calculation part 103c-1, and determines occurrence of an operation fault in each of the rotors R1 to R6 driven by the motors M1 to M6 by comparing the difference between the comparison value and the model value for each of the motors M1 to M6 with a predetermined threshold value or the like. If it is determined that a fault occurred, a signal indicating occurrence of a fault (including information for identifying the rotor in which the fault occurred) is output as a fault signal to each of the control part 103a-1 and the control-amount distributor 103a-2. If it is determined that a fault has not occurred, a signal indicating that the operations of all the rotors are normal is similarly output to each of the control part 103a-1 and the control-amount distributor 103a-2.

Fault Handling

Hereinafter, control processing according to a fault executed by the control part 103a-1 and the control-amount distributor 103a-2 will be described.

As illustrated in FIG. 29, a reference value (in the case of the attitude control mode, the external input command values relating to the throttle amount, the roll angle, the pitch angle, and the yaw angle) is externally input into the control part 103a-1 from the proportional controller and the like, and the control processing is executed on the basis of it. More specifically, the control part 103a-1 calculates the command value (the command values relating to the roll angle, the pitch angle, and the yaw angle) of the attitude control by comparing the data from the attitude sensor with the target value of the attitude or the like by using the data indicating the attitude information obtained from measurement by the attitude sensor (the gyro sensor, the magnetic sensor and the like) of the sensor part 110, calculates the (synthesized) control command value relating to the throttle amount, the roll angle, the pitch angle, and the yaw angle by combining the command value of the attitude control and the aforementioned external input command value, and it is output to the control-amount distributor 103a-2. The control-amount distributor 103a-2 converts this to the control command value corresponding to the square values of the angular speeds of the rotors R1 to R6 (mixing).

(Calculation of Control Command Value)

First, the calculation of the (synthesized) control command value by the control part 103a-1 will be described. In one example, into the control part 103a-1, the reference values (the external input command values relating to the throttle amount, the roll angle, the pitch angle, and the yaw angle expressed by the aircraft body coordinate system) expressed by the aircraft body coordinate system (xyz-system in FIG. 26) are externally input from the proportional controller or the like. Moreover, the control part 103a-1 calculates the command values (command values relating to the roll angle, the pitch angle, and the yaw angle) of the attitude control in the aircraft body coordinate system by using the data indicating the attitude information as described above. Then, the control part 103a-1 calculates the (synthesized) control command value by combining the external input command value and the command value of the attitude control in the aircraft body coordinate system. As a simple example, the external input command value for the throttle amount and the command value adding up the external input command value and the command value of the attitude control for the roll angle, the pitch angle, and the yaw angle may be the (synthesized) control command value. As another example, an algorithm of a specific combination is arbitrary such that the external input command value is corrected or the like by using the command value of the attitude control only if the control part 103a-1 determines that the unmanned aircraft 101 loses a balance when the flight control is executed in compliance only with the external input command value. Moreover, similarly to the Japanese Patent Application No. 2016-241718, the control part 103a-1 executes feedback control (modification of the combination algorithm and the like) by using operation information of the unmanned aircraft 101 such as position information, altitude information, and acceleration information. Here, it is assumed as an example of the attitude control mode that the command value calculated by the control part 103a-1 is the command value of the attitude control, but the command value calculated by the control part 103a-1 may be an arbitrary command value such as a command value of the throttle amount for keeping an altitude constant or command values of the throttle amount, the roll angle, the pitch angle, and the yaw angle for avoiding a specific flight limited airspace, and the (synthesized) control command value can be calculated by combining the command value with the external input command value.

However, when the external input signal indicating the external input command value in the aircraft body coordinate system is transmitted from the proportional controller to the unmanned aircraft 101, an operator is required to operate while grasping a direction of the unmanned aircraft 101 at all times and thus, if a fault occurs in the operation of a part of the rotors R1 to R6 and the direction of the unmanned aircraft 101 is continuously fluctuated and the like, for example, the operation becomes difficult in some cases.

Thus, this embodiment proposes that the external input signal indicating the external input command value in the reference coordinate system is received as an external input as will be described below, and combination with the command value of the attitude control is also made in the reference coordinate system.

How to take a reference coordinate is arbitrary, but in this embodiment, an aircraft body coordinate system at start of the flight of the unmanned aircraft 101 is used as the reference coordinate system. Ignoring an inertial force by rotation, revolution, gravity and the like of the earth, such reference coordinate system (x', y', z'-system) can be regarded as an inertia coordinate system. The proportional controller is designed to send an external input signal indicating the external input command value relating to the throttle amount, the roll angle, the pitch angle, and the yaw angle expressed in this reference coordinate system to the unmanned aircraft 101. The operator can operate the unmanned aircraft 101 on the basis of each direction determined at start of the flight without grasping the direction of the unmanned aircraft 101 changing from time to time. In one example, the direction of the unmanned aircraft 101 is measured by using the attitude sensor (the gyro sensor, the magnetic sensor and the like) of the sensor part 110 in the unmanned aircraft 101 at start of the flight, the x' direction of the reference coordinate system is determined on the basis of the north direction, for example, the y', z' directions are determined on the basis of that, and information defining the directions is recorded in the recording device 106 (this information may be recorded at the same time in a memory of the proportional controller or the like). During the flight, the unmanned aircraft 101 continuously measures the latest direction at all times, and the information regulating the latest aircraft body coordinate system is continuously recorded in the recording device 106. The processing is also performed by the main operation circuit 103a executing the autonomous control program 105a (the same applies to the other examples which will be described later).

The control part 103a-1 having received the input of the external input command value in the reference coordinate system calculates the command value of the attitude control (the command value relating to the roll angle, the pitch angle, and the yaw angle) in the aircraft body coordinate system as described above, this is converted to the command value of the attitude control in the reference coordinate system and then, it is combined with the external input command value in the reference coordinate system.

Figure 31:
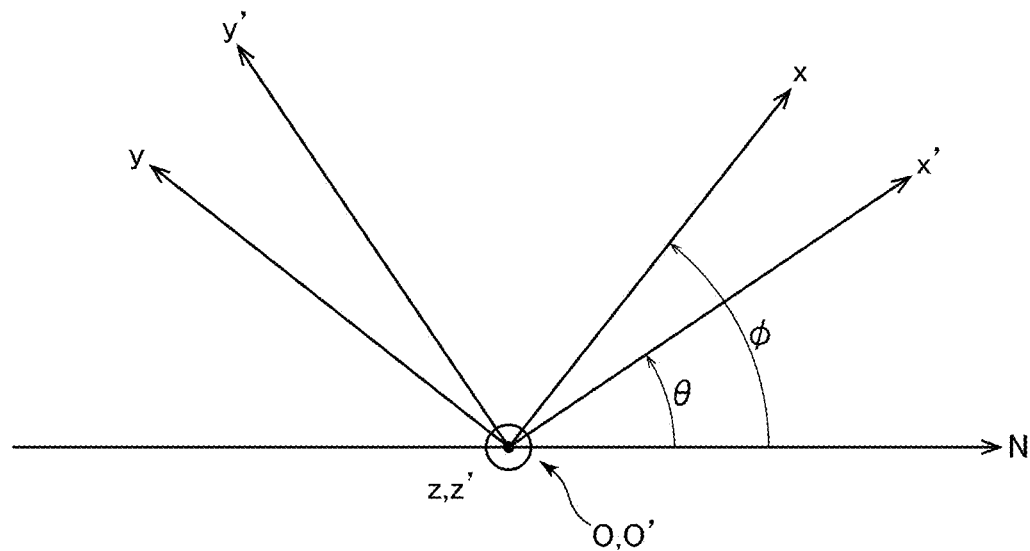
FIG. 31 is a view for explaining coordinate conversion between an aircraft body coordinate system and a reference coordinate system (inertia coordinate system) executed in a control part (FIG. 29) of a rotary-wing control signal generation circuit (FIG. 28).

As illustrated in FIG. 31, it is assumed that the x' axis of the reference coordinate system (inertia coordinate system) is tilted from the north direction (N in FIG. 31) only by θ (theta), and the x axis of the aircraft body coordinate system is tilted only by φ (phi). However, in FIG. 31, the aircraft body coordinate system is translated so that an origin (an electric current position of the gravity center of the unmanned aircraft 101 during a flight and the like) O in the aircraft body coordinate system is matched with (accords with) an origin (a position of the gravity center of the unmanned aircraft 101 at start of a flight) O' in the reference coordinate system. At this time, the control command value $u_{Roll}$ of the roll angle and the control command value $u_{Pitch}$ of the pitch angle in the aircraft body coordinate system are converted to the control command value $u_{Roll}'$ of the roll angle and the control command value $u_{Pitch}'$ of the pitch angle in the reference coordinate system by the following equation (25):

[Formula 28]

$$\begin{bmatrix} u'_{Roll} \\ u'_{Pitch} \end{bmatrix} = \begin{bmatrix} \cos(\phi - \theta) & \sin(\phi - \theta) \\ -\sin(\phi - \theta) & \cos(\phi - \theta) \end{bmatrix} \begin{bmatrix} u_{Roll} \\ u_{Pitch} \end{bmatrix} \quad (25)$$

In the example in FIG. 31, it is assumed that the aircraft body coordinate system is rotated around the z axis for simplification. In this case, the control command value of the throttle amount and the control command value of the yaw angle are equal in the aircraft body coordinate system and the reference coordinate system, respectively. When the aircraft body coordinate system makes an arbitrary rotation, too, the control command values can be converted between the both coordinate systems by corresponding geometric rotation conversion.

The control part 103a-1 calculates the (synthesized) control command value in the reference coordinate system by combining the command value of the attitude control in the reference coordinate system obtained by such conversion with the external input command value in the reference coordinate system received from the proportional controller and converts the (synthesized) control command value in the reference coordinate system to the (synthesized) control command value in the aircraft body coordinate system by inverse conversion of the conversion in the aforementioned equation (25). The (synthesized) control command value in the aircraft body coordinate system is output form the control part 103a-1 to the control-amount distributor 103a-2.

As an example of another reference coordinate system, assuming that the horizontal direction of the electric current unmanned aircraft 101 when seen from the operator's position (a direction of the electric current unmanned aircraft 101 when seen from the operator, assuming that the altitude of the unmanned aircraft 101 is zero) is the x' direction, and the y' direction and the z' direction can be determined as directions orthogonal to that similarly to FIG. 31. In this case, the electric current position of the unmanned aircraft 101 is measured by the GPS sensor and the like of the sensor part 110 during the flight, the latest x' direction, y' direction, and z' direction are determined by specifying the electric current relative aircraft body position of the unmanned aircraft 101 from the operator's position recorded in advance in the recording device 106 at start of the flight, and the information regulating the latest reference coordinate system is continuously recorded in the recording device 106. The information regulating the latest aircraft body coordinate system is also determined by using the measured value of the attitude sensor (the gyro sensor, the magnetic sensor and the like) as described above and is continuously recorded in the recording device 106. The external input command value input into the control part 103a-1 from the proportional controller is that in the reference coordinate system, and the (synthesized) control command value in the aircraft body coordinate system is similarly determined while coordinate conversion is performed after that.

The calculation of the (synthesized) control command value accompanied by such coordinate conversion may be made only at occurrence of a fault. In one example, the processing in the control part 103a-1 is switched to the "coordinate conversion mode" with occurrence of a fault in the operation of any one of the rotors R1 to R6 and an input of the fault signal from the fault detection part 103c-2 to the control part 103a-1 as a trigger and then, the calculation of the (synthesized) control command value accompanied by the coordinate conversion as above is executed in the control part 103a-1 as described above. The aforementioned processing in the aircraft body coordinate system without coordinate conversion is executed until a fault occurs. Alternatively, regardless of presence of occurrence of a fault, the calculation of the (synthesized) control command value accompanied by the coordinate conversion as above may be executed in the control part 103a-1 as described above. The calculation of the (synthesized) control command value accompanied by the coordinate conversion is advantageous for control when a fault occurred as already described, but use of such calculation of the control command value in combination with the fault handling is not indispensable, and the control part 103a-1 and the control-amount distributor 103a-2 can be configured to calculate the (synthesized) control command value relating to the throttle amount, the roll angle, the pitch angle, and the yaw angle in the unmanned aircraft not including the fault detection circuit or the like, accompanied by the coordinate conversion as described above, so that the control command value relating to the angular speed of each of the rotors is determined by mixing or the like which will be described later from the obtained control command value.

The (synthesized) control command value in the aircraft body coordinate system determined by the control part 103a-1 is output to the control-amount distributor 103a-2. As will be described later, the (synthesized) control command value is converted by the control-amount distributor 103a-2 to the control command value corresponding to the square values of the angular speeds of the rotors R1 to R6 (mixing).

Here, in this embodiment, by using the input of the fault signal from the fault detection part 103c-2 to the control part 103a-1 as a trigger, the output of the (synthesized) control command value relating to the yaw angle to the control-amount distributor 103a-2 is stopped, and only the (synthesized) control command values relating to the throttle amount, the roll angle, and the pitch angle are output to the control-amount distributor 103a-2 (the control part 103a-1 does not originally have to determine the (synthesized) control command value relating to the yaw angle). Since the number of controllable rotors is decreased due to the occurrence of a fault, that is, a degree of freedom of the flight control is lowered, whereby any one of the parameters is no longer controllable in principle, this corresponds to stop of the control of the yaw angle in accordance with that. Particularly in this embodiment, since not only the rotor in which a fault occurred in the operation but also the operation of the rotor located on the side facing that is stopped as will be described later, it is effective to stop the control of the yaw angle so as to reduce the number of control parameters. In this case, the (synthesized) control command value of the yaw angle is handled as zero in the mixing processing which will be described later. The parameter to stop the control is not limited to the yaw angle but may be any one of the throttle amount, the roll angle, and the pitch angle or may be two or more of the throttle amount, the roll angle, the pitch angle, and the yaw angle.

(Mixing)

Subsequently, the mixing processing by the control-amount distributor 103a-2 into which the (synthesized) control command value is input will be described. First, the mixing processing by the control-amount distributor 103a-2 will be described in detail by citing the Description of the Japanese Patent Application No. 2016-241718. By means of the mixing, the control command value expressing the square values $\omega_1^2$ to $\omega_6^2$ (omega$_1^2$ to omega$_6^2$) of the angular speed of each of the rotors R1 to R6 is determined from the (synthesized) control command values (in this embodiment, when a fault occurs, the (synthesized) control command value of the yaw angle is zero. The same applies to the following) of the throttle amount, the roll angle, the pitch angle, and the yaw angle.

The (synthesized) control command values of the throttle amount, the roll angle, the pitch angle, and the yaw angle (in the aircraft body coordinate system) (corresponding to rising/lowering speeds and angular speeds of the roll angle, the pitch angle, and the yaw angle) are expressed by $u_{Throttle}$, $u_{Roll}$, $u_{Pitch}$, and $u_{Yaw}$, respectively, and a control input vector is expressed by the following equation:

[Formula 29]

$$\vec{u} = \begin{bmatrix} u_{Throttle} \\ u_{Roll} \\ u_{Pitch} \\ u_{Yaw} \end{bmatrix} = \begin{bmatrix} T \\ L \\ M \\ N \end{bmatrix} \quad (26)$$

As already described, if a fault occurs in the operation of any one of the rotors, a component of the (synthesized) control command value for stopping the control is assumed to be zero.

The control-amount distribution matrix (mixing matrix) M is expressed by the following equation:

[Formula 30]

$$M \begin{bmatrix} T \\ L \\ M \\ N \end{bmatrix} = \begin{bmatrix} \omega_1^2 \\ \omega_2^2 \\ \omega_3^2 \\ \omega_4^2 \\ \omega_5^2 \\ \omega_6^2 \end{bmatrix} \quad (27)$$

On the other hand, an aircraft-body operation state matrix Mb (hereinafter, M with a bar above in the formula is expressed as "$\overline{M}$" also in the Description similarly to the Japanese Patent Application No. 2016-241718) for calculating the operation state of the aircraft body to the inputs of the square values $\omega_1^2$ to $\omega_6^2$ (omega$_1^2$ to omega$_6^2$) of the angular speeds of the rotors R1 to R6 is expressed by the following equation:

[Formula 31]

$$\overline{M} \begin{bmatrix} \omega_1^2 \\ \omega_2^2 \\ \omega_3^2 \\ \omega_4^2 \\ \omega_5^2 \\ \omega_6^2 \end{bmatrix} = \begin{bmatrix} \sum f \\ \tau_x \\ \tau_y \\ \tau_z \end{bmatrix} \quad (28)$$

where $\Sigma f$ (Sigma f) is a total thrust as the operation state of the unmanned aircraft 101, $\tau_x$ (tau$_x$) is a roll tilt angle (a torque having the x axis of the aircraft body as a rotation axis), $\tau_y$ (tau$_y$) is a pitch tilt angle (a torque having the y axis of the aircraft body as a rotation axis), and $\tau_z$ (tau$_z$) is a yaw tilt angle (a torque having the z axis of the aircraft body as a rotation axis).

This Mb is expressed by the following equation from the outputs and the disposition of the rotors R1 to R6 similarly to the Japanese Patent Application No. 2016-241718:

[Formula 32]

$$\overline{M} = \begin{bmatrix} \kappa_f & \kappa_f & \kappa_f & \kappa_f & \kappa_f & \kappa_f \\ \frac{\kappa_f l}{2} & \kappa_f l & \frac{\kappa_f l}{2} & \frac{-\kappa_f l}{2} & -\kappa_f l & \frac{-\kappa_f l}{2} \\ \frac{\sqrt{3}\kappa_f l}{2} & 0 & \frac{-\sqrt{3}\kappa_f l}{2} & \frac{-\sqrt{3}\kappa_f l}{2} & 0 & \frac{\sqrt{3}\kappa_f l}{2} \\ e_1 \kappa_\tau & e_2 \kappa_\tau & e_3 \kappa_\tau & e_4 \kappa_\tau & e_5 \kappa_\tau & e_6 \kappa_\tau \end{bmatrix} \quad (29)$$

Similarly to the Japanese Patent Application No. 2016-241718, $\kappa_f$ (kappa$_f$) is the proportional constant of the thrust with respect to the square value of the angular speed $\omega$ (omega), $\kappa_\tau$ (kappa$_{tau}$) is the proportional coefficient ($\tau = \kappa_\tau \cdot \omega^2$) (tau=kappa$_{tau}$ multiplied by omega$^2$) of a square of the motor rotation angular speed $\omega$ and the torque ($\tau$: tau), f is the thrust, l (ell) is the distance (length) between the gravity center of the aircraft body and the motor rotation axis, and $e_1$ to $e_6$ are rotor rotation directions (+/−1, namely plus/minus 1) (in the example in FIG. 27, $e_1$, $e_3$, and $e_5$ are +1, and $e_2$, $e_4$, and $e_6$ are −1).

However, the aforementioned equation (29) is when there is no fault in the operations of all the rotors R1 to R6. Similarly to the Japanese Patent Application No. 2016-241718, the fault element $\eta_i$ (eta$_i$. i=1 to 6 is the number of the rotor) of the rotors R1 to R6 is set as follows:

[Formula 33]

$$\eta_i = \begin{cases} 1 & \text{(when normal)} \\ 0 & \text{(when fault)} \end{cases} \quad (30)$$

The fault element $\eta_i$ (eta$_i$) is included in the fault state indicated by the signal (a fault signal in FIG. 29 or a signal indicating that the operations of all the rotors are normal) sent from the fault detection part 103c-2 to the control-amount distributor 103a-2. And by including the fault occurrence situation in the operations of the rotors R1 to R6 in the aircraft-body operation state matrix Mb, the following equation is obtained:

[Formula 34]

$$\overline{M} = \begin{bmatrix} \kappa_f \eta_1 & \kappa_f \eta_2 & \kappa_f \eta_3 & \kappa_f \eta_4 & \kappa_f \eta_5 & \kappa_f \eta_6 \\ \frac{\kappa_f l \eta_1}{2} & \kappa_f l \eta_2 & \frac{\kappa_f l \eta_3}{2} & \frac{-\kappa_f l \eta_4}{2} & -\kappa_f l \eta_5 & \frac{-\kappa_f l \eta_6}{2} \\ \frac{\sqrt{3}\kappa_f l \eta_1}{2} & 0 & \frac{-\sqrt{3}\kappa_f l \eta_3}{2} & \frac{-\sqrt{3}\kappa_f l \eta_4}{2} & 0 & \frac{\sqrt{3}\kappa_f l \eta_6}{2} \\ e_1 \kappa_\tau \eta_1 & e_2 \kappa_\tau \eta_2 & e_3 \kappa_\tau \eta_3 & e_4 \kappa_\tau \eta_4 & e_5 \kappa_\tau \eta_5 & e_6 \kappa_\tau \eta_6 \end{bmatrix} \quad (31)$$

hereinafter, the aircraft-body operation state matrix including the fault occurrence situation expressed by the aforementioned equation (31) is expressed as Mb ($\eta_i$ (eta$_i$)).

When the aforementioned equations are organized, the following equation is obtained similarly to the Japanese Patent Application No. 2016-241718:

[Formula 35]

$$\overline{M}(\eta_i)M \begin{bmatrix} T \\ L \\ M \\ N \end{bmatrix} = \begin{bmatrix} \sum f \\ \tau_x \\ \tau_y \\ \tau_z \end{bmatrix} \quad (32)$$

Then, when the control-amount distribution matrix M corresponding also to occurrence of a fault is calculated by using a pseudo inverse matrix similarly to the Japanese Patent Application No. 2016-241718, the following equation is obtained:

[Formula 36]

$$M = \overline{M}(\eta_i)^T (\overline{M}(\eta_i)\overline{M}(\eta_i)^T)^{-1} \begin{bmatrix} \sigma_T & 0 & 0 & 0 \\ 0 & \sigma_L & 0 & 0 \\ 0 & 0 & \sigma_M & 0 \\ 0 & 0 & 0 & \sigma_N \end{bmatrix} \quad (33)$$

Similarly to the Japanese Patent Application No. 2016-241718, $\tau_T$ (sigma$_T$) is a mixing (control amount distribution) matrix integer parameter relating to the throttle amount (Thr), $\tau_L$ (sigma$_L$) is a mixing (control amount distribution) matrix integer parameter relating to the roll (Roll) angle, $\sigma_M$ (sigma$_M$) is a mixing (control amount distribution) matrix integer parameter relating to the pitch (Pitch) angle, $\sigma N$ (sigma$_N$) is a mixing (control amount distribution) matrix integer parameter relating to the yaw (Yaw) angle.

When the Japanese Patent Application No. 2016-241718 is followed, the control-amount distributor 103a-2 sets $\eta_i$ (eta$_i$) in accordance with the aforementioned equation (30) and determines the control command values of the square values $\omega_1^2$ to $\omega_6^2$ (omega$_1^2$ to omega$_6^2$) of the angular speeds of the rotors R1 to R6 by multiplying control input vector u by the matrix M in accordance with the aforementioned equation (27) by using the control-amount distribution matrix M obtained by the aforementioned equation (33). However, the control processing according to the fault in this embodiment is different from this.

That is, if a fault occurs in the operation of the rotor R1, for example, if the method proposed in the Japanese Patent Application No. 2016-241718 is followed, the control-amount distribution matrix M is used with the fault element $\eta_1$ (eta$_1$) corresponding to the rotor R1 at zero and $\eta_2$ to $\eta_6$ (eta$_2$ to eta$_6$) at 1, but in this embodiment, the fault element $\eta_4$ (eta$_4$) corresponding to the rotor R4 located on the side facing the rotor R1 is also set to zero in addition to $\eta_1$ (eta$_1$). In more detail, a relationship between the rotor in which the fault occurred and the set value of the fault element $\eta_i$ (eta) corresponding to this in this embodiment is as shown in Table 3 below:

TABLE 3

| Rotor in which fault occurred | Set value of fault element |
|---|---|
| 1 or more in rotors R1 and R4 | $\eta_1 = \eta_4 = 0$ (eta$_1$ = eta$_4$ = 0), $\eta_2 = \eta_3 = \eta_5 = \eta_6 = 1$ (eta$_2$ = eta$_3$ = eta$_5$ = eta$_6$ = 1) |
| 1 or more in rotors R2 and R5 | $\eta_2 = \eta_5 = 0$ (eta$_2$ = eta$_5$ = 0), $\eta_1 = \eta_3 = \eta_4 = \eta_6 = 1$ (eta$_1$ = eta$_3$ = eta$_4$ = eta$_6$ = 1 |
| 1 or more in rotors R3 and R6 | $\eta_3 = \eta_5 = 0$ (eta$_3$ = eta$_5$ = 0), $\eta_1 = \eta_2 = \eta_4 = \eta_5 = 1$ (eta$_1$ = eta$_2$ = eta$_4$ = eta$_5$ = 1) |

The control-amount distributor 103a-2 sets the fault element 11i (eta$_i$) as described above according to the fault signal input from the fault detection part 103c-2 (if a signal indicating that there is no fault in any of the rotors is input, all the fault element $\eta_i$ (eta)=1) and executes mixing in accordance with the aforementioned equation (27) with $u_{YAW}$ in the aforementioned equation (26) set to zero in accordance with the fault signal so as to determine the control command values of the angular speeds of the four rotors excluding the rotor in which a fault occurred in the operation and the rotor located on the side facing that. The control signals indicating the control command values of the angular speeds are converted to the pulse signals by the signal conversion circuit 24b and converted to the driving electric current by the corresponding speed controller, whereby the driving of the corresponding motor is controlled and the rotation speeds of the four rotors are controlled. If only one rotor in which a fault occurred is stopped, a spin of the aircraft body becomes an acceleration motion by an anti-torque in the yaw direction, the gravity center position of the aircraft body is not made stable, and there is a concern that control of the roll angle and the pitch angle can diverge easily, but occurrence of such a problem can be prevented by also stopping the rotor on the facing side.

To set the fault elements $\eta_i$ (eta$_i$), $\eta_j$ (eta$_j$) of the rotor in which the fault occurred and the rotor located on the facing side as shown in [Table 3] to zero is not indispensable, and the operation of the rotor may be allowed to such a degree that does not give a great influence to flight control by setting them to small values such as 0.01, for example. The flight can be controlled mainly by the remaining four rotors by at least reducing the rotation speeds of the rotor with fault occurrence and the rotor on the facing side. Moreover, when the measured value of the electric current flowing through the motor driving the rotor with fault occurrence is extremely lower than the aforementioned model value and the motor driving the rotor with fault occurrence is determined to fail or the like (the electric current value of each of the motors M1 to M6 measured by the voltage/electric current/number of rotations sensors S1 to S6 is input to the fault detection part 103c-2, and the fault detection part 103c-2 also makes such determination and can include such information in the aforementioned fault signal output from the fault detection part 103c-2 at occurrence of the fault), the fault element $\eta_i$ (eta$_i$) of the rotor with fault occurrence is left at 1, and only the fault element $\eta_j$ (eta$_j$) on the facing side rotor may be set to zero (or a value smaller than 1).

Trial Machine

The inventor designed a trial machine of the unmanned aircraft 101 executing flight control according to a fault in accordance with this embodiment as described above. Configuration of the trial machine is basically similar to the configuration illustrated in FIG. 28. Moreover, a flow of the flight control in the trial machine is illustrated in block diagrams in FIG. 32A and FIG. 32B.

The trial machine is operated in any one of three flight modes, that is, an attitude control mode, an autonomous flight mode, and a GPS assist mode. The attitude control mode is a mode of the flight control in accordance with an external input signal from the proportional controller and in which only the attitude is autonomously controlled. The autonomous flight mode is a mode of the autonomous flight in accordance with a flight plan by control of the autonomous control program. The GPS assist mode is a mode of controlling an attitude and a position during hovering or the like by combining the control command values determined by the autonomous control program while the flight is basically controlled by the external input signal from the proportional controller. Mode is switched by receiving a switching signal input from the proportional controller. Processing of each block which will be described later is different depending on the flight mode.

Figure 32A:
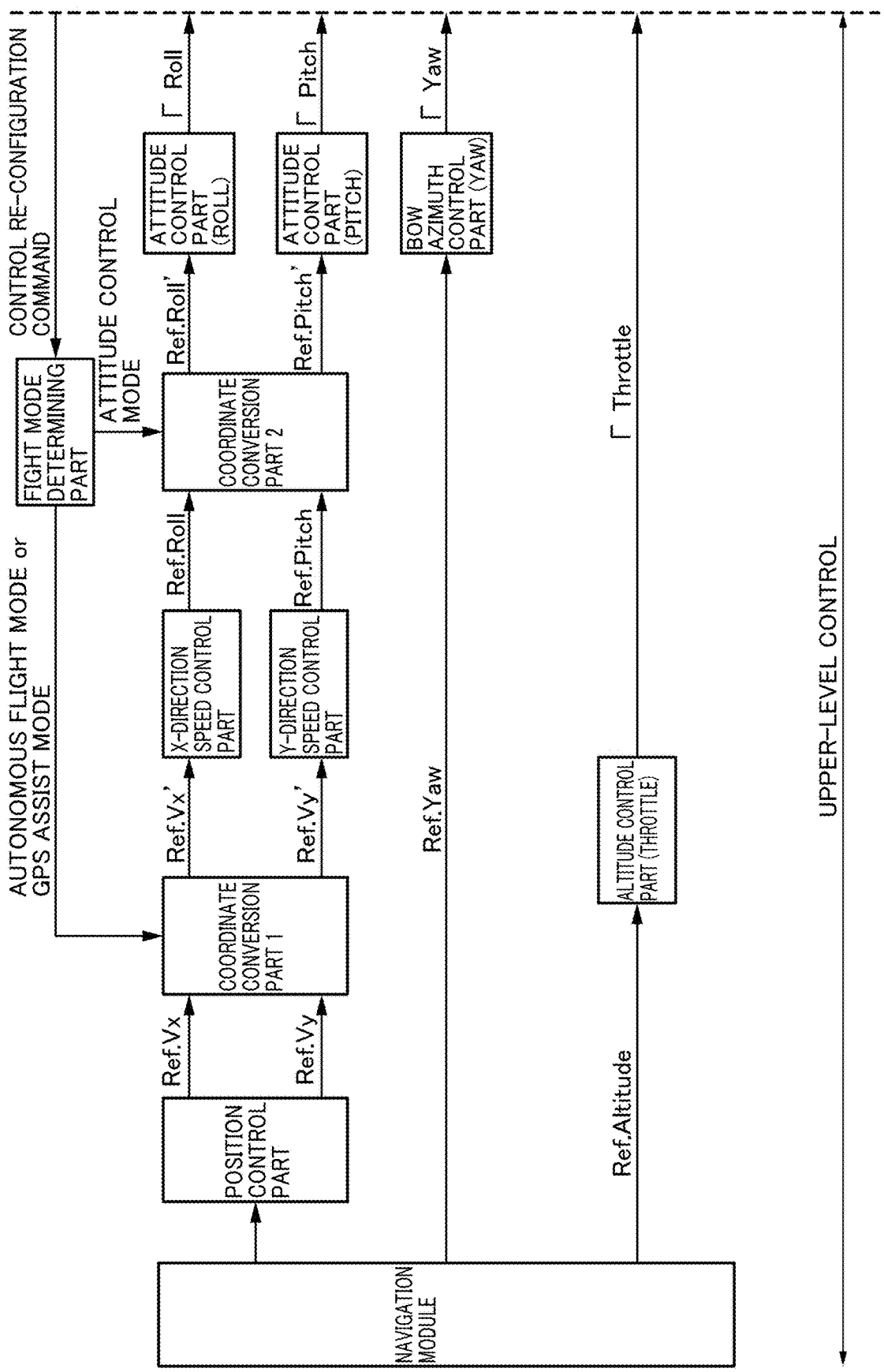
FIG. 32A is a block diagram (upper-level control) illustrating a flow of the flight control in a trial machine.

Each block constituting the upper-level control in FIG. 32A expresses a conceptual functional part performing the function of the main operation circuit 103*a* executing the autonomous control program 105*a*, respectively, and the processing in these functional parts is executed basically by the main operation circuit 103*a* executing the autonomous control program 105*a*. Moreover, in each block constituting the lower-level control in FIG. 32B, the fault detection part expresses a conceptual functional part performing the function of the fault detection circuit 103*c* executing the fault detection program 105*b* (corresponding to the identification model output calculation part 103*c*-1 and the fault detection part 103*c*-2 in FIG. 29), the processing in this functional part is executed basically by the fault detection circuit 103*c* executing the fault detection program 105*b*. The remaining blocks in the lower-level control express conceptual functional parts performing the functions of the main operation circuit 103*a* executing the autonomous control program 105*c*, respectively. Blocks corresponding to functions of the voltage/electric current/number of rotations sensors S1 to S6, the A/D converter 111 and the like are not illustrated. In the navigation module, a third-party module (a circuit board and a firmware) called Waypoint Sequencer (Hexpert Systems) is incorporated as a part thereof (this circuit board constitutes a part of the main operation circuit 103*a*, and this firmware constitutes a part of the autonomous control program 105*a*) in this trial machine, and it outputs electric current position information obtained from the GPS sensor of the sensor part 110 and target position information recorded by the firmware in the circuit board in advance to the position control part. Moreover, from the navigation module, various types of information from a speed sensor, an azimuth sensor (magnetic sensor), an altitude sensor and the like of the sensor part 110 is also output as navigation information.

The position control part calculates the control command values (reference values) Ref. Vx, Ref. Vy by the autonomous control of speeds Vx, Vy in the x direction and the y direction in the aircraft body coordinate system from the electric current position information, target position information, speed information, azimuth information and the like input from the navigation module in the autonomous flight mode and the GPS assist mode. The values Ref. Vx, Ref. Vy are sent to the coordinate conversion part 1. Processing by the position control part is not executed in the attitude control mode.

The processing by the coordinate conversion part 1 is processing executed only in the autonomous flight mode and the GPS assist mode and when a fault occurs (when a command is received from a flight mode determination part). Here, as described by using FIG. 31, the control command values Ref. Vx, Ref. Vy are converted from the aircraft body coordinate system to the reference coordinate system (here, the geographic coordinate system regulated by the latitude, longitude, and altitude).

[Formula 37]

$$\begin{bmatrix} Ref. \ Vx' \\ Ref. \ Vy' \end{bmatrix} = \begin{bmatrix} \cos(\phi - \theta) & \sin(\phi - \theta) \\ -\sin(\phi - \theta) & \cos(\phi - \theta) \end{bmatrix} \begin{bmatrix} Ref. \ Vx \\ Ref. \ Vy \end{bmatrix} \quad (34)$$

Control command values Ref. Vx', Ref. Vy' of the reference coordinate system are output to an x-direction speed control part and a y-direction speed control part (the control command values Ref. Vx, Ref. Vy are output in the normal time).

In the normal time, an x-direction speed control part and a y-direction control part:

(i) calculates the control command values Ref. Roll, Ref. Pitch of the roll angle and the pitch angle in the aircraft body coordinate system in accordance with the autonomous control program from the control command values Ref. Vx, Ref. Vy in the aircraft body coordinate system in the autonomous flight mode.

(ii) In the GPS assist mode, the (synthesized) control command values of Vx and Vy are calculated by combining the control command values Ref. Vx, Ref. Vy in the aircraft body coordinate system with the external input command values Ref. Vxext, Ref. Vyext of the x-direction and y-direction speeds Vx, Vy in the aircraft body coordinate system received from the proportional controller, and the control command values Ref. Roll, Ref. Pitch of the roll angle and the pitch angle in the aircraft body coordinate system are calculated from them.

(iii) In the attitude control mode, the control command values Ref. Roll, Ref. Pitch of the roll angle and the pitch angle in the aircraft body coordinate system are calculated from the external input command values Ref. Vxext, Ref. Vyext of the x-direction and y-direction speeds Vx, Vy in the aircraft body coordinate system received from the proportional controller are calculated.

The control command values Ref. Roll, Ref. Pitch of the roll angle and the pitch angle in the aircraft body coordinate system are output to a coordinate conversion part 2.

At occurrence of a fault, the x-direction speed control part and the y-direction control part:

(i) in the autonomous flight mode, converts the control command values Ref. Vx', Ref. Vy' in the reference coordinate system to the control command values of Vx, Vy in the aircraft body coordinate system by inverse conversion of the conversion the aforementioned equation (34) and further calculates the control command values Ref. Roll, Ref. Pitch of the roll angle and the pitch angle in the aircraft body coordinate system from them.

(ii) In the GPS assist mode, the (synthesized) control command values of Vx' and Vy' are calculated by combining the control command values Ref. Vx', Ref. Vy' in the reference coordinate system with the external input command values Ref. Vx'ext, Ref. Vy'ext of the x'-direction and y'-direction speeds Vx', Vy' in the reference coordinate system received from the proportional controller, converts them to the (synthesized) control command values of Vx, Vy in the aircraft body coordinate system by inverse conversion of the conversion in the aforementioned equation (34), and further the control command values Ref. Roll, Ref. Pitch of the roll angle and the pitch angle in the aircraft body coordinate system are calculated from them.

(iii) In the attitude control mode, the external input command values Ref. Vx'ext, Ref. Vy'ext of the x'-direction and y'-direction speeds Vx', Vy' in the reference coordinate system received from the proportional controller are converted to the control command values of Vx, Vy in the aircraft body coordinate system by inverse conversion of the conversion in the aforementioned equation (34), and further the control command values Ref. Roll, Ref. Pitch of the roll angle and the pitch angle in the aircraft body coordinate system are calculated from them.

The control command values Ref. Roll, Ref. Pitch of the roll angle and the pitch angle in the aircraft body coordinate system are output to the coordinate conversion part 2.

In the coordinate conversion part 2, at occurrence of a fault, the control command values Ref. Roll, Ref. Pitch of the roll angle and the pitch angle in the aircraft body coordinate system are converted to the control command values Ref. Roll', Ref. Pitch' of the roll angle and the pitch angle in the reference coordinate system (it is the geographic coordinate system as described above in the autonomous flight mode and the GPS assist mode, but in the attitude control mode, it is assumed to be the aircraft body coordinate system at start of the flight of the unmanned aircraft 101) in accordance with the equation (35) below:

[Formula 38]

$$\begin{bmatrix} Ref. \text{ Roll}' \\ Ref. \text{ Pitch}' \end{bmatrix} = \begin{bmatrix} \cos(\phi - \theta) & \sin(\phi - \theta) \\ -\sin(\phi - \theta) & \cos(\phi - \theta) \end{bmatrix} \begin{bmatrix} Ref. \text{ Roll} \\ Ref. \text{ Pitch} \end{bmatrix} \quad (35)$$

The control command values Ref. Roll', Ref. Pitch' of the roll angle and the pitch angle in the reference coordinate system are sent to an attitude control part (roll) and an attitude control part (pitch). In the normal time, the processing by the coordinate conversion part 2 is not executed, but the control command values Ref. Roll, Ref. Pitch of the roll angle and the pitch angle in the aircraft body coordinate system are output.

In the normal time, the attitude control part (roll) and the attitude control part (pitch):

(i) in the autonomous flight mode, modifies the control command values Ref. Roll, Ref. Pitch in the aircraft body coordinate system by dynamic calculation of the angular speed and the attitude by using attitude information from the attitude sensor and the like and converts them to control command values Γ (Gamma) Roll, Γ (Gamma) Pitch of the roll angle and the pitch angle in the aircraft body coordinate system considering stability of the attitude.

(ii) In the GPS assist mode and the attitude control mode, in addition to the control command values Ref. Roll, Ref. Pitch in the aircraft body coordinate system, the (synthesized) control command values of the roll angle and the pitch angle in the aircraft body coordinate system are obtained by combining them with the external input command values Ref. Rollext, Ref. Pitchext of the roll angle and the pitch angle in the aircraft body coordinate system received from the proportional controller as inputs. Moreover, the (synthesized) control command values in the aircraft body coordinate system are modified by the dynamic calculation of the angular speed and the attitude by using the attitude information from the attitude sensor and the like and converted to the control command values Γ (Gamma) Roll, Γ (Gamma) Pitch of the roll angle and the pitch angle in the aircraft body coordinate system considering stability of the attitude.

At occurrence of a fault, the attitude control part (roll) and the attitude control part (pitch):

(i) in the autonomous flight mode, modifies the control command values Ref. Roll', Ref. Pitch' in the reference coordinate system by dynamic calculation of the angular speed and the attitude by using attitude information from the attitude sensor and the like, calculates the control command values of the roll angle and the pitch angle, considering stability of the attitude, and further converts them to the control command values Γ (Gamma) Roll, Γ (Gamma) Pitch in the aircraft body coordinate system by inverse conversion of the conversion in the aforementioned equation (35).

(ii) In the GPS assist mode and the attitude control mode, in addition to the control command values Ref. Roll', Ref. Pitch' in the reference coordinate system, the (synthesized) control command values of the roll angle and the pitch angle in the reference coordinate system are obtained by combining them with the external input command values Ref. Roll'ext, Ref. Pitch'ext of the roll angle and the pitch angle in the reference coordinate system received from the proportional controller as inputs. Moreover, the (synthesized) control command values in the reference coordinate system are modified by the dynamic calculation of the angular speed and the attitude by using the attitude information from the attitude sensor and the like and further converted to the control command values Γ (Gamma) Roll, Γ (Gamma) Pitch in the aircraft body coordinate system by inverse conversion of the conversion in the aforementioned equation (35).

A bow azimuth control part (yaw) receives an input of a control command value (reference value) Ref. Yaw which is information relating to the electric current bow azimuth of the aircraft body (an angle between the x direction and the north direction in FIG. 26) from the navigation module. A control command value r (Gamma) Yaw of the yaw angle is determined by the bow azimuth control part (yaw) from this control command value Ref. Yaw and a target bow azimuth determined by comparing the electric current position of the aircraft body and the target position or the like (in the autonomous flight mode, the target position is determined by the autonomous control program from the flight plan path information. In the attitude control mode and the GPS assist mode, the target position is determined by the autonomous control program by using the external input value from the proportional controller).

An altitude control part (throttle) receives an input of a control command value (reference value) Ref. Altitude which is information relating to the electric current altitude from the navigation module. A control command value Γ (Gamma) Throttle of the throttle amount relating to a target value of rising or lowering is determined by comparing this control command value Ref. Altitude with the target altitude of the aircraft body or the like (in the autonomous flight mode, the target altitude is determined by the autonomous control program from the flight plan path information. In the attitude control mode and the GPS assist mode, the target altitude is determined by the autonomous control program by using the external input value from the proportional controller).

Figure 32B:
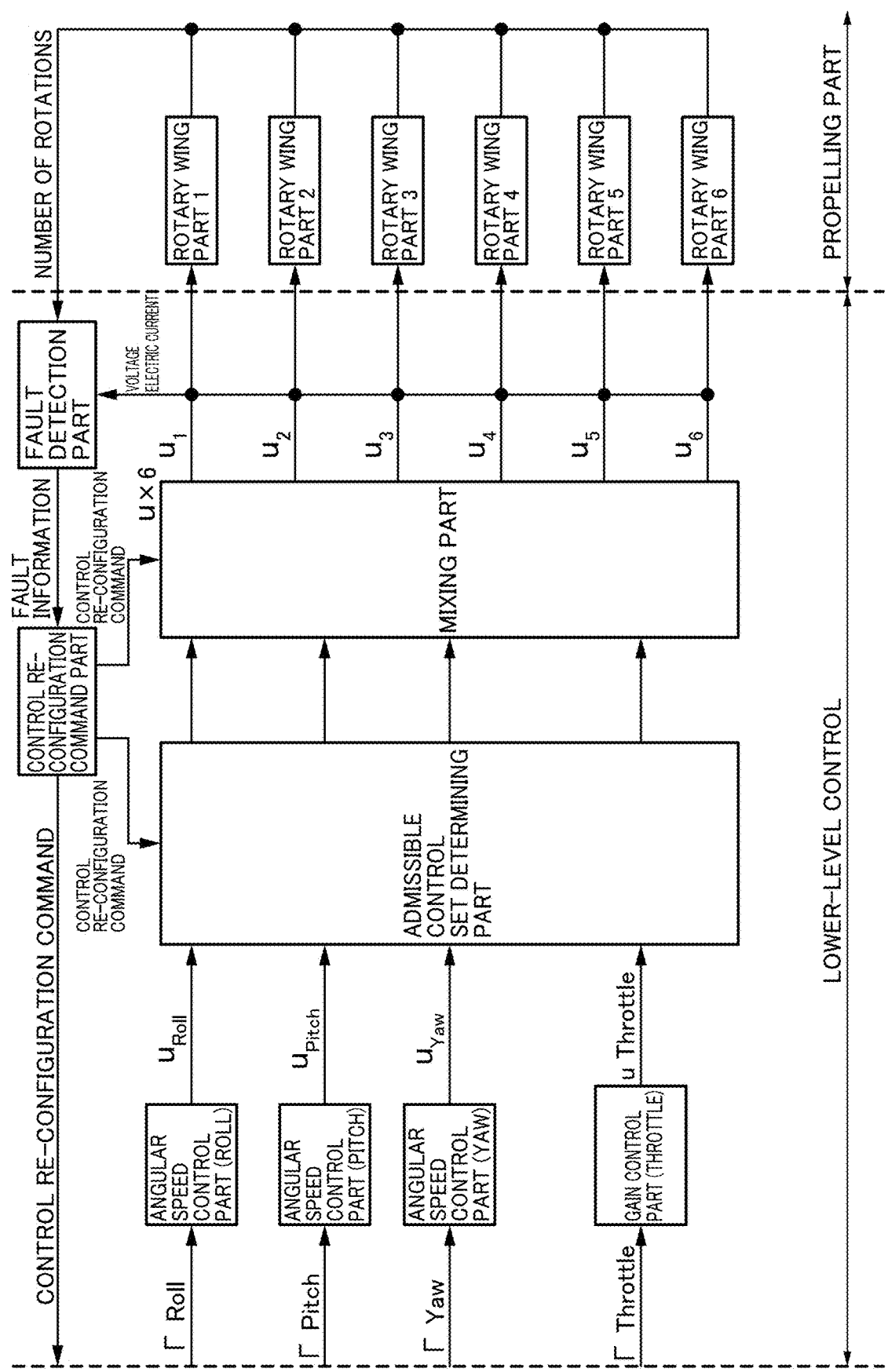
FIG. 32B is a block diagram (lower-level control) illustrating a flow of the flight control in the trial machine.

The values Γ (Gamma) Roll, Γ (Gamma) Pitch, Γ (Gamma) Yaw, and Γ (Gamma) Throttle are output to an angular speed control part (roll), an angular speed control part (pitch), an angular speed control part (yaw), and a gain control part (throttle) as illustrated in FIG. 32B. The angular speed control part (roll), the angular speed control part (pitch), the angular speed control part (yaw), and the gain control part (throttle) determine $u_{Roll}$ which is the control command value of the angular speed of the roll angle, $u_{Pitch}$ which is the control command value of the angular speed of the pitch angle, $u_{Yaw}$ which is the control command value of the angular speed of the yaw angle, and $u_{Throttle}$ which is the control command value of a speed of rising or lowering from Γ (Gamma) Roll, Γ (Gamma) Pitch, Γ (Gamma) Yaw, and Γ (Gamma) Throttle, respectively. They are output to Admissible Control Set determining part.

The angular speeds of the roll angle, the pitch angle, and the yaw angle and the speeds of rising or lowering in the unmanned aircraft have allowable upper limit values and lower limit values determined from performances, specifications and the like of the aircraft body. In this trial machine, this restriction is expressed by the following equation:

[Formula 39]

$$\begin{bmatrix} u_{min} \\ u_{min} \\ u_{min} \\ u_{min} \\ u_{min} \\ u_{min} \end{bmatrix} \leq \begin{bmatrix} 1 & -1 & \sqrt{3} & 1 \\ 1 & -2 & 0 & -1 \\ 1 & -1 & -\sqrt{3} & 1 \\ 1 & 1 & -\sqrt{3} & -1 \\ 1 & 2 & 0 & 1 \\ 1 & 1 & \sqrt{3} & -1 \end{bmatrix} \begin{bmatrix} u_{Throttle} \\ u_{Roll} \\ u_{Pitch} \\ u_{Yaw} \end{bmatrix} \leq \begin{bmatrix} u_{max} \\ u_{max} \\ u_{max} \\ u_{max} \\ u_{max} \\ u_{max} \end{bmatrix} \quad (36)$$

This inequality means a relationship that each element of 6×1 vectors obtained by the matrix calculation at the center is $u_{min}$ or more and $u_{max}$ or less. In order to satisfy this inequality, the Admissible Control Set determining part adjusts $u_{Roll}$ and $u_{Pitch}$.

As conditions which should be satisfied by the control command values $u_{Throttle}$, $u_{Roll}$, $u_{Pitch}$ and $u_{Yaw}$ when a fault does not occur, the following expression is obtained from the aforementioned expression (36):

[Formula 40]

$$\begin{cases} u_{min} \leq u_{Throttle} - u_{Roll} + \sqrt{3}\, u_{Pitch} + u_{Yaw} \leq u_{max} \\ u_{min} \leq u_{Throttle} - 2u_{Roll} - u_{Yaw} \leq u_{max} \\ u_{min} \leq u_{Throttle} - u_{Roll} - \sqrt{3}\, u_{Pitch} + u_{Yaw} \leq u_{max} \\ u_{min} \leq u_{Throttle} + u_{Roll} - \sqrt{3}\, u_{Pitch} - u_{Yaw} \leq u_{max} \\ u_{min} \leq u_{Throttle} + 2u_{Roll} + u_{Yaw} \leq u_{max} \\ u_{min} \leq u_{Throttle} + u_{Roll} + \sqrt{3}\, u_{Pitch} - u_{Yaw} \leq u_{max} \end{cases} \quad (37)$$

Moreover, the following expression is obtained from the aforementioned expression (37):

[Formula 41]

$$\begin{cases} 2|u_{Roll}| \leq \min\{u_{Throttle} - u_{min}, u_{max} - u_{Throttle}\} \\ |u_{Roll}| + \sqrt{3}\,|u_{Pitch}| \leq \min\{u_{Throttle} - u_{min}, u_{max} - u_{Throttle}\} \end{cases} \quad (38)$$

Here, min{A, B} expresses a smaller value in A and B.
Here, a range of $u_{Yaw}$ is defined by the following expression:

[Formula 42]

$$0 \leq u_{Yaw} \leq Y \quad (39)$$

At this time, an admissible control set admissible as the maximum value $|u_{Roll\ Max}|$, $|u_{Pitch\ Max}|$ of magnitudes of $u_{Roll}$ and $u_{Pitch}$ is, with the following:

[Formula 43]

$$\alpha = \min\{u_{Throttle} + u_{Yaw} - u_{min}, u_{max} - u_{Throttle} - u_{Yaw}\} \quad (40)$$

given by the following equation:

[Formula 44]

$$|u_{Roll\ Max}| = \frac{\alpha}{2} \quad (41)$$
$$|u_{Pitch\ Max}| = \frac{\sqrt{3}}{6}\alpha$$

The values $u_{Roll}$ and $u_{Pitch}$ adjusted to the maximum value or less in the aforementioned expression (41) are both output to the mixing part from the Admissible Control Set determining part as Admissible Control Set $\Phi_{RP}$ (phi$_{RP}$) together with $u_{YAW}$ and $u_{Throttle}$.

The mixing part determines the control command values expressing the square values $\omega_1^2$ to $\omega_6^2$ (omega$_1^2$ to omega$_6^2$) of the angular speeds of the rotary wings of each of the rotary wing parts 1 to 6 from, $u_{Roll}$, $u_{Pitch}$, $u_{Yaw}$, and $u_{Throttle}$ as already described by using the equations (26) to (33). After that, the angular speed of each rotary wing is controlled by the speed controller and the motor by using these control command values.

The fault detection part determines presence of occurrence of a fault in the operation of the rotary wing by using the measured values of the voltage, the electric current, and the number of rotations as already described. When it is determined that a fault occurred, fault information is output from the fault detection part to a control re-configuration command part, and a control re-configuration command is output from the control re-configuration command part to each of the functional parts.

In the flight mode determining part, at detection of a fault, feedback is made to each of the coordinate conversion parts in each of the flight modes on the basis of the flight mode set by the proportional controller. As already described, the coordinate conversion by the coordinate conversion parts 1 and 2 is conducted in accordance with the flight mode after that.

In the Admissible Control Set determining part, a determining algorithm of the Admissible Control Set is changed in accordance with the control re-configuration command. More specifically, the aforementioned equation (37) is changed to:

[Formula 45]

$$\begin{cases} \eta_1(u_{min} \leq u_{Throttle} - u_{Roll} + \sqrt{3}\, u_{Pitch} \leq u_{max}) \\ \eta_2(u_{min} \leq u_{Throttle} - 2u_{Roll} \leq u_{max}) \\ \eta_3(u_{min} \leq u_{Throttle} - u_{Roll} - \sqrt{3}\, u_{Pitch} \leq u_{max}) \\ \eta_4(u_{min} \leq u_{Throttle} + u_{Roll} - \sqrt{3}\, u_{Pitch} \leq u_{max}) \\ \eta_5(u_{min} \leq u_{Throttle} + 2u_{Roll} \leq u_{max}) \\ \eta_6(u_{min} \leq u_{Throttle} + u_{Roll} + \sqrt{3}\, u_{Pitch} \leq u_{max}) \end{cases} \quad (42)$$

In this trial machine, the fault elements relating to a rotary wing with fault occurrence and a rotary wing located on the side facing it become zero, that is, limitation on an allowable range relating to these rotors is lifted.

At this time, the admissible control set which is admissible as the maximum value $|u_{Roll\ Max}(\eta_i(\text{eta}_i))|$, $|u_{Pitch\ Max}(\eta_i(\text{eta}_i))|$ of magnitudes of $u_{Roll}$ and $u_{Pitch}$ is, with the following:

[Formula 46]

$$\beta = \alpha = \min\{u_{Throttle} - u_{min}, u_{max} - u_{Throttle}\} \quad (43)$$

given by the following equation:

[Formula 47]

$$|u_{Roll\ Max}(\eta_i)| = \frac{\beta}{2} \quad (44)$$

$$|u_{Pitch\ Max}(\eta_i)| = \frac{\sqrt{3}}{6}\beta$$

The values $u_{Roll}$ and $u_{Pitch}$ adjusted to the maximum value or less in the aforementioned expression (44) are output to the mixing part from the Admissible Control Set determining part as Admissible control Set $\Phi\ (\text{phi})_{RP}(\eta_i(\text{eta}_i))$ together with $u_{Throttle}$. In this trial machine, since the control of the yaw angle is stopped at occurrence of a fault, $u_{Yaw}$ is not output.

Moreover, the algorithm of mixing in the mixing part is also changed in accordance with the control re-configuration command. In this trial machine, the fault elements relating to the rotor with fault occurrence and the fault on the facing side are set to zero as already described, whereby the aircraft-body operation state matrix Mb is changed in accordance with the equation (31), and the rotor with fault occurrence and the rotor on the facing side are stopped.

INDUSTRIAL APPLICABILITY

The present invention can be used for handling a fault in any unmanned aircraft used for any applications including an industrial use and a hobby use.

REFERENCE SIGNS LIST 1 small-sized helicopter (multi-rotor helicopter)
10 aircraft body (equipment)
R1, R2, R3, R4, R5, R6 rotor part (actuator part)
20 control unit (fault tolerance control device)
21 control part
22 control-amount distributor
23 AD conversion part
24 identification model output calculation part
25 fault detection part
101 unmanned aircraft
102 body part
103a main operation circuit
103a-1 control part
103a-2 control-amount distributor
103b signal conversion circuit
103c fault detection circuit
103c-1 identification model output calculation part
103c-2 fault detection part
104 (rotary wing) control signal generation circuit
105a autonomous control program
105b fault detection program
105c various databases
106 recording device
107 power supply system
108 communication antenna
109 communication circuit
110 sensor part
111 A/D converter

The invention claimed is:

1. A control device for unmanned aircraft comprising:
a rotary-wing control signal generation circuit for generating a rotary wing control signal for causing a driver to drive a plurality of rotary wings for flying the unmanned aircraft;
a measurer for measuring a physical amount relating to an operation of at least one of the plurality of rotary wings; and
a fault detection circuit for detecting a fault in the operation of at least one of the plurality of rotary wings by using the physical amount measured by the measurer,
wherein the rotary-wing control signal generation circuit is configured to generate a rotary wing control signal depending on the fault detected by the fault detection circuit in the operation of at least one of the plurality of rotary wings,
wherein the rotary-wing control signal generation circuit includes a control-amount distributor for distributing control amounts relating to flight of the unmanned aircraft correspondingly to the respective ones of the plurality of rotary wings,
wherein the control-amount distributor is configured to change distribution amounts of the control amounts corresponding to the respective ones of the plurality of rotary wings so that the unmanned aircraft performs an operation depending on the control amounts, depending on the fault detected by the fault detection circuit,
wherein
six rotary wings are provided as the plurality of rotary wings; and
the control-amount distributor is configured to distribute the control amounts by using the following control-amount distribution matrix M:

[Formula 1]

$$M = \overline{M}(\eta_i)^T \left(\overline{M}(\eta_i)\overline{M}(\eta_i)^T\right)^{-1} \begin{bmatrix} \sigma_T & 0 & 0 & 0 \\ 0 & \sigma_L & 0 & 0 \\ 0 & 0 & \sigma_M & 0 \\ 0 & 0 & 0 & \sigma_N \end{bmatrix}$$

where

-continued

[Formula 2]

$$\overline{M} = \begin{bmatrix} \kappa_f \eta_1 & \kappa_f \eta_2 & \kappa_f \eta_3 & \kappa_f \eta_4 & \kappa_f \eta_5 & \kappa_f \eta_6 \\ \dfrac{\kappa_f l \eta_1}{2} & \kappa_f l \eta_2 & \dfrac{\kappa_f l \eta_3}{2} & \dfrac{-\kappa_f l \eta_4}{2} & -\kappa_f l \eta_5 & \dfrac{-\kappa_f l \eta_6}{2} \\ \dfrac{\sqrt{3}\,\kappa_f l \eta_1}{2} & 0 & \dfrac{-\sqrt{3}\,\kappa_f l \eta_3}{2} & \dfrac{-\sqrt{3}\,\kappa_f l \eta_4}{2} & 0 & \dfrac{\sqrt{3}\,\kappa_f l \eta_6}{2} \\ e_1 \kappa_\tau \eta_1 & e_2 \kappa_\tau \eta_2 & e_3 \kappa_\tau \eta_3 & e_4 \kappa_\tau \eta_4 & e_5 \kappa_\tau \eta_5 & e_6 \kappa_\tau \eta_6 \end{bmatrix}$$

[Formula 3]

$$\eta_i = \begin{cases} 1 & \text{(when normal)} \\ 0 & \text{(when fault)} \end{cases}$$

where i is a number of the rotary wing, $\sigma_T$ (sigma$_T$) is a mixing (control amount distribution) matrix integer parameter relating to a throttle amount (Thr), $\sigma$(sigma$_L$) is a mixing (control amount distribution) matrix integer parameter relating to a roll (Roll) angle, $\sigma_M$ (sigma$_M$) is a mixing (control amount distribution) matrix integer parameter relating to a pitch (Pitch) angle, $\sigma_N$ (sigma$_N$) is a mixing (control amount distribution) matrix integer parameter relating to a yaw (Yaw) angle, $\kappa_f$(kappa$_f$) is a proportional constant of a thrust with respect to a square value of an angular speed $\omega$ (omega), $\kappa_\tau$ (kappa$_{tau}$) is a proportional coefficient ($\tau = \kappa_\tau \cdot \omega^2$) (tau=kappa$_{tau}$ multiplied by omega$^2$) of a square of a motor rotation angular speed and a torque ($\tau$: tau), l (ell) is a distance (length) between a gravity center of an aircraft body and a motor rotation axis, and f is a thrust, $e_i$ is +1 or −1 depending on the direction of rotation of the rotary-wing.

2. The control device for unmanned aircraft according to claim 1, wherein
the rotary-wing control signal generation circuit is configured to generate a rotary-wing control signal at least for reducing a rotation speed of a rotary wing located on a side facing a rotary wing in which a fault in an operation is detected by the fault detection circuit in the plurality of rotary wings, depending on a fault detected by the fault detection circuit in an operation of at least one of the plurality of rotary wings.

3. The control device for unmanned aircraft according to claim 2, wherein
the rotary-wing control signal generation circuit is configured to generate a rotary-wing control signal for stopping a rotation of a rotary wing located on a side facing a rotary wing in which a fault in an operation is detected by the fault detection circuit in the plurality of rotary wings, depending on a fault detected by the fault detection circuit in an operation of at least one of the plurality of rotary wings.

4. The control device for unmanned aircraft according to claim 2, wherein
the rotary-wing control signal generation circuit and the fault detection circuit are configured as the same hardware.

5. The control device for unmanned aircraft according to claim 3, wherein
the rotary-wing control signal generation circuit and the fault detection circuit are configured as the same hardware.

6. The control device for unmanned aircraft according to claim 3, wherein
signals indicating measured values of the respective physical amounts relating to an operation of at least one of the plurality of rotary wings are transmitted to the fault detection circuit via a common signal transmission path.

7. The control device for unmanned aircraft according to claim 1, wherein
the rotary-wing control signal generation circuit and the fault detection circuit are configured as the same hardware.

8. The control device for unmanned aircraft according to claim 2, wherein
signals indicating measured values of the respective physical amounts relating to an operation of at least one of the plurality of rotary wings are transmitted to the fault detection circuit via a common signal transmission path.

9. The control device for unmanned aircraft according to claim 2, wherein
the driver includes motors of the same number as the number of the rotary wings, each of the motors applies power to each of the rotary wings;
the measurer is configured to measure at least one of: each voltage applied to each motor; each electric current flowing through each motor; and the number of rotations of each motor; and
the fault detection circuit is configured to detect a fault in an operation of at least one of the plurality of rotary wings by using each estimated value relating to each motor determined by using at least one of the each voltage, the each electric current, and the each number of rotations, measured by the measurer, and a comparison value to the each estimated value.

10. The control device for unmanned aircraft according to claim 2, wherein
when no fault is detected by the fault detection circuit in any operation of the plurality of rotary wings, the rotary-wing control signal generation circuit is configured to determine control command values for controlling angular speeds of the plurality of rotary wings from control command values for controlling a throttle amount, a roll angle, a pitch angle, and a yaw angle; and
when a fault in an operation of at least one of the plurality of rotary wings is detected by the fault detection circuit, the rotary-wing control signal generation circuit is configured to determine a control command value at least for reducing the angular speed of a rotary wing, among the plurality of rotary wings, located on the side facing a rotary wing in which the fault in the operation is detected by the fault detection circuit, from control command values for controlling the throttle amount, the roll angle, and the pitch angle depending on the detected fault.

11. An unmanned aircraft comprising the control device according to claim 1.

12. A control device for unmanned aircraft comprising:
a rotary-wing control signal generation circuit for generating a rotary wing control signal for causing a driver to drive a plurality of rotary wings for flying the unmanned aircraft;
a measurer for measuring a physical amount relating to an operation of at least one of the plurality of rotary wings; and
a fault detection circuit for detecting a fault in the operation of at least one of the plurality of rotary wings by using the physical amount measured by the measurer,
wherein the rotary-wing control signal generation circuit is configured to generate a rotary wing control signal depending on the fault detected by the fault detection circuit in the operation of at least one of the plurality of rotary wings,
wherein the rotary-wing control signal generation circuit includes a control-amount distributor for distributing control amounts relating to flight of the unmanned aircraft correspondingly to the respective ones of the plurality of rotary wings,
wherein the control-amount distributor is configured to change distribution amounts of the control amounts corresponding to the respective ones of the plurality of rotary wings so that the unmanned aircraft performs an operation depending on the control amounts, depending on the fault detected by the fault detection circuit,
wherein the fault detection circuit is configured to detect a fault in an operation of at least one of the plurality of rotary wings depending on the difference between (i) an estimated value of an identification model when a control signal indicating a control amount is input into the identification model of the unmanned aircraft and (ii) a comparison value related to the unmanned aircraft when a control signal indicating the control amount is input into the unmanned aircraft,
wherein
the estimated value (a multivariate vector or a univariation (univariate)) of a state of a rotary-wing depending on the voltage v applied to a motor in respective motors rotating respective rotary-wings, the electric current i flowing through the motor and the number of rotations ω (omega) of the motor, is defined by:

[Formula 1]

$$\hat{y}(v,i,\omega) \quad (1)$$

the measured value (a multivariate vector or a univariation (univariate)) of the state of the rotary-wing is defined by:

[Formula 2]

$$y(v,i,\omega) \quad (2)$$

a control input to the rotary-wing is defined by u (a multivariate vector or a univariation (univariate)),
with regard to the control input and the measured value of the state, a model is established as follows by using the estimated value the state:

[Formula 3]

$$\begin{cases} x(k+1) = A_m x(k) + B_m u(k) \\ \hat{y}(k) = C_m x(k) \end{cases}$$

(x is a univariation (univariate) or a multivariate vector introduced for modeling, $A_m$, $B_m$, and $C_m$ are coefficients with respect to the univariations (univariants) x and u, or coefficient matrices with respect to the multivariate vectors x and u, k is the number of times that the estimation is repeated, and m is an index specifying any one of the motors ($A_m$, $B_m$, and $C_m$ may be different for each motor,),
a remainder r(k) of the measured value of the state:

[Formula 4]

$$y(k)$$

from the estimated value of the k-th time of the state:

[Formula 5]

$$\hat{y}(k)$$

is defined by:

[Formula 6]

$$r(k) = y(k) - \hat{y}(k) \quad (23)$$

(r is a multivariate vector or a univariation (univariate),),
a remainder evaluation value δ(delta)(k) at the k-th estimation is defined by:

[Formula 7]

$$\delta(k) = \int_{t}^{t+k \times T} \sqrt{\frac{r^2}{k}} \, dt$$

(t is time when the estimation is started, and T is a time interval between which the estimation is made, $r^2$ (square of r) is assumed to be an inner product of r and r when r is a multivariate vector),
the estimated value of the identification model when a control signal indicating the control amount is input into the identification model is

[Formula 8]

$$\hat{y}(k)$$

the comparison value related to the unmanned aircraft when a control signal indicating the control amount is input into the unmanned aircraft is

[Formula 9]

$$y(k)$$

and the control device is configured to detect a fault in an operation of at least one of the plurality of rotary wings by comparing the remainder evaluation value δ(delta)(k) with a predetermined threshold value.

* * * * *